United States Patent
Nakamura et al.

(10) Patent No.: US 7,555,215 B2
(45) Date of Patent: Jun. 30, 2009

(54) OPTICAL WAVELENGTH DIVISION MULTIPLEXING ACCESS SYSTEM

(75) Inventors: Hirotaka Nakamura, Narashino (JP); Junichi Kani, Narashino (JP); Hiroo Suzuki, Yokohama (JP); Mitsuhiro Teshima, Yokosuka (JP); Ukyo Yamaguchi, Yachiyo (JP); Hidetaka Onishi, Chiba (JP); Katsumi Iwatsuki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 587 days.

(21) Appl. No.: 10/535,526
(22) PCT Filed: May 28, 2004
(86) PCT No.: PCT/JP2004/007773
§ 371 (c)(1), (2), (4) Date: May 18, 2005
(87) PCT Pub. No.: WO2004/107626
PCT Pub. Date: Dec. 9, 2004

(65) Prior Publication Data
US 2006/0062576 A1 Mar. 23, 2006

(30) Foreign Application Priority Data
May 28, 2003 (JP) ............. 2003-151539

(51) Int. Cl.
*H04J 14/00* (2006.01)
*H04B 10/08* (2006.01)
(52) U.S. Cl. ............. 398/72; 398/67; 398/68; 398/70; 398/71; 398/5; 398/7; 398/20; 398/21; 398/30; 398/31; 398/35; 398/92
(58) Field of Classification Search ............. 398/1–7, 398/9–24, 28, 30–34, 66–72, 79, 93, 95, 398/137, 139–141, 162, 202; 385/37, 42, 385/50
See application file for complete search history.

(56) References Cited
U.S. PATENT DOCUMENTS
5,539,564 A * 7/1996 Kumozaki et al. ............. 398/2
(Continued)

FOREIGN PATENT DOCUMENTS
JP 11-122172 4/1999
(Continued)

OTHER PUBLICATIONS
Gerstel et al: "Optical Layer Survivability—An Implementation Perspective", IEEE Journal on Selected Areas in Communications, vol. 18, No. 10, Oct. 2000, pp. 1885-1899.*
(Continued)

*Primary Examiner*—Ken N Vanderpuye
*Assistant Examiner*—Li Liu
(74) *Attorney, Agent, or Firm*—Fitch, Even, Tabin & Flannery

(57) ABSTRACT

A dual structure for a multiplexing section extended to an OSU is obtained without adding a dynamic function, such as an optical switch, to a W-MULDEM. The W-MULDEM of an optical wavelength division multiplexing access system divides, among ports corresponding to the individual ONUs, downstream optical signals having wavelengths $\lambda d1$ to $\lambda dn$, which are received along a current-use optical fiber, or downstream optical signals having wavelengths $\lambda d1+\Delta\lambda$ to $\lambda dn+\Delta\lambda$, which are received along a redundant optical fiber. The W-MULDEM also multiplexes, for the port that corresponds to the current-use optical fiber or the redundant optical fiber, upstream optical signals having wavelengths $\lambda u1$ to $\lambda un$ or wavelengths $\lambda u1+\Delta\lambda$ to $\lambda un+\Delta\lambda$, which are received along optical fibers corresponding to the ONUs. A wavelength difference between the downstream optical signal and the upstream optical signal that are consonant with each ONU is defined as an integer times the FSR of an AWG.

27 Claims, 22 Drawing Sheets

U.S. PATENT DOCUMENTS

| | | | | |
|---|---|---|---|---|
| 5,907,417 | A | * | 5/1999 | Darcie et al. .................. 398/20 |
| H2075 | H | * | 8/2003 | Gnauck et al. ................ 398/58 |
| 6,868,232 | B2 | * | 3/2005 | Eijk et al. ....................... 398/5 |
| 2003/0039010 | A1 | * | 2/2003 | Akimoto et al. ............. 359/152 |
| 2003/0142978 | A1 | * | 7/2003 | Lee et al. ....................... 398/34 |
| 2004/0213574 | A1 | * | 10/2004 | Han et al. ...................... 398/71 |
| 2005/0036785 | A1 | * | 2/2005 | Tervonen et al. ............. 398/49 |

FOREIGN PATENT DOCUMENTS

| | | |
|---|---|---|
| JP | 2000-329963 | 11/2000 |
| JP | 2001-358697 | 12/2001 |
| JP | 2002-368656 | 12/2002 |
| JP | 2003-051765 | 2/2003 |

OTHER PUBLICATIONS

Kani, Jun-Ichi; Teshima, Mitsuhiro; Akimoto, Koji; Takachio, Noboru; Suzuki, Hiroo and Iwatsuki, Katsumi, A WDM-based optial Access Network For Wide-Area Gigabit Access Services, IEEE Optical Communication Magazine, vol. 41, Issue 2, S43-S48, Feb. 2003.

* cited by examiner

| | | W | P |
|---|---|---|---|
| ONU30-1 | #1 | $\lambda d1$<br>$\lambda u1$ | $\lambda d1+\Delta\lambda$ (+mFSR)<br>$\lambda u1+\Delta\lambda$ (+mFSR) |
| ONU30-2 | #2 | $\lambda d2$<br>$\lambda u2$ | $\lambda d2+\Delta\lambda$ (+mFSR)<br>$\lambda u2+\Delta\lambda$ (+mFSR) |
| ⋮ | | ⋮ | ⋮ |
| ONU30-n-1 | #n-1 | $\lambda dn-1$<br>$\lambda un-1$ | $\lambda dn-1+\Delta\lambda$ (+mFSR)<br>$\lambda un-1+\Delta\lambda$ (+mFSR) |
| ONU30-n | #n | $\lambda dn$<br>$\lambda un$ | $\lambda dn+\Delta\lambda$ (+mFSR)<br>$\lambda un+\Delta\lambda$ (+mFSR) |

$\lambda di - \lambda ui = aFSR$

FIG.4A

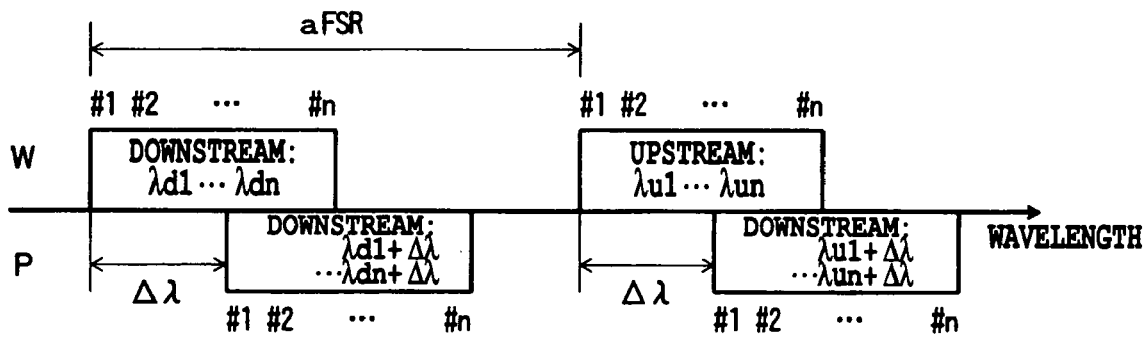

FIG.4B

|  | W | P |
|---|---|---|
| ONU1 | $\lambda d1$ $\lambda u1$ | $\lambda d33$ $\lambda u33$ |
| ONU2 | $\lambda d2$ $\lambda u2$ | $\lambda d34$ $\lambda u34$ |
| ⋮ | ⋮ | ⋮ |
| ONU32 | $\lambda d32$ $\lambda u32$ | $\lambda d64$ $\lambda u64$ |
| ONU33 | $\lambda d33$ $\lambda u33$ | $\lambda d1$ $\lambda u1$ |
| ONU34 | $\lambda d34$ $\lambda u34$ | $\lambda d2$ $\lambda u2$ |
| ⋮ | ⋮ | ⋮ |
| ONU64 | $\lambda d64$ $\lambda u64$ | $\lambda d32$ $\lambda u32$ |
FIG.15A
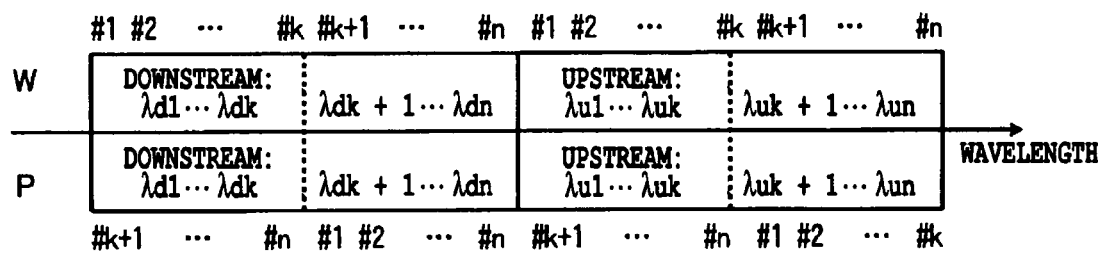
FIG.15B
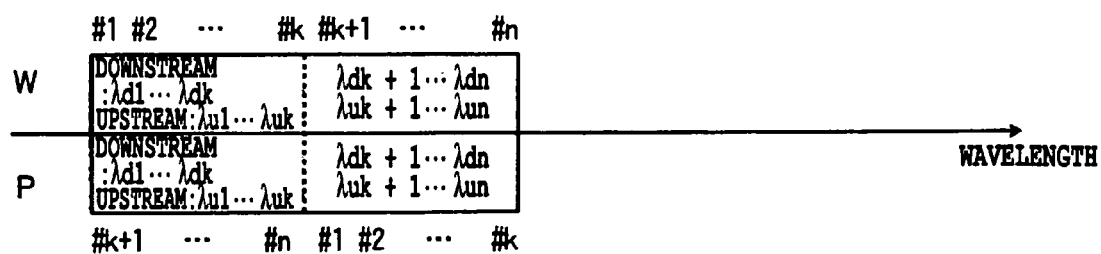
FIG.15C

OPTICAL WAVELENGTH DIVISION MULTIPLEXING ACCESS SYSTEM

TECHNICAL FIELD

The present invention relates to an optical wavelength division multiplexing access system for bidirectional transmission of optical signals between a center node (OSU) and a plurality of optical network units (ONUs).

BACKGROUND ART

In FIG. 1 is shown the configuration of a conventional optical wavelength division multiplexing access system. This configuration is disclosed in "A WDM-based optical access network for wide-area gigabit access services", J. Kani et al., IEEE Communication Magazine, vol. 41, issue 2, S43-S48, February 2003 (document 1). The optical wavelength division multiplexing access system comprises: a center node (OSU) 50, a wavelength multiplexing/demultiplexing device (herein after W-MULDEM) 60 and a plurality of optical network units (ONU) 70-1 to 70-$n$. A multiplexing section between the OSU 50 and the W-MULDEM unit 60 is established by extending a downstream optical fiber 1$d$, for transmitting downstream optical signals from the OSU to the individual ONUs, and an upstream optical fiber 1$u$, for transmitting upstream optical signals from the individual ONUs to the OSU. Access sections between the ONUs 70-1 to 70-$n$ and the W-MULDEM unit 60 are established by extending downstream optical fibers 2$d$-1 to 2$d$-$n$, for transmitting downstream optical signals to the individual ONUs, and upstream optical fibers 2$u$-1 to 2$u$-$n$, for transmitting upstream optical signals from the individual ONUs.

In this configuration, one wavelength band $\lambda d$ is allocated for downstream optical signals from the OSU to the ONUs, and one wavelength band $\lambda u$ ($\neq \lambda d$) is allocated for upstream optical signals from the ONUs to the OSU. Wavelengths $\lambda d1$ to $\lambda dn$, in the wavelength band $\lambda d$, and wavelengths $\lambda u1$ to $\lambda un$, in the wavelength band $\lambda u$, are allocated for the individual ONUs. Further, an arrayed waveguide grating (AWG) is employed as W-MULDEM means for multiplexing or demultiplexing optical signals having individual wavelengths.

Optical transmitter/receiver 51-1 to 51-$n$ of the OSU 50 transmit downstream optical signals having wavelengths $\lambda d1$ to $\lambda dn$, in the wavelength band $\lambda d$, to the individual ONUs. A downstream AWG 52 multiplexes the downstream optical signals. An optical carrier supply module (OCSM) 53 for an upstream signal collectively oscillates optical carriers that are used for upstream signals and have wavelengths $\lambda u1$ to $\lambda un$, in the wavelength band $\lambda u$, that are to be transmitted to the individual ONUs. A WDM coupler 54 multiplexes the downstream optical signals and the optical carriers for upstream signals and transmits the obtained signals to the W-MULDEM unit 60 through the downstream optical fiber 1$d$.

In the W-MULDEM unit 60, a WDM coupler 61 demultiplexes the downstream optical signals having the wavelengths $\lambda d$ from an optical carrier for an upstream signal having the wavelength $\lambda u$. A downstream AWG 62 demultiplexes the downstream optical signals having the wavelengths $\lambda d1$ to $\lambda dn$, and an upstream signal optical carrier AWG 63 demultiplexes the optical carriers for upstream signals having wavelengths $\lambda u1$ to $\lambda un$. WDM couplers 64-1 to 64-$n$ perform wavelength division multiplexing for the respective downstream optical signals having wavelengths $\lambda d1$ to $\lambda dn$, which are to be transmitted to the individual ONUs, and the optical carriers for upstream signals having wavelengths $\lambda u1$ to $\lambda un$. The resultant downstream optical signals and the optical carriers for upstream signals are transmitted to the corresponding ONUs 70-1 to 70-$n$ along the downstream optical fiber 2$d$.

An optical transmission/reception unit 71 in the ONU 70-1 demultiplexes a downstream optical signal having the wavelength $\lambda d1$ from an optical carrier for an upstream signal having the wavelength $\lambda u1$, and receives the downstream optical signal having the wavelength $\lambda d1$. The optical transmission/reception unit 71 also modulates an optical carrier for an upstream signal having the wavelength $\lambda u1$, and transmits the modulated signal as a return upstream optical signal to the W-MULDEM unit 60 through the upstream optical fiber 2$u$. The other ONUs perform the same processing. An upstream AWG 65 in the W-MULDEM unit 60 multiplexes the upstream optical signals, having wavelengths $\lambda u1$ to $\lambda un$, that are transmitted by the individual ONUs, and transmits the obtained signals to the OSU 50 through the upstream optical fiber 1$u$. The upstream optical signal is demultiplexed by an upstream AWG 55 of the OSU 50, and the obtained signals are transmitted to the optical transmitter/receiver 51-1 to 51-$n$ that correspond to the ONUs.

As is shown in FIG. 1, the wavelength band $\lambda d$ (wavelengths $\lambda d1$ to $\lambda dn$) for the downstream optical signal and the wavelength band $\lambda u$ (wavelengths $\lambda u1$ to $\lambda un$) for the optical carrier for the upstream signal are arranged so that they do not overlap along the wavelength axis (or along the optical frequency axis; optical frequency=light velocity/wavelength). An AWG, a property of which is that wavelengths at an FSR (Free Spectrum Range) interval are multiplexed or demultiplexed at the same time, is employed as the downstream AWG 62 and the optical carrier AWG 63 for upstream signals that are provided for the W-MULDEM unit 60. When the wavelength interval for the downstream optical signal (e.g., $\lambda d1$) and the optical carrier (e.g., $\lambda u1$) for the upstream signal are designated to be the FSR, the signal and the carrier can be routed to the same port by the AWG, so that only one AWG is required. In this case, the WDM couplers 61 and 64-1 to 64-$n$ are eliminated.

When an obstacle, such as the severing of a fiber, has occurred at the multiplexing section between the OSU 50 and the W-MULDEM unit 60, communication with all ONUs is disabled. Therefore, it is preferable that, in order to obtain a dual multiplexing section, an optical fiber for current use and a redundant optical fiber be provided, and a function for switching to the redundant optical fiber be furnished for the OSU 50 and the W-MULDEM unit 60.

In FIG. 2 is shown the configuration of a common dual system. Opposite transmission devices 81 and 82 are connected via a current-use optical fiber 83 and a redundant optical fiber 84. An optical signal, transmitted by an optical transmission/reception unit 85 of the transmission device 81, is branched, to obtain two signals, by a photocoupler 86-1, and the branched signals are transmitted to the transmission device 82 along a current-use optical fiber 83 and a redundant optical fiber 84. Then, one of the optical fibers (the current-use optical fiber in this case) is selected at an optical switch 87-1 for the transmission device 82, and the signal is received by an optical transmission/reception unit 88. The same process is performed for a signal transmission in the opposite direction.

When the multiplexing section between the OSU 50 and the W-MULDEM unit 60 is to be doubled by using the switching method that employs the optical switch shown in FIG. 2, a dynamic function (optical switch) is required for the W-MULDEM unit 60, which originally does not need such a dynamic function. Accordingly, new control means is required to control the switching in the W-MULDEM unit 60, and the entire system becomes complicated.

It is one objective of the present invention to obtain a dual multiplexing section between an OSU and a W-MULDEM unit without adding a dynamic function, such as an optical switch, to the W-MULDEM unit.

DISCLOSURE OF THE INVENTION

To achieve this objective, according to a first embodiment of the present invention, an optical wavelength division multiplexing access system, whereby a center node (OSU) and n optical network units (ONUs) are arranged by using a W-MULDEM unit, whereby a multiplexing section between the OSU and the W-MULDEM unit is established by extending a current-use optical fiber and a redundant optical fiber and access sections between the W-MULDEM unit and the individual ONUs are established by the extension of optical fibers, whereby downstream optical signals from the OSU to the ONUs and upstream optical signals from the ONUs to the OSU are multiplexed using wavelengths that are allocated to individual ONUs and the resultant signals are transmitted across the multiplexing section, and whereby the W-MULDEM unit performs wavelength multiplexing or wavelength demultiplexing for the upstream or downstream optical signals to provide bidirectional transmission, is characterized in that:

the OSU includes transmission means for multiplexing downstream optical signals having wavelengths $\lambda d1$ to $\lambda dn$ that correspond to the ONUs and that are to be transmitted to the ONUs along the current-use optical fiber, for multiplexing downstream optical signals having wavelengths $\lambda d1+\Delta\lambda$ to $\lambda dn+\Delta\lambda$ that correspond to the ONUs and that are to be transmitted to the ONUs along the redundant optical fiber, and for selecting either the current-use optical fiber or the redundant optical fiber for use for transmission, and reception means for receiving upstream optical signals having wavelengths $\lambda u1$ to $\lambda un$ along the current-use optical fiber or for receiving upstream optical signals having wavelengths $\lambda u1+\Delta\lambda$ to $\lambda un+\Delta\lambda$ along the redundant optical fiber;

the individual ONUs receive corresponding downstream optical signals having wavelengths $\lambda d1$ to $\lambda dn$ or corresponding downstream optical signals having wavelengths $\lambda d1+\Delta\lambda$ to $\lambda dn+\Delta\lambda$, which are received along the optical fibers extended across the access sections, the individual ONUs transmit, to the optical fibers extended across the access sections, corresponding upstream optical signals that have wavelengths $\lambda u1$ to $\lambda un$ and are to be transmitted along the current-use optical fiber extended across the multiplexing section, or corresponding upstream optical signals that have wavelengths $\lambda u1+\Delta\lambda$ to $\lambda un+\Delta\lambda$ and are to be transmitted along the redundant optical fiber;

the W-MULDEM unit includes an array waveguide diffraction grating (AWG) having two ports, which are to be respectively connected to the current-use optical fiber and the redundant optical fiber, and n ports, which are to be connected to optical fibers corresponding to the ONUs;

the W-MULDEM unit demultiplexes to the ports corresponding to the ONUs the downstream optical signals that have wavelengths $\lambda d1$ to $\lambda dn$ and are received along the current-use optical fiber, or the downstream optical signals that have wavelengths $\lambda d1+\Delta\lambda$ to $\lambda dn+\Delta\lambda$ and are received along the redundant optical fiber, or multiplexes, to the port corresponding to the current-use optical fiber or the redundant optical fiber, the upstream optical signals that have wavelengths $\lambda u1$ to $\lambda un$ or wavelengths $\lambda u1+\Delta\lambda$ to $\lambda un+\Delta\lambda$ and that are received along the optical fibers corresponding to the ONUs; and a wavelength difference between the downstream optical signal and the upstream optical signal corresponding to each of the ONUs is integer times a free spectrum range (FSR) of the AWG.

According to a second embodiment of the present invention, an optical wavelength division multiplexing access system, whereby a center node (OSU) and n optical network units (ONUs) are arranged through a W-MULDEM unit, whereby a multiplexing section between the OSU and the W-MULDEM unit is established by extending a current-use downstream optical fiber, a current-use upstream optical fiber, a reserve downstream optical fiber and a reserve upstream optical fiber and access sections between the W-MULDEM unit and the individual ONUs are established by the extension of downstream optical fibers and of upstream optical fibers, whereby downstream optical signals from the OSU to the ONUs and upstream optical signals from the ONUs to the OSU are multiplexed, using wavelengths that are allocated to the individual ONUs, and resultant optical signals are transmitted across the multiplexing section, and whereby the W-MULDEM unit performs either wavelength multiplexing or wavelength division for the upstream or downstream optical signals to provide bidirectional transmission, is characterized in that:

the OSU includes transmission means for multiplexing downstream optical signals having wavelengths $\lambda d1$ to $\lambda dn$ that correspond to the ONUs and that are to be transmitted to the ONUs along the current-use downstream optical fiber, for multiplexing downstream optical signals having wavelengths $\lambda d1+\Delta\lambda$ to $\lambda dn+\Delta\lambda$ that correspond to the ONUs and that are to be transmitted to the ONUs along the reserve downstream optical fiber, and for selecting either the current-use downstream optical fiber or the reserve downstream optical fiber used for transmission, and reception means for receiving upstream optical signals having wavelengths $\lambda u1$ to $\lambda un$ transmitted along the current-use upstream optical fiber, or for receiving upstream optical signals having wavelengths $\lambda u1+\Delta\lambda$ to $\lambda un+\Delta\lambda$ transmitted along the reserve upstream optical fiber;

the ONUs receive, along the optical fibers extended across the access sections, corresponding downstream optical signals having wavelengths $\lambda d1$ to $\lambda dn$ or corresponding downstream optical signals having wavelengths $\lambda d1+\Delta\lambda$ to $\lambda dn+\Delta\lambda$, the ONUs transmit, to the optical fibers extended across the access sections, corresponding upstream optical signals that have wavelengths $\lambda u1$ to $\lambda un$ and that are to be transmitted along the current-use optical fiber extended across the multiplexing section, or corresponding upstream optical signals that have wavelengths $\lambda u1+\Delta\lambda$ to $\lambda un+\Delta\lambda$ and are to be transmitted along the redundant optical fiber;

the W-MULDEM unit includes a downstream array waveguide diffraction grating (AWG) having two ports, which are to be respectively connected to the current-use downstream optical fiber and the reserve downstream optical fiber, and n ports, which are to be connected to optical fibers corresponding to the ONUs, and an upstream array waveguide diffraction grating (upstream AWG) having two ports, which are to be respectively connected to the current-use upstream optical fiber and the reserve upstream optical fiber, and n ports, which are connected to the optical fibers corresponding to the ONUs; and the W-MULDEM unit demultiplexes to the ports of the downstream AWG that correspond to the ONUs the downstream optical signals that have wavelengths $\lambda d1$ to $\lambda dn$ and are received along the current-use downstream optical fiber, or the downstream optical signals that have wavelengths $\lambda d1+\Delta\lambda$ to $\lambda dn+\Delta\lambda$ and are received along the reserve downstream optical fiber, or multiplexes, to the port corresponding to the current-use upstream optical fiber or the reserve upstream optical fiber, the upstream optical signals that have wavelengths $\lambda u1$ to $\lambda un$ or wavelengths $\lambda u1+\Delta\lambda$ to $\lambda un+\Delta\lambda$ and that are transmitted to the upstream AWG along the optical fibers corresponding to the ONUs.

BRIEF DESCRIPTION OF THE DRAWINGS

FIGS. 4A and 4B are diagrams showing a first example for wavelength allocation according to the first embodiment;

FIGS. 15A to 15C are diagrams showing example wavelength allocations according to a fourth embodiment;

BEST MODE FOR CARRYING OUT THE INVENTION

FIRST EMBODIMENT (Wavelength Allocation)

Figure 1:
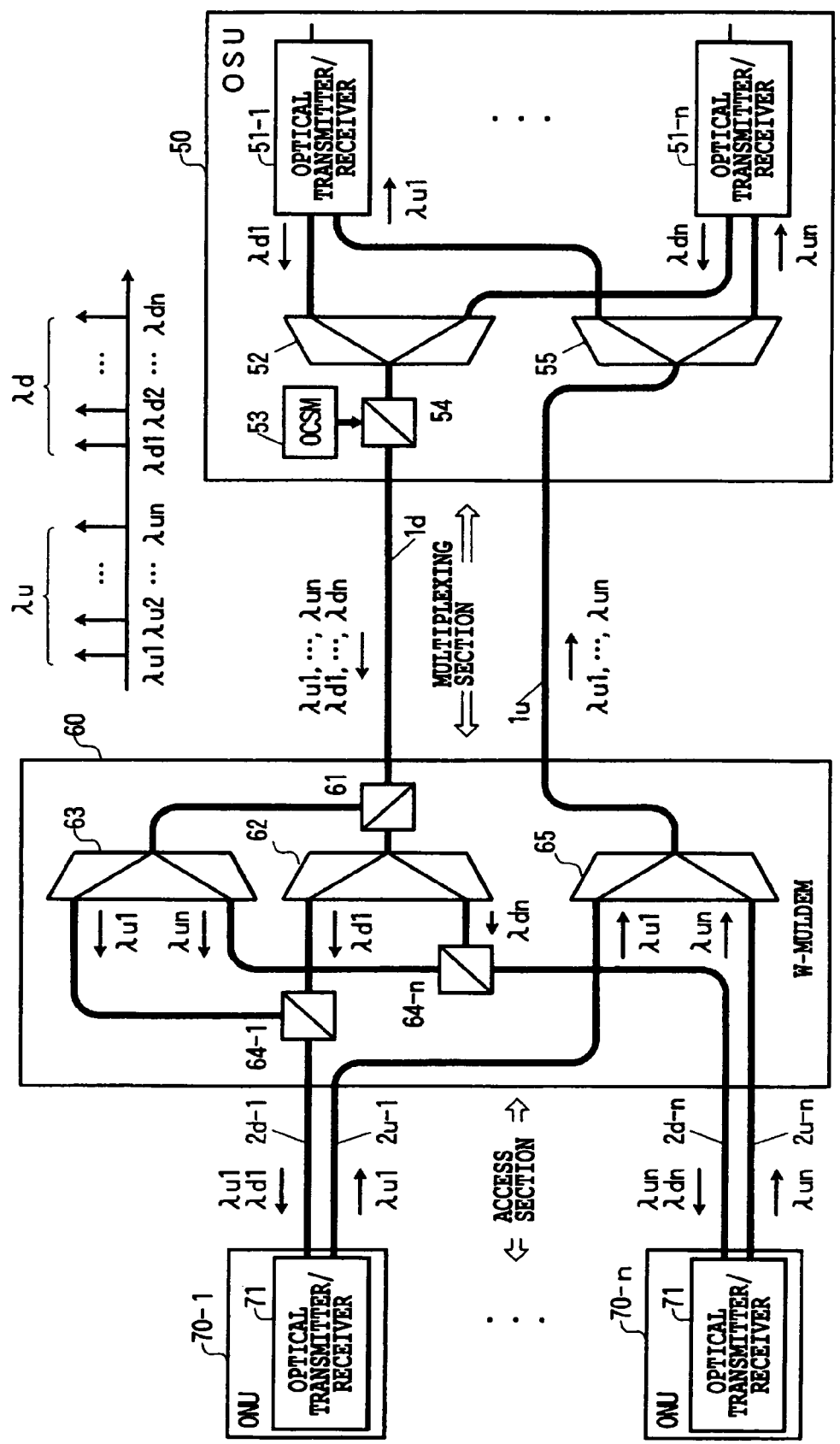
FIG. 1 is a diagram showing the configuration of a conventional optical wavelength division multiplexing access system.
Figure 2:
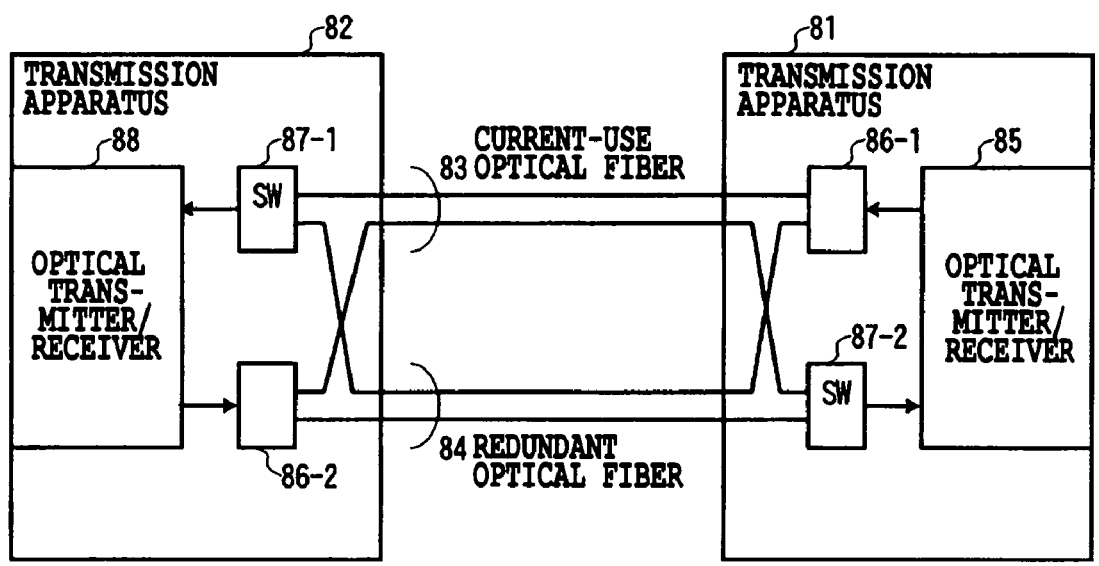
FIG. 2 is a diagram showing the configuration of a common dual system.
Figure 3:
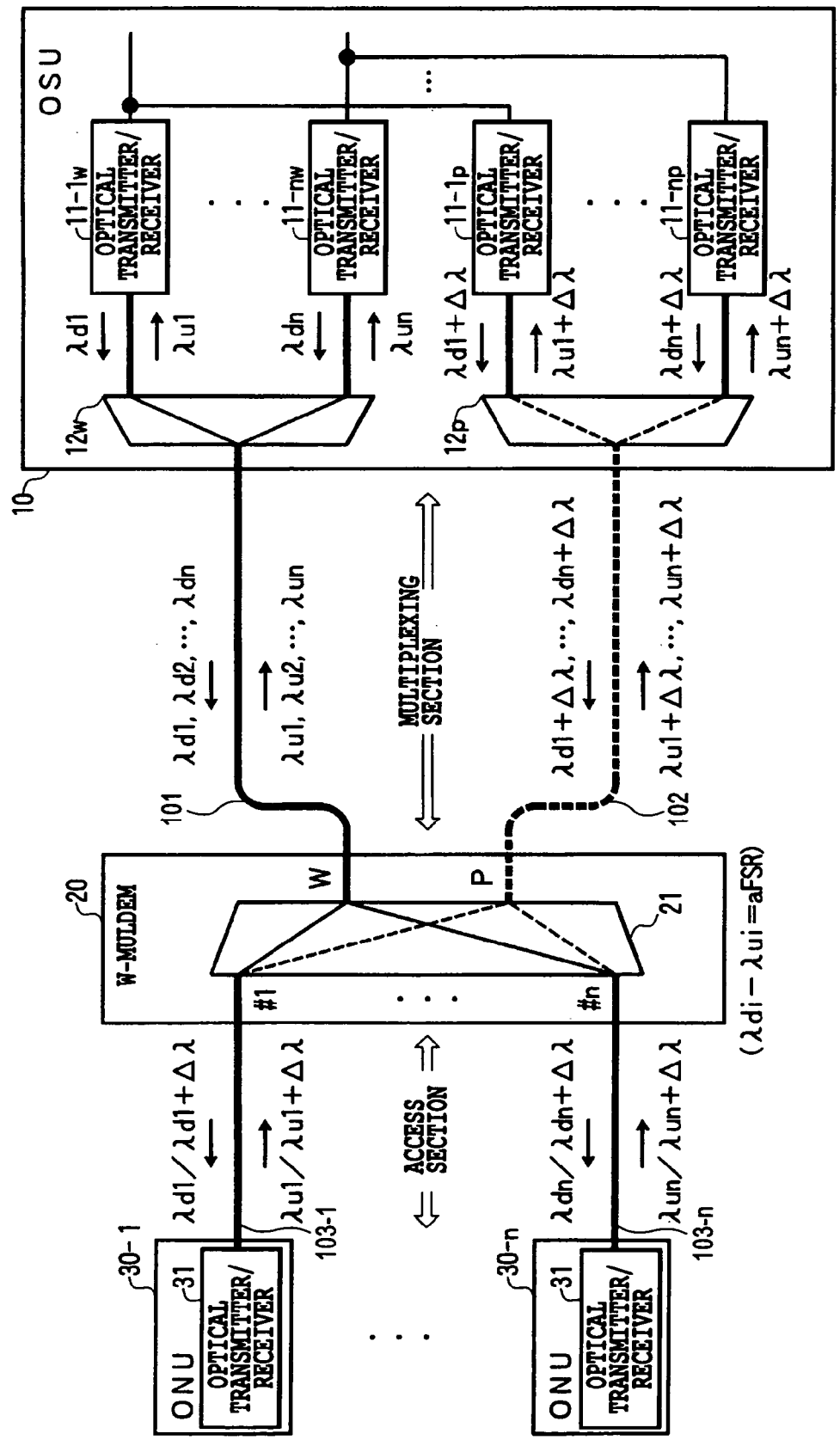
FIG. 3 is a diagram showing an optical wavelength division multiplexing access system according to a first embodiment of the present invention.

In FIG. 3 is shown an optical wavelength division multiplexing access system according to a first embodiment of the present invention. The optical wavelength division multiplexing access system for this embodiment comprises a center node (OSU) 10, a W-MULDEM unit 20, and a plurality of optical network units (ONUs) 30-1 to 30-$n$. The multiplexing section between the OSU 10 and the W-MULDEM unit 20 is established by extension of a current-use optical fiber 101 and a redundant optical fiber 102, for transmitting a downstream optical signal from the OSU 10 to the individual ONUs 30 and upstream optical signals from ONUs 30 to the OSU 10. The access sections between the individual ONUs 30-1 to 30-$n$ and the W-MULDEM unit 20 are established by the extension of optical fibers 103-1 to 103-$n$, for transmitting a downstream optical signals to the ONUs and upstream optical signals from the ONUs.

The OSU 10 includes: current-use optical transmitter/receiver 11-1$w$ to 11-$nw$ and reserve optical transmitter/receiver 11-1$p$ to 11-$np$, which correspond to the ONUs; a current-use AWG 12$w$, which multiplexes downstream optical signals having wavelengths $\lambda d1$ to $\lambda dn$ that which have been received from the current-use optical transmitter/receiver 11-1$w$ to 11-$nw$ and transmits the obtained optical signal to the current-use optical fiber 101, or which demultiplexes to the current-use optical transmitter/receiver 11-1$w$ to 11-$nw$ upstream optical signals having wavelengths $\lambda u1$ to $\lambda un$ that have been received along the current-use optical fiber 101; and a reserve AWG 12$p$, which multiplexes downstream optical signals having wavelengths $\lambda d1+\Delta\lambda$ to $\lambda dn+\Delta\lambda$ that have been received from the reserve optical transmitter/receiver 11-1$p$ to 11-$np$ and transmits the obtained optical signal to the redundant optical fiber 102, or which demultiplexes to the reserve optical transmitter/receiver 11-1$p$ to 11-$np$ upstream optical signals having wavelengths $\lambda u1+\Delta\lambda$ to $\lambda un+\Delta\lambda$ that have been received over the redundant optical fiber 102.

Optical transmission/reception circuits 31 of the individual ONUs 30-1 to 30-$n$ receive, along the optical fibers 103 extended at the access sections, either downstream optical signals having wavelengths $\lambda d1$ to $\lambda dn$, or downstream optical signals having wavelengths $\lambda d1+\Delta\lambda$ to $\lambda dn+\Delta\lambda$. Further, for the transmission of an upstream optical signal along the current-use optical fiber 101 at the multiplexing section, the optical transmission/reception circuits 31 select upstream optical signals having wavelengths $\lambda u1$ to $\lambda un$, or for the transmission of an upstream optical signal along the reserve optical fiver 102, select upstream optical signals having wavelengths $\lambda u1+\Delta\lambda$ to $\lambda un+\Delta\lambda$ and transmit the selected upstream optical signals to the optical fibers 103 at the access sections.

The W-MULDEM unit 20 is constituted by a single AWG 21. The AWG 21 includes: two ports that are respectively connected to the current-use optical fiber 101 and the redundant optical fiber 103 that extend across the multiplexing section; n ports #1 to #n that are connected to the optical fibers 103-1 to 103-n that extend across the access section and correspond to the ONUs. The downstream optical signals having wavelengths λd1 to λdn that have been received along the current-optical fiber to the port W, or the downstream optical signals having wavelengths λd1+Δλ to λdn+Δλ that have been received along the redundant optical fiber to the port P, are routed to the ports #1 to #n that correspond to the ONUs. Furthermore, the upstream optical signals having wavelengths λu1 to λun, are received at the ports #1 to #n along the optical fibers 103 that correspond to the ONUs, and are merged at the port W corresponding to the current-use optical fiber 101. The upstream optical signals having wavelengths λu1+Δλ to λun+Δλ are merged at the port P corresponding to the redundant optical fiber 102.

In FIG. 4A is shown an example wavelength allocation for the ports W and P and the ports #1 to #n of the AWG 21. For example, the downstream optical signal having wavelength λd1, which is received at the port W along the current-use optical fiber 101, and the downstream optical signal having wavelength λd1+Δλ, which is received along the redundant optical fiber 102, are output to the port #1. Further, the upstream optical signal having wavelength λu1, or the upstream optical signal having wavelength λu1+Δλ, which is received at the port #1 from the ONU 30-1, is output to the port W and port P.

For this process, the free spectrum range (FSR) of the AWG should be taken into account for the allocation of the wavelengths. The diffraction order is an arbitrary integer, and a plurality of center wavelengths are present for one AWG. A band that can be used by one AWG without being overlapping is called an FSR, and the property that is repeated for each FSR is employed. That is, as is shown in FIG. 4B, a difference between the wavelengths λd1 and λu1 is defined as integer times (aFSR) the FSR of the AWG 21, and the ports W and P are provided at locations consonant with a difference Δλ between the wavelengths for current use and reserve use. It should be noted that the difference Δλ between the wavelengths for current use and reserve use may be either positive or negative, and mFSR (m is an integer) may be added to the difference.

In this specification, the wavelength λ can be replaced with a frequency f. The wavelength difference Δλ can not exactly be replaced with a frequency difference Δf, because the ratio of the wavelength difference Δλ to the frequency difference 1f is changed when a wavelength differs. However, it will be apparent to one having ordinary skill in the art that the replacement of the wavelength difference Δλ with the frequency difference Δf is also included within the scope of the present invention.

Figures 5A, 5B:
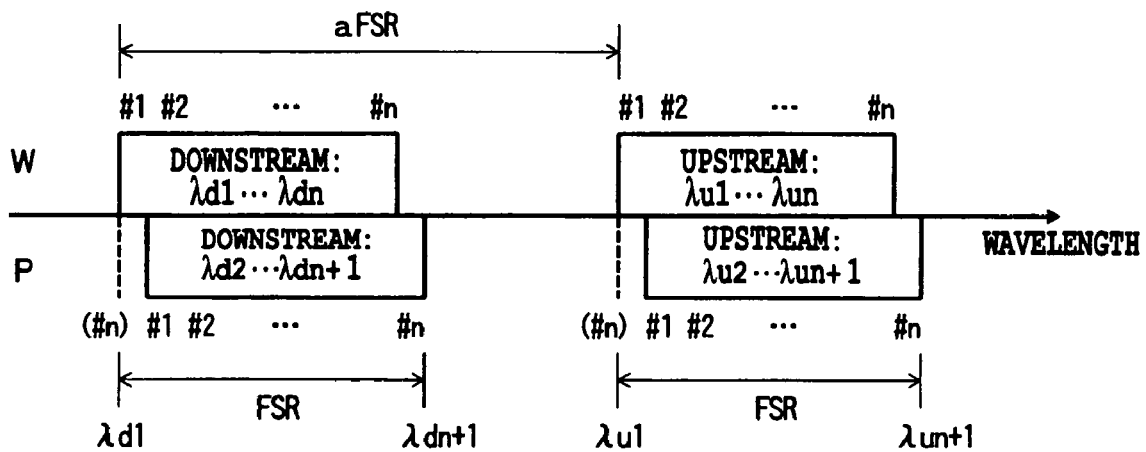
FIGS. 5A and 5B are diagrams showing a second example for wavelength allocation according to the first embodiment.

In FIG. 5A is shown another example wavelength allocation. The wavelength interval between the wavelengths λd1, λd2, . . . and λdn of the current-use downstream optical signals, which are demultiplexed by the AWG 21, and the wavelength interval between the wavelengths λu1, λu2, . . . and λun of the current-use upstream optical signals, are adjusted to equal the difference Δλ between the wavelengths for the current use and the reverse use. As a result, the wavelengths of the reserve downstream optical signals are λd2, λd3, . . . and λdn+1, and the wavelengths of the reserve upstream optical signals are λu2, λu3, . . . and λun+1. As is shown in FIG. 5B, when λdn+1=λd1+FSR is established, the wavelength λdn+1 of the reserve downstream optical signal that corresponds to the ONU 30-n can be set as λd1. Similarly, when λun+1=λu1+FSR is established, the wavelength λun+1 of the reserve upstream optical signal that corresponds to the OSU 30-n can be set as λu1.

According to this embodiment, since the wavelength difference between the downstream optical signal and the upstream optical signal is defined as the aFSR, and since the difference between the wavelengths for current use and reserve use is defined as Δλ (+mFSR), a dual optical fiber structure can be obtained at the multiplexing section, and the current use system and the reserve use system can be alternately selected, passively, by a single AWG. That is, for the transmission of the downstream optical signals to the ONUs 30-1 to 30-n along the current-use optical fiber 101, the OSU 10 multiplexes the downstream optical signals having wavelengths λd1 to λdn and corresponding to the individual ONUs, and for the transmission along the redundant optical fiber 102, multiplexes the downstream optical signals having wavelengths λd1+Δλ (or λd2) to λdn+Δλ (or λdn+1) and corresponding to the ONUs. On the other hand, for the transmission of upstream optical signals along the current-use optical fiber 101 at the multiplexing section, the ONUs 30-1 to 30-n can transmit upstream optical signals having wavelengths λu1 to λun, while for the transmission along the redundant optical fiber 102, they can transmit the upstream optical signals having wavelengths λu1+Δλ (or λu2) to λun+Δλ (or λun+1). Through this wavelength selection, the W-MULDEM unit 20 can passively select the current use system and the reverse system.

(Current-Use and Reserve-Use Switching Configuration Using Optical Switches)

Figure 6:
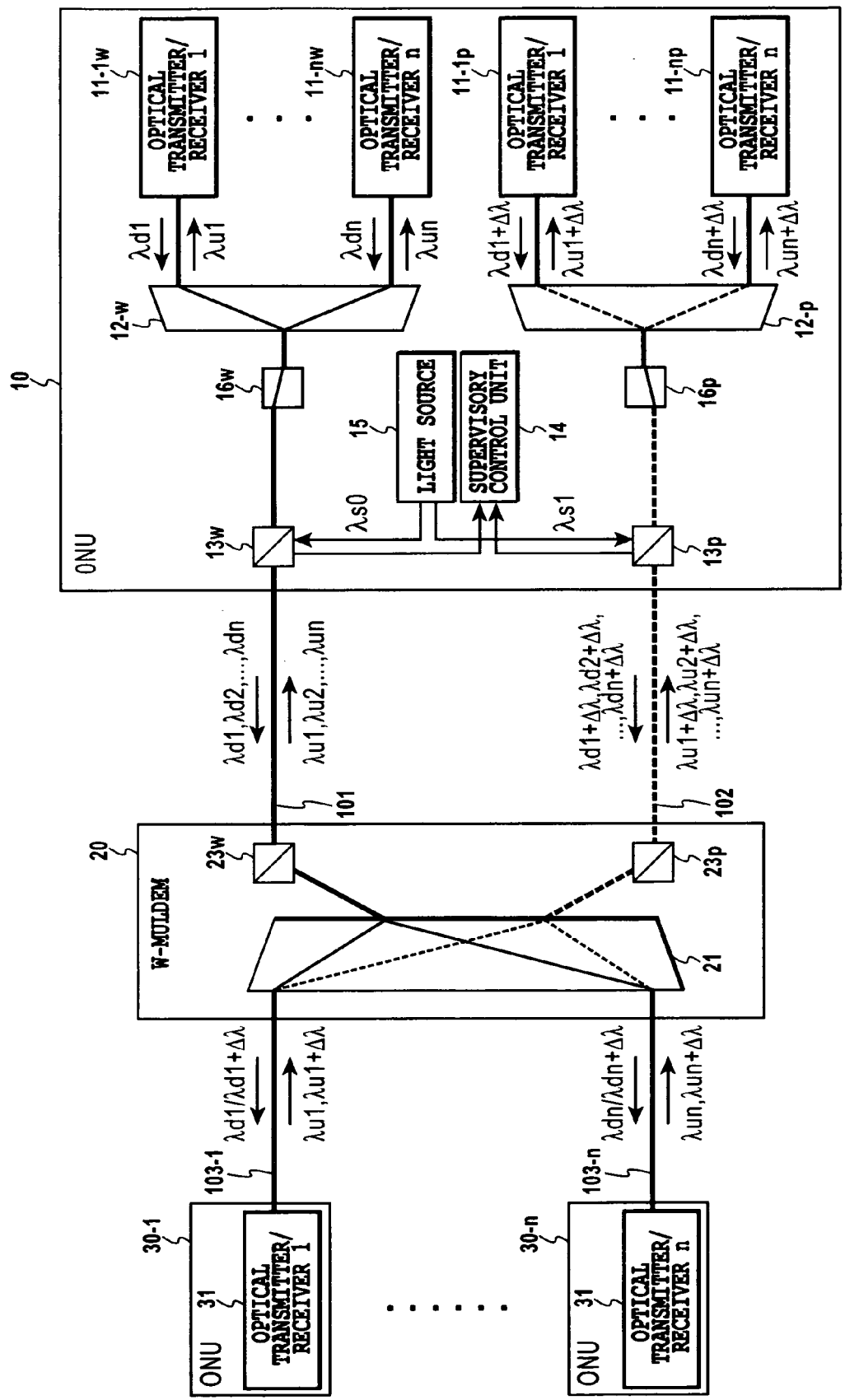
FIG. 6 is a diagram showing an example current-use and reserve-use switching configuration according to the first embodiment.

An explanation will now be given for means for transmitting or receiving signals by selecting either the current-use optical fiber 101 or the redundant optical fiber 102. In FIG. 6 is shown a current-use and a reserve-use selection configuration according to the first embodiment that employs optical switches.

The OSU 10 also includes: an optical switch 16w, which is used to set ON or OFF the input/output between the current-use optical fiber 101 and the current-use AWG 12w; and an optical switch 16p, which is used to set ON or OFF the input/output between the redundant optical fiber 102 and the reserve AWG 12p. In addition, the OSU 10 includes: a supervisory light source 15, for outputting supervisory light having a wavelength of λs0 to supervise the current-use optical fiber 101, and supervisory light having a wavelength of λs1 to supervise the redundant optical fiber 102; and a supervisory control unit 14, for detecting the supervisory lights having wavelengths λs0 and λs1 after the transmission along the current-use optical fiber 101 and the redundant optical fiber 102 has been completed, and for transmitting a selection signal. Multiplexing/demultiplexing units 13w and 23w, for multiplexing or demultiplexing wavelength λs0, are provided for the current-use optical fiber 101, and multiplexing/demultiplexing units 13p and 23p, for multiplexing or demultiplexing wavelength λs1, are provided for the redundant optical fiber 102.

The multiplexing/demultiplexing unit 13w (13p) multiplexes the supervisory light, which has wavelength λs0 (λs1) and is received from the supervisory light source 15, and the downstream optical signals that have wavelengths λd1 to λdn (wavelengths λd1+Δλ to λdn+Δλ), which are to be transmitted along the current-use optical fiber 101 or the redundant optical fiber 101. The multiplexing/demultiplexing unit 23w (23p) of the W-MULDEM unit 20 reflects the supervisory light by using, for example, a mirror or a filter, and outputs it again to the current-use optical fiber 101. The multiplexing/demultiplexing unit 13w (13p) extracts only the supervisory light, which it transmits to the supervisory control unit 14.

In this embodiment, when the current-use optical fiber 101 is employed, the optical switch 16w is set to the ON state, while the optical switch 16p is set to the OFF state, and communication between the OSU 10 and the ONUs 30 is performed by using the downstream optical signals having wavelengths λd1 to λdn and the upstream optical signals having wavelengths λu1+Δλ to λn+Δλ. When a failure occurs in the current-use optical fiber 101 extending across the multiplexing section, the supervisory control unit 14 transmits a select signal to the optical switches 16w and 16p to set the optical switch 16w to the OFF state and the optical switch 16p to the ON state. As a result, the redundant optical fiber 102 is selected.

Further, when a failure occurs in the current-use transmission/reception units 11-1w to 11-nw of the OSU 10, the states of the optical switches 16w and 16p are changed in accordance with a selection signal received from the supervisory control unit 14, and the reserve optical transmitter/receiver 11-1p to 11-np are selected.

It should be noted that either a configuration wherein either the current-use optical transmitter/receiver 11-1w to 11-nw or the reserve optical transmitter/receiver 11-1p to 11-np are set to the ON state and the others are set to the OFF state, or a configuration wherein an electric signal is changed so it is input/output at the current-use optical transmitter/receiver 11-1w to 11-nw or at the reserve optical transmitter/receiver 11-1p to 11-np can also be employed.

SECOND EMBODIMENT (Wavelength Allocation)

Figure 7:
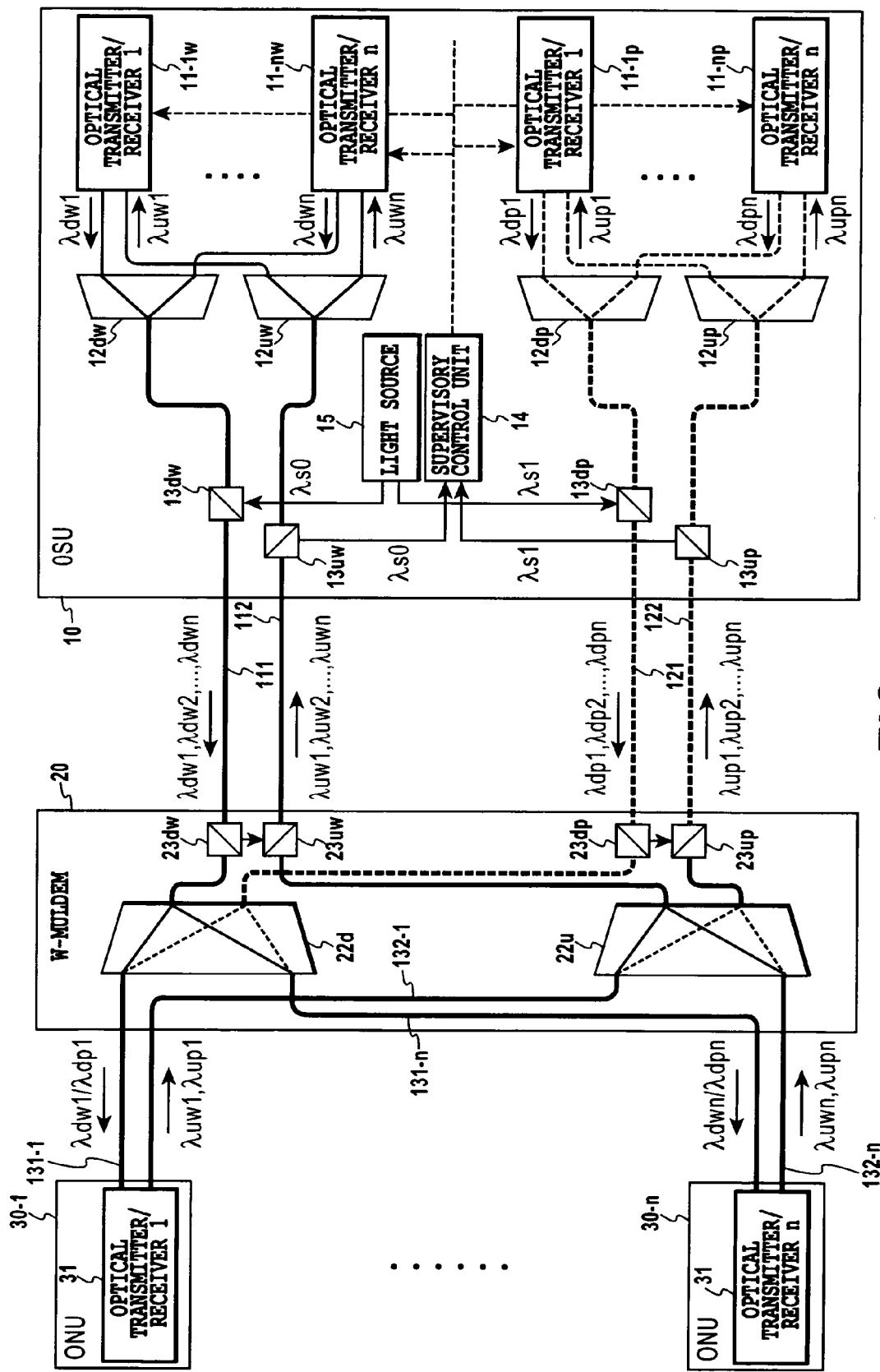
FIG. 7 is a diagram showing an optical wavelength division multiplexing access system according to a second embodiment of the present invention.

In FIG. 7 is shown an optical wavelength division multiplexing access system according to a second embodiment of the present invention. For the sake of the explanation, the appended portion for wavelength λ is changed; λdw1 to λdwn/λuw1 to λuwn are employed instead of λd1 to λdn/λu1 to λun for the current-use optical signals; and λdp1 to λdpn/λup1 to λupn are employed instead of λd1+Δλ to λdn+Δλ/λu1+Δλ to λun+Δλ for the reserve optical signals.

According to this embodiment, the optical wavelength division multiplexing access system comprises: a center node (OSU) 10, a W-MULDEM unit 20 and a plurality of optical network units (ONU) 30-1 to 30-n. The multiplexing section between the OSU 10 and the W-MULDEM unit 20 is established by extending a downstream current-use optical fiber 111 and a downstream redundant optical fiber 121, for transmitting downstream optical signals from the OSU to the individual ONUs, and an upstream current-use optical fiber 112 and an upstream redundant optical fiber 122, for transmitting upstream optical signals from the ONUs to the OSU. The access sections between the ONUs 30-1 to 30-n and the W-MULDEM unit 20 are established by extending downstream optical fibers 131-1 to 131-n, for transmitting downstream optical fibers to the ONUS, and upstream optical fibers 132-1 to 132-n, for transmitting upstream optical signals from the ONUs.

The OSU 10 includes: current-use optical transmitter/receiver 11-1w to 11-nw and reserve optical transmitter/receiver 11-1p to 11-np, which correspond to the individual ONUs 30; a downstream current-use AWG 12dw, which multiplexes the downstream optical signals that have wavelengths λdw1 to λdwn and have been received from the current-use optical transmitter/receiver 11-1w to 11-nw, and transmits the resultant optical signal to the downstream current-use optical fiber 111; and an upstream current-use AWG 12uw, which demultiplexes to the current-use optical transmitter/receiver 11-1w to 11-nw the upstream optical signals that have wavelengths λuw1 to λuwn and are received along the upstream current-use optical fiber 112. The OSU 10 further includes: a downstream reserve AWG 12dp, which multiplexes the downstream optical signals that have wavelengths λdp1 to λdpn and are received from the reserve transmission/reception units 11-1p to 11-np, and transmits the resultant signal to the downstream redundant optical fiber 121; and an upstream reserve AWG 12up, which demultiplexes to the reserve optical transmitter/receiver 11-1p to 11-np the upstream optical signals that have wavelengths λup1 to λupn and are received along the upstream redundant optical fiber 122.

The OSU 10 also includes: a light source 15, which outputs a current-use supervisory light having wavelength λs0 that differs from the wavelengths λdw1 to λdwn and λuw1 to λuwn, and a reserve supervisory light, which has a wavelength λs1 that differs from the wavelengths λdp1 to λdpn and λup1 to λupn; and a supervisory control unit 14, which detects the supervisory light having wavelengths Δs0 and λs1, after their transmission along the current-use optical fiber and the redundant optical fiber has been completed, and which transmits a select signal.

Means for selecting the downstream current-use optical fiber 111 or the downstream redundant optical fiber 121 for use in transmission can be a configuration wherein, in accordance with a select signal received from the supervisory control unit 14, either the current-use optical transmitter/receiver 11-1w to 11-nw or the reserve optical transmitter/receiver 11-1p to 11-np are set to the ON state and the others are set to the OFF state, or a configuration wherein an electric signal is changed that is to be transmitted to the current-use optical transmitter/receiver 11-1w to 11-nw or to the reserve optical transmitter/receiver 11-1p to 11-np. Further, means for selecting the upstream current-use optical fiber 112 or the upstream redundant optical fiber 122 can be a configuration wherein, in accordance with a select signal received from the supervisory control unit 14, either the current-use optical transmitter/receiver 11-1w to 11-nw or the reserve optical transmitter/receiver 11-1p to 11-np are set to the ON state and the others are set to the OFF state, or a configuration wherein an electric signal is changed that is to be output by the current-use optical transmitter/receiver 11-1w to 11-nw or to the reserve optical transmitter/receiver 11-1p to 11-np.

Optical transmission/reception circuits 31 of the ONUs 30-1 to 30-n receive, through the downstream optical fibers 131 at the access sections, the downstream optical signals having wavelengths λdw1 to λdwn or λdp1 to λdpn. Further, for the transmission of upstream optical signals along the upstream current-use optical fiber 112 at the multiplexing section, the upstream optical signals having wavelengths λuw1 to λuwn are selected and transmitted to the upstream optical fibers at the access sections, and for the transmission of upstream optical signals along the upstream redundant optical fiber 122, upstream optical signals having wavelengths λup1 to λupn are selected.

The W-MULDEM unit 20 is constituted by a downstream AWG 22d and an upstream AWG 22u. The downstream AWG 22d includes: two ports, W and P, that are connected to the downstream current-use optical fiber 111 and the downstream redundant optical fiber 121 at the multiplexing section; and n ports #1 to #n, which are connected to the downstream optical fibers 131 at the access sections that correspond to the ONUs. The upstream AWG 22u includes: n ports #1 to #n, which are connected to the upstream optical fibers 132 at the access sections that correspond to the ONUs; and two ports W and P, which are connected to the upstream current-use optical fiber 112 and the upstream redundant optical fiber 122 at the multiplexing section.

The downstream optical signals having wavelengths λdw1 to λdwn, which are received at the port W of the downstream AWG 22d along the downstream current-use optical fiber 111, or the downstream optical signals having wavelengths λdp1 to λdpn, which are received at the port P along the downstream redundant optical fiber 112, are branched to the ports #1 to #n that correspond to the ONUs. On the other hand, the upstream optical signals having wavelengths λuw1 to λuwn, which are received at the ports #1 to #n of the upstream AWG 22u along the optical fibers that correspond to the ONUs, are merged at the port W that corresponds to the upstream current-use optical fiber 112, and the upstream optical signals having wavelengths λup1 to λupn, are merged at the port P that corresponds to the upstream redundant optical fiber 122.

When an optical amplifier is required because the loss, for example, of an optical fiber is increased, an optical fiber may be connected to the downstream current-use (or reserve) optical fiber in order to collectively amplify the downstream optical signals that were multiplexed immediately before they reached the port W (or P) of the AWG 22d. Similarly, for the upstream current-use (or reserve) optical fiber, an optical amplifier may be connected in order to collectively amplify the upstream optical signals that were multiplexed immediately after they reached the port W (or P) of the AWG 22u.

A multiplexing unit 13dw, for multiplexing the supervisory light having wavelength λs0 and the downstream signal light having wavelengths λdw1 to λdwn, and a demultiplexing unit 23dw, for demultiplexing the supervisory light having wavelength λs0 from the downstream signal light having wavelengths λdw1 to λdwn, are provided for the downstream current-use optical fiber 111. A multiplexing unit 23uw, for multiplexing the supervisory light having wavelength λs0 and the upstream signal light having wavelengths λuw1 to λuwn, and a demultiplexing unit 13uw, for demultiplexing the supervisory light having wavelength λs0 from the upstream signal light having wavelengths λuw1 to λuwn, are provided for the upstream current-use optical fiber 112. A multiplexing unit 13dp, for multiplexing the supervisory light having wavelength λs1 and the downstream signal light having wavelengths λdp1 to λdpn, and a demultiplexing unit 23dp, for demultiplexing the supervisory light having wavelength λs1 from the downstream signal light having wavelengths λdp1 to λdpn, are provided for the downstream redundant optical fiber 121. A multiplexing unit 23up, for multiplexing the supervisory light having wavelength λs1 and the upstream signal light having wavelengths λup1 to λupn, and a demultiplexing unit 13up, for demultiplexing the supervisory light having wavelength λs1 from the upstream signal light having wavelengths λup1 to λupn, are provided for the upstream redundant optical fiber 122.

When a failure occurs in the current-use optical fiber, the downstream optical signals having wavelengths λdp1 to λdpn need only be multiplexed in accordance with the select signal received from the supervisory control unit 14, so that these signals can be transmitted along the downstream redundant optical fiber 121 to the individual ONUs 30-1 to 30-n. The optical transmitters 31 of the ONUs 30-1 to 30-n transmit the upstream optical signals having wavelengths λuw1 to λuwn, which are to be transferred along the upstream current-use optical fiber 112 at the multiplexing section, and transmits the upstream optical signals having λup1 to λupn, which are to be transferred along the upstream redundant optical fiber 122. Further, in accordance with a selection signal received from the supervisory control unit 14, the optical receivers 11-1w to 11-nw or 11-1p to 11-np are selected in order to receive the upstream optical signals having wavelengths λuw1 to λuwn or λup1 to λupn.

Figure 8A:
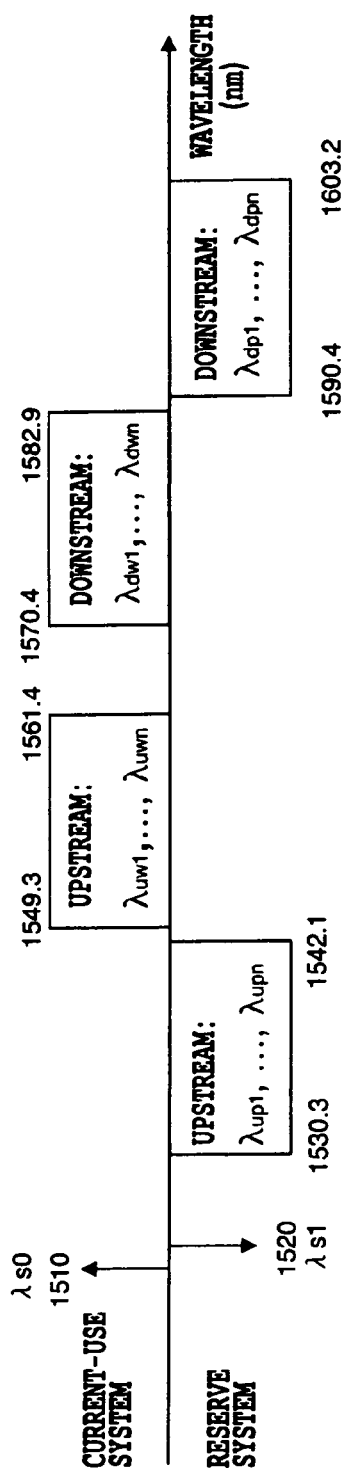
FIGS. 8A and 8B are diagrams showing wavelength allocation according to the second embodiment.

In FIG. 8A is shown a wavelength allocation for the second embodiment. Assume that wavelengths λdw1 to λdwn are defined as 1570.4 to 1582.9 nm, wavelengths λuw1 to λuwn are defined as 1546.3 to 1561.4 nm, wavelength λdp1 to λdpn are defined as 1590.4 to 1603.2 nm, and wavelengths λup1 to λupn are defined as 1530.3 to 1542.1 nm. Further, assume that wavelength λs0 is defined as 1510 nm and wavelength λs1 is defined as 1520 nm, so that a different range can be allocated for each wavelength.

Figure 8B:
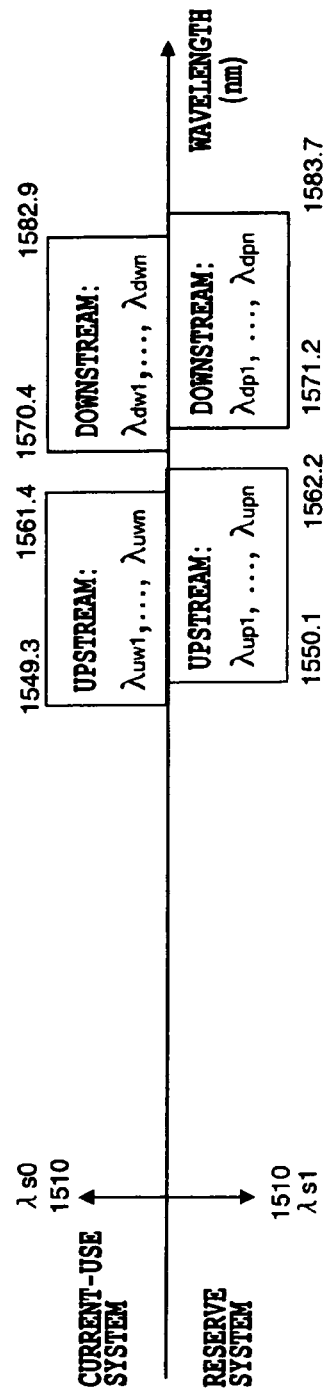

Another example for the wavelength allocation is shown in FIG. 8B. Assume that wavelengths λdw1 to λdwn are defined as 1570.4 to 1582.9 nm, wavelengths λuw1 to λuwn are defined as 1546.3 to 1561.3 nm, wavelengths λdp1 to λdpn are defined as 1571.2 to 1583.7 nm, and wavelengths λup1 to λupn are defined as 1550.1 to 1562.2 nm. Further, assume that wavelength λs0 is defined as 1510 nm and wavelength λs1 is defined as 1510 nm, so that a wavelength band may overlap for the current-use system and for the reserve system, or the same wavelength may be allocated as λs0 and λs1.

In the examples in both FIG. 8A and FIG. 8B, as well as in the first embodiment, the wavelength difference Δλ between the current-use system and the reserve system is designated in accordance with the locations of the ports of the AWG 22. It should be noted that when the wavelength bands for the current-use system and for the reserve system overlap, and when a failure has occurred in an optical transmission/reception unit, not only the pertinent optical transmission/reception unit, but all the other optical transmitter/receiver should be replaced.

According to this embodiment, since the downstream AWG 22d and the upstream AWG 22u are provided independently, unlike in the first embodiment, the difference between the wavelengths of the downstream optical signal and the upstream optical signal need not be set as an aFSR, and an arbitrary difference can be designated. Thus, switching between the current-use system and the reserve system can be passively performed by using two AWGs, with the dual optical fiber strands being provided for the multiplexing section.

(Current-Use and Reserve-Use Switching Configuration Employing Optical Switches)

Figure 9:
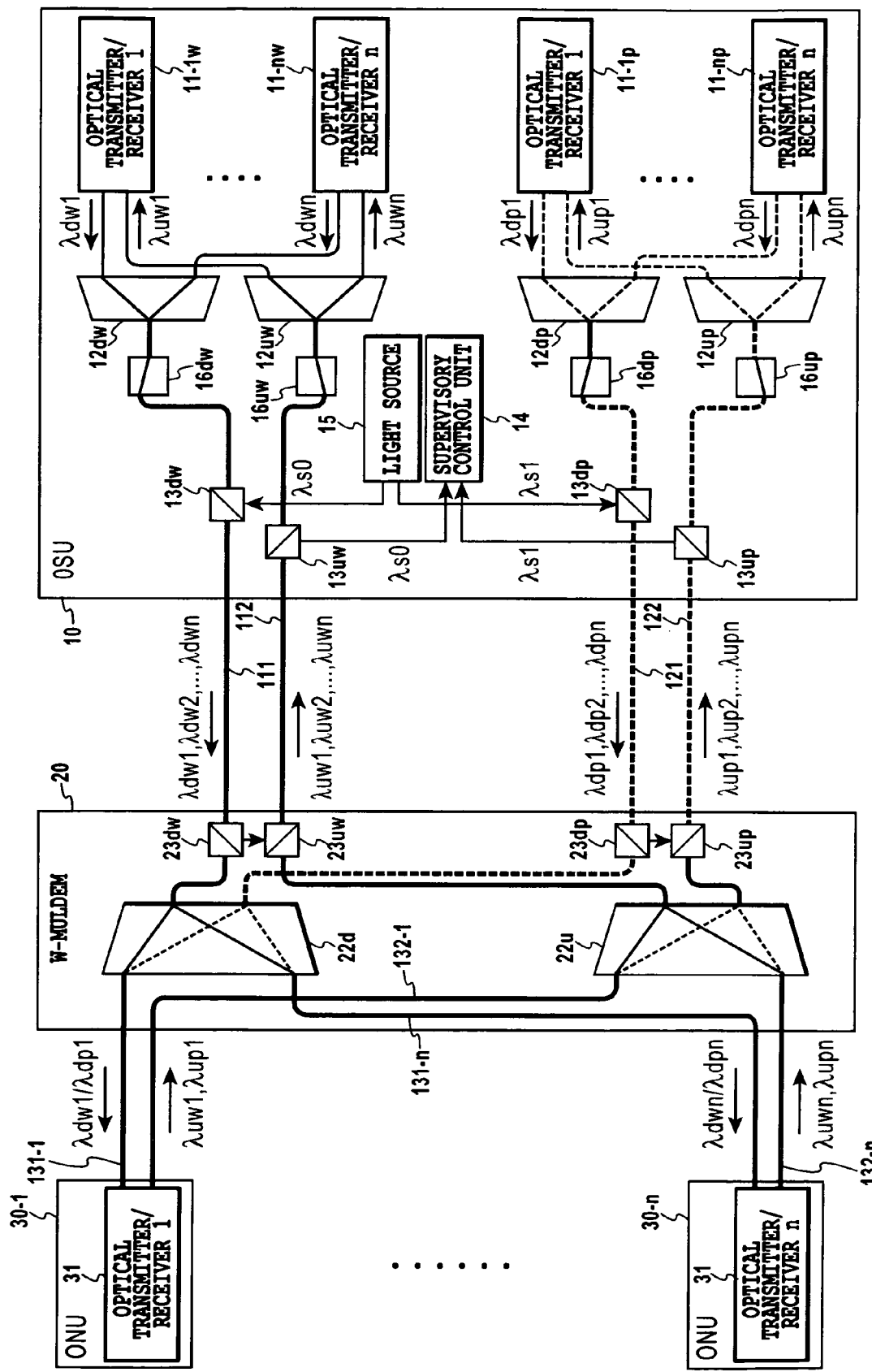
FIG. 9 is a diagram showing a first example current-use and reserve-use switching configuration according to the second embodiment.

In FIG. 9 is shown a current-use and a reserve-use switching configuration, according to the second embodiment, that employs optical switches. The OSU 10 also includes: an optical switch 16dw, used to set ON or OFF for the output of the downstream optical signals having wavelengths λdw1 to λdwn to the downstream current-use optical fiber 111; and an optical switch 16uw, used to set to ON or OFF the output, to the upstream current-use demultiplexing unit 12uw, of the upstream optical signals that have wavelengths λuw1 to λuwn and have been received along the upstream current-use optical fiber 112. The OSU 10 further includes: an optical switch 16dp, used to set to ON or OFF the output, to the downstream redundant optical fiber 121, of the down optical signals having wavelengths λdp1 to λdpn; and an optical switch 16up, used to set to ON or OFF the output, to the upstream reserve demultiplexing unit 12up, of the upstream optical signals that have wavelengths λup1 to λupn and are received along the upstream redundant optical fiber 122.

In this embodiment, for a transmission along the downstream current-use optical fiber 111, the optical switch 16dw is set to the ON state while the optical switch 16dp is set to the OFF state, and for a transmission along the downstream redundant optical fiber 112, the optical switch 16dw is set to the OFF state while the optical switch 16dp is set to the ON state. Further, when the upstream current-use optical fiber 112 is to be selected to receive the upstream optical signals transmitted by the ONUs 30, the optical switch 16$uw$ is set to the ON state and the optical switch 16$up$ is set to the OFF state. When the upstream redundant optical fiber 122 is to be selected to receive the upstream optical signals transmitted by the ONUs 30, the optical switch 16$uw$ is set to the OFF state and the optical switch 16$up$ is set to the ON state.

When a failure occurs in the downstream current-use optical fiber 111, the states of the optical switches 16$dw$ and 16$dp$ are changed in accordance with a selection signal received from the supervisory control unit 14, so that the downstream optical signals addressed to the ONUs 30 are transmitted along the downstream redundant optical fiber 112. The optical transmitter/receiver 31 of the ONUs 30 transmit the upstream optical signals having wavelengths λuw1 to λuwn, which are to be transferred along the upstream current-use optical fiber 112 at the multiplexing section, and the upstream optical signals having wavelengths λup1 to λupn, which are to be transferred along the upstream redundant optical fiber 122. Further, the states of the optical switches 16$uw$ and 16$up$ are changed in accordance with a selection signal received from the supervisory control unit 14, and the upstream optical signals having wavelengths λu1 to λun, or λup1 to λupn, are received.

Further, when a failure occurs in one of the current-use optical transmitter/receiver 11-1$w$ to 11-$nw$ of the OSU 10, the state of the optical switch 16 is changed in accordance with a selection signal from the supervisory control unit 14, and the reserve optical transmitter/receiver 11-1$p$ to 11-$np$ can be selected. The configuration wherein the W-MULDEM unit 20 is constituted only by passive parts need only be provided to switch between the current-use system and the reserve system for the optical fibers at the multiplexing section and for the optical transmitter/receiver of the OSU 10.

(Configuration for Current-Use and Reserve-Use Switching by Employing Optical Switches and by Performing a Loopback Process)

Figure 10:
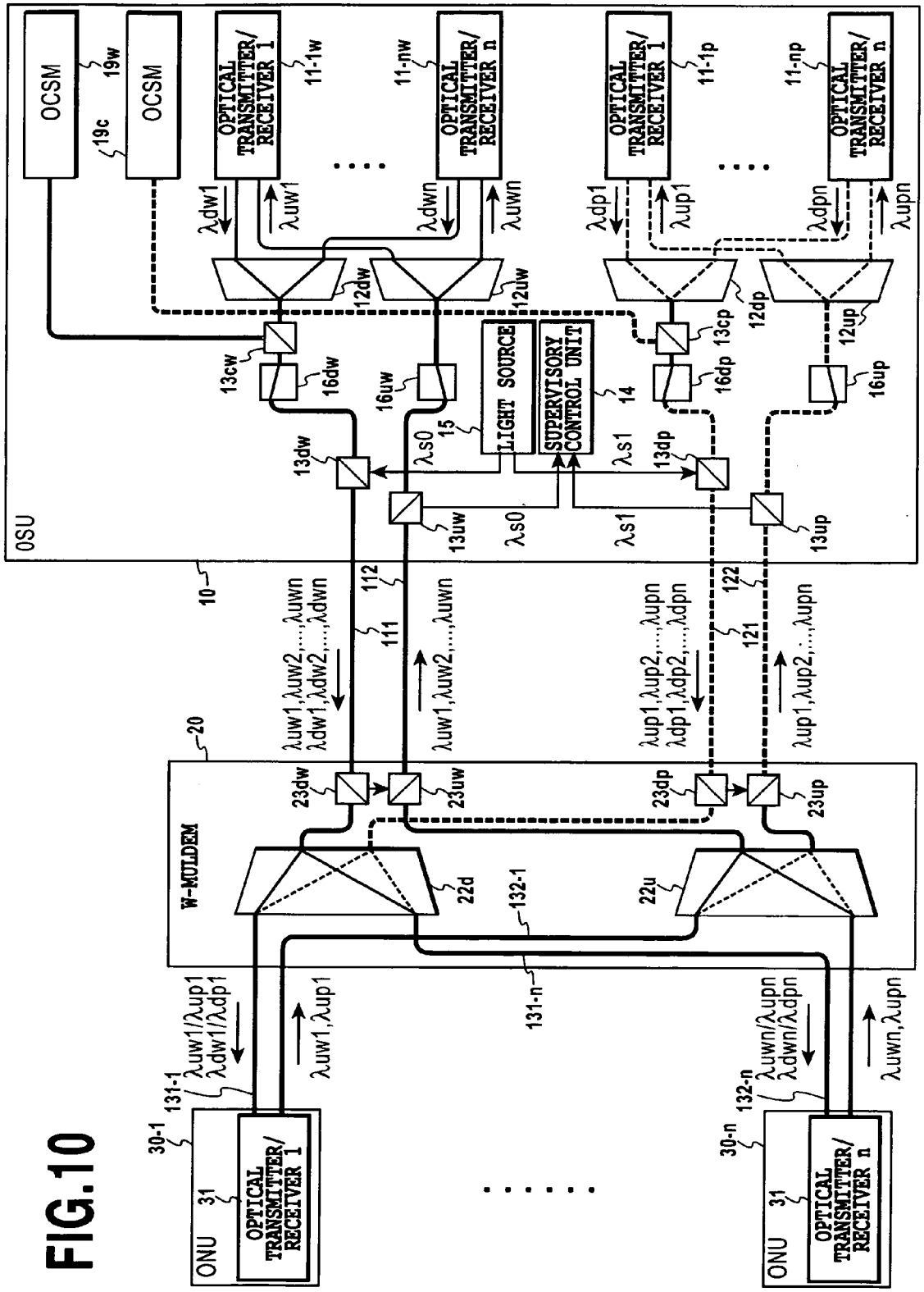
FIG. 10 is a diagram showing a second example current-use and reserve-use switching configuration according to the second embodiment.

In FIG. 10 is shown a configuration that performs current-use and reverse-use switching by employing the optical switches used for the second embodiment, and by performing a loopback process. In the configuration in the above example, each of the ONUs 30 includes a light source, modulates an optical carrier emitted by the light source, and generates an upstream optical signal. However, in the following example, each of the ONUs 30 receives an optical carrier from the OSU 10, modulates the optical carrier, and returns the result as an upstream optical signal. The configuration as in the example shown in FIG. 9 is also employed for an optical wavelength division multiplexing access system according to this example, except for additionally providing an arrangement wherein the OSU 10 supplies to each of the ONUs 30 an optical carrier for an upstream signal.

The OSU 10 additionally includes: an optical carrier supply module (OCSM) 19$w$, which collectively generates optical carriers, used for upstream optical signals, that have wavelengths λuw1 to λuwn and are to be transferred to the ONUs 30 along the downstream current-use optical fiber 111; a WDM coupler 13$cw$, which multiplexes the optical carriers for upstream signals and transmits the resultant carrier to the downstream current-use optical fiber 111; an optical carrier supply module (OCSM) 19$p$, which collectively generates optical carriers, used for upstream signals, that have wavelengths λup1 to λupn and are to be supplied to the ONUs 30 along the redundant optical fiber 121; and a WDM coupler 13$cp$, which multiplexes the optical carriers for upstream signals and transmits the resultant carrier to the downstream redundant optical fiber 121.

The optical carrier supply modules (OCSMs) can be a plurality of single-wavelength laser beam sources, the wavelengths of which differ, and a multi-wavelength light source that is constituted by a light multiplexing unit that multiplexes the output beams or a multi-wavelength collective oscillation light source described in document 1.

The OSU 10 also includes: a WDM coupler 13$cw$, which multiplexes the optical carriers for upstream signals, and have wavelengths λuw1 to λuwn, and transmits the resultant carrier to the downstream current-use optical fiber 111; and a WDM coupler 13$cp$, which multiplexes the optical carriers for upstream signals, and have wavelengths λup1 to λupn, and transmits the resultant carrier to the downstream redundant optical fiber 121. An AWG 17$c$ includes: two ports W and P, which are connected to the downstream current-use optical fiber 111 and the downstream redundant optical fiber 121 extended at the multiplexing section; and n ports #1 to #n, which are connected to tunable light sources 19-1 to 19-$n$ and which output optical carriers for upstream signals.

The optical transmission/reception circuits 31 of the ONUs 30-1 to 30-$n$ include optical modulators, which modulate the optical carriers for upstream signals that have wavelengths λuw1 to λuwn and are supplied by the OSU 10, and which obtain upstream signals.

The AWG 22$d$ of the W-MULDEM unit 20 receives, at port W along the downstream current-use optical fiber 111, the downstream optical signals that have wavelengths λdw1 to λdwn and the optical carriers for upstream signals that have wavelengths λuw1 to λuwn, and demultiplexes these signals to the ports #1 to #n corresponding to the ONUs 30. Also, the AWG 22$d$ receives, at port P along the downstream redundant optical fiber 121, the downstream optical signals having wavelengths λdp1 to λdpn and the optical carriers for upstream signals that have wavelengths λup1 to λupn, and demultiplexes these signals to the ports #1 to #n corresponding to the ONUs 30.

In this embodiment, when the current-use optical fiber 101 is to be employed, the optical transmitter/receiver 18-1 to 18-$n$ and the tunable light sources 19-1 to 19-$n$ transmit the downstream optical signals that have wavelengths λdw1 to λdwn and the optical carriers for upstream signals that have wavelengths λuw1 to λuwn. The downstream optical signals having wavelengths λdw1 to λdwn are multiplexed by the downstream AWG 17$d$, and the resultant signal is output to the downstream current-use optical fiber 111. The optical carriers for upstream signals that have wavelengths λuw1 to λuwn are multiplexed by the AWG 17$c$, and the resultant carrier is output by the WDM coupler 13$cw$ to the downstream current-use optical fiber 111. The optical carriers for upstream signals are modulated by the optical modulators of the ONUs 30, and upstream signals that are obtained are transmitted to the W-MULDEM unit 20.

When a failure occurs in the downstream current-use optical fiber 111, the states of the optical switches 16$dw$ and 16$dp$ are changed in accordance with a selection signal received from the supervisory control unit 14, and the downstream optical signals to be transferred to the ONUs 30 are transmitted along the downstream redundant optical fiber 112. Further, the optical transmitter/receiver 31 of the ONUs 30 transmit the upstream optical signals having wavelengths λuw1 to λuwn, which are to be transferred along the upstream current-use optical fiber 112 at the multiplexing section, and the upstream optical signals having wavelengths λup1 to λupn, which are to be transferred along the upstream redundant optical fiber 122. Then, the states of the optical switches 16$uw$ and 16$up$ are changed in accordance with a selection signal transmitted by the supervisory control unit 14, and the upstream optical signals having wavelengths $\lambda u1$ to $\lambda un$, or $\lambda up1$ to $\lambda upn$, are received.

In addition, when a failure has occurred in one of the current-use optical transmitter/receiver 11-1$w$ to 11-$nw$ of the OSU 10, the state of the optical switch 16 is changed in accordance with the select signal from the supervisory control unit 14, and the reserve optical transmitter/receiver 11-1$p$ to 11-$np$ can be selected. The configuration wherein the W-MULDEM unit 20 is constituted only by passive parts need only be provided to switch between the current-use system and the reserve system for the optical fibers at the multiplexing section, and for the optical transmitter/receiver of the OSU 10.

(Configuration for Current-Use and Reserve-Use Switching by Varying a Wavelength)

Figure 11:
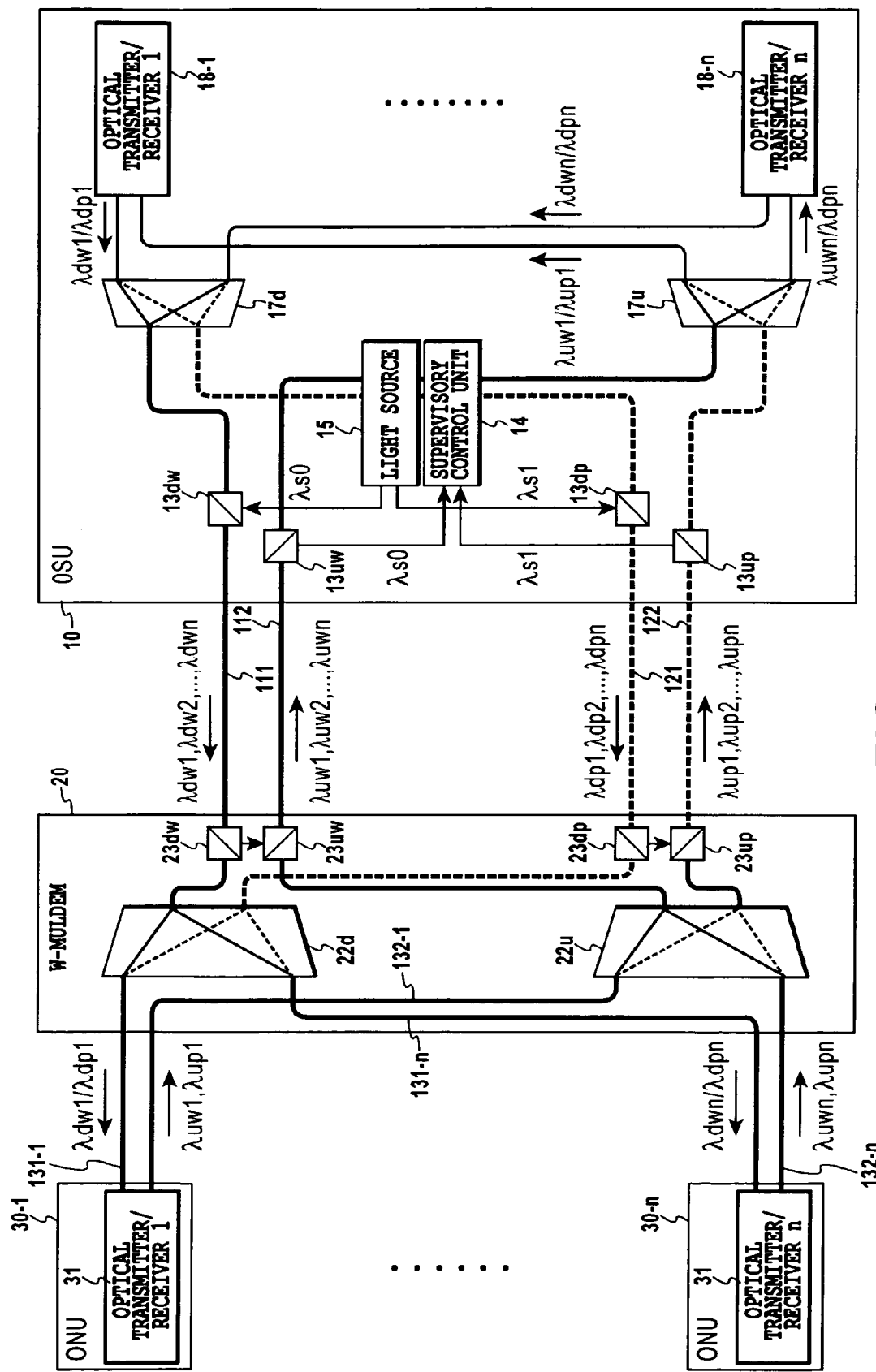
FIG. 11 is a diagram showing a third example current-use and reserve-use switching configuration according to the second embodiment.

In FIG. 11 is shown the configuration according to the second embodiment in which the wavelengths of the optical transmitter/receiver are changed to perform the current-use and reserve-use switching. The OSU 10 includes: optical transmitter/receiver 18-1 to 18-$n$, which transmit downstream optical signals by selecting either wavelength $\lambda dwk$ or $\lambda dpk$ ($1 \leq k \leq n$; $\lambda dpk = \lambda dwk + \Delta\lambda d$ ($\Delta\lambda d$ is a constant value)) from among wavelengths $\lambda dw1$ to $\lambda dwn$ and wavelengths $\lambda dp1$ to $\lambda dpn$ that are consonant with the individual ONUs 30, and which receive the upstream optical signals having wavelengths $\lambda uw1$ to $\lambda uwn$, or $\lambda up1$ to $\lambda upn$; and the downstream AWG 17$d$ and the upstream AWG 17$u$.

The downstream AWG 17$d$ includes: two ports W and P, which are connected to the downstream current-use optical fiber 111 and the downstream redundant optical fiber 121 at the multiplexing section; and n ports #1 to #n, which are connected to the output ports of the optical transmitter/receiver 18-1 to 18-$n$. The upstream AWG 17$u$ includes: n ports #1 to #n, which are connected to the output ports of the optical transmitter/receiver 18-1 to 18-$n$; and two ports W and P, which are connected to the upstream current-use optical fiber 112 and the upstream redundant optical fiber 122 at the multiplexing section.

The ONUs 30-1 to 30-$n$ includes: optical transmitter/receiver 31, which transmit the upstream optical signals by selecting either wavelength $\lambda upk$ or $\lambda upk$ ($1 \leq k \leq n$; $\lambda upk = \lambda uwk + \Delta\lambda u$ ($\Delta\lambda u$ is a constant value)) from among wavelengths $\lambda uw1$ to $\lambda uwn$ and wavelengths $\lambda up1$ to $\lambda upn$.

For transmission along the downstream current-use optical fiber 111, the optical transmitter/receiver 18-1 to 18-$n$ of the OSU 10 select and transmit the downstream optical signals having wavelengths $\lambda dw1$ to $\lambda dwn$, and the downstream AWG 17$d$ multiplexes these signals and transmits the resultant signal along the downstream current-use optical fiber 111. In the W-MULDEM unit 20, the downstream AWG 22$d$ demultiplexes the downstream optical signal, and the optical transmitter/receiver of the individual ONUs 30 receive the demultiplexed signals. For transmission along the upstream current-use optical fiber 112, the optical transmitter/receiver 31 of the ONUs 30 select and transmit the upstream optical signals having wavelengths $\lambda uw1$ to $\lambda uwn$, and in the W-MULDEM unit 20, the AWG 22$u$ multiplexes these signals and transmits the resultant signal to the upstream current-use optical fiber 112. The AWG 17$u$ of the OSU 10 demultiplexes the upstream optical signal, and the optical transmitter/receiver 18-1 to 18-$n$ of the OSU 10 receive the demultiplexed signals.

When a failure occurs in the current-use optical fiber, the wavelengths selected by the optical transmitter/receiver 18-1 to 18-$n$ of the OSU 10 are changed to $\lambda dp1$ to $\lambda dpn$, in accordance with a selection signal obtained from the supervisory control unit 14. Then, the downstream optical signals are output to port P of the downstream AWG 17$d$ for transfer along the downstream redundant optical fiber 121. In the same manner, the wavelengths of the upstream optical signals, which are to be transmitted by the optical transmitter/receiver 31 of the ONUs 30, are also changed to $\lambda up1$ to $\lambda upn$ for transfer along the upstream redundant optical fiber 122.

As means for transmitting a select signal from the supervisory control unit 14 to the optical transmitter/receiver 31 of the ONUs 30, first, the select signal is transmitted by the supervisory control unit 14 to the optical transmitter/receiver 18-1 to 18-$n$ of the OSU 10. The optical transmitter/receiver 18-1 to 18-$n$ insert the select signal into the unused frames of the downstream signals, and transmit the obtained signals to the optical transmitter/receiver 31 of the ONUs 30. It should be noted that a failure occurring in the optical transmitter/receiver 18-1 to 18-$n$ can be coped with by providing the dual structure for the optical transmitter/receiver, and by employing the optical switches that select the current-use system or the reserve system.

(Configuration for Current-Use and Reserve-Use Switching by Varying Wavelengths and by Performing a Loopback Process)

Figure 12:
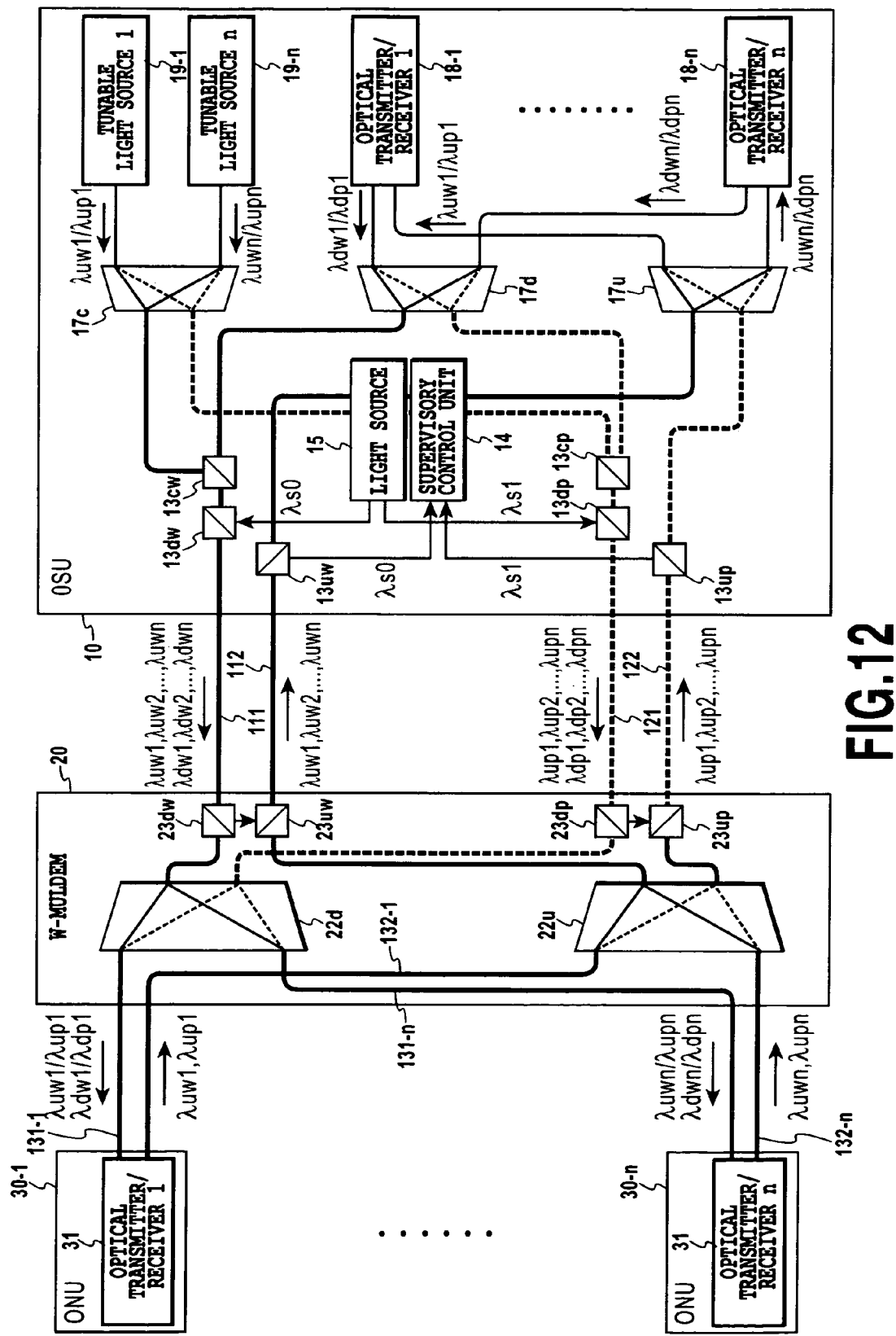
FIG. 12 is a diagram showing a fourth example current-use and reserve-use switching configuration according to the second embodiment.

In FIG. 12 is shown a configuration according to the second embodiment wherein the wavelengths of the optical transmitter/receiver are changed and the loopback process is performed for the current-use and reserve-use switching. According to the configuration in the above example, the ONUs 30 include light sources, and modulate optical carriers emitted by the light sources and generate upstream optical signals. In the following example, the OSU 10 supplies optical carriers to the ONUs 30, and the individual ONUs 30 modulate the received optical carriers and return the obtained carriers as upstream optical signals. The configuration for the example in FIG. 11 is also employed for an optical wavelength division multiplex access system for this example, except for additionally providing an arrangement for supplying optical carriers, used for upstream signals, by the OSU 10 to the ONUs 30.

The OSU 10 includes: tunable light sources 19-1 to 19-$n$, which select and output an optical carrier, used for an upstream signal, that has wavelength $\lambda uwk$ ($1 \leq k \leq n$) or wavelength $\lambda upk$ ($=\lambda uwk + \Delta\lambda u$; $1 \leq k \leq n$), so as to supply the optical carrier to the ONUs 30 along the downstream current-use optical fiber 111; and the AWG 17$c$, which multiplexes the optical carriers for upstream signals that have wavelengths $\lambda uw1$ to $\lambda uwn$ or $\lambda up1$ to $\lambda upn$ and have been received from the tunable light sources 19-1 to 19-$n$, and outputs the resultant signal to both the downstream current-use optical fiber 111 and the downstream redundant optical fiber 121.

The OSU 10 also includes: the WDM coupler 13$cw$, which multiplexes the optical carriers for upstream signals that have wavelengths $\lambda uw1$ to $\lambda uwn$ and transmits the resultant carrier to the downstream current-use optical fiber 111; and a WDM coupler 13$cp$, which multiplexes the optical carriers for upstream signals that have wavelengths $\lambda up1$ to $\lambda upn$ and transmits the resultant carrier to the downstream redundant optical fiber 121. The AWG 17$c$ includes: two ports W and P, which are connected to the downstream current-use optical fiber 111 and the downstream redundant optical fiber 121 at the multiplexing section; and n ports #1 to #n, which are connected to the tunable light sources 19-1 to 19-$n$ that output the optical carriers for upstream signals.

The optical transmission/reception circuits 31 of the ONUs 30-1 to 30-n include optical modulators, which modulate the optical carriers for upstream signals that have wavelengths λuw1 to λuwn or λup1 to λupn and are supplied by the OSU 10 and obtain upstream signals.

The AWG 22d of the W-MULDEM unit 20 receives, at the port W along the downstream current-use optical fiber 111, the downstream optical signals that have wavelengths λdw1 to λdwn and the optical carriers for upstream signals that have wavelengths λuw1 to λuwn, and demultiplexes these signals to the ports #1 to #n that correspond to the ONUs 30. Furthermore, the AWG. 22d receives, at the port P along the downstream redundant optical fiber 121, the downstream optical signals that have wavelengths λdp1 to λdpn, and the optical carriers for upstream signals that have wavelengths λup1 to λupn, and sorts these signals to the ports #1 to #n that correspond to the ONUs 30.

In this embodiment, when the current-use optical fiber 101 is employed, the optical transmitter/receiver 18-1 to 18-n and the tunable light sources 19-1 to 19-n transmit the downstream optical signals that have wavelengths λdw1 to λdwn and the optical carriers for upstream signals that have wavelengths λuw1 to λuwn. The downstream AWG 17d multiplexes the downstream optical signals having wavelengths λdw1 to λdwn, and outputs the resultant signal to the downstream current-use optical fiber 111. The AWG 17c multiplexes the optical carriers for upstream signals that have wavelengths λuw1 to λuwn, and the WDM coupler 13cw outputs the resultant signal to the downstream current-use optical fiber 111. The light modulators of the ONUs 30 modulate the optical carriers for upstream signals and output the obtained upstream signals to the W-MULDEM unit 20.

When a failure occurs in the current-use optical fiber, a select signal is transmitted from the supervisory control unit 14 to the optical transmitter/receiver 18-1 to 18-n and the tunable light sources 19-1 to 19-n. The downstream optical signals that have wavelengths λdp1 to λdpn and the optical carriers for upstream signals having wavelengths λup1 to λupn are changed, so that the optical fiber to be used is changed to the redundant optical fiber. Furthermore, a failure that occurs in the optical transmitter/receiver 18-1 to 18-n can be coped with by providing a dual structure for the optical transmitter/receiver, and by employing the optical switches that select either the current-use system or the reserve system.

THIRD EMBODIMENT

Figure 13:
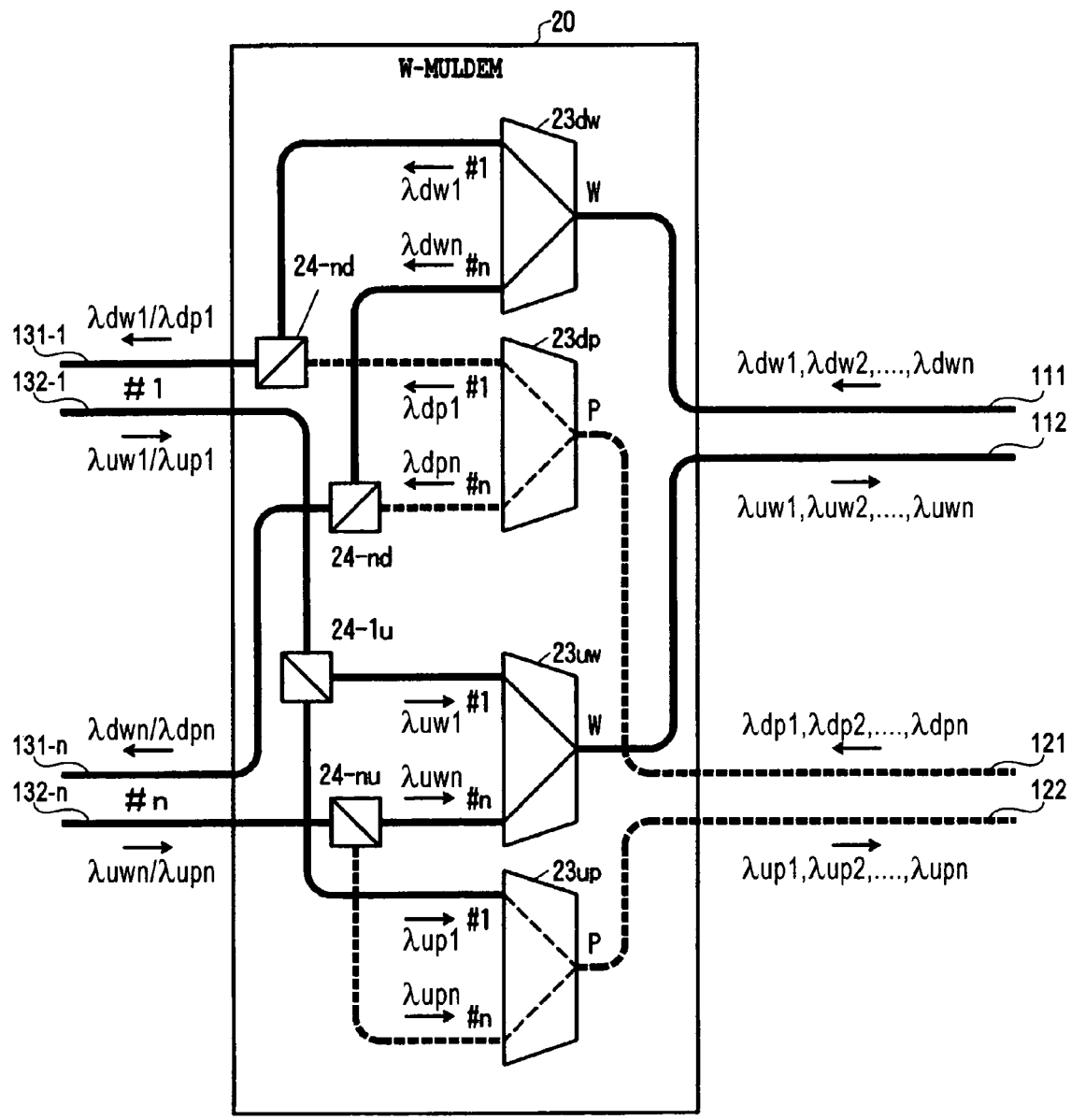
FIG. 13 is a diagram showing an optical wavelength division multiplexing access system according to a third embodiment of the present invention.

In FIG. 13 is shown an optical wavelength division multiplexing access system according to a third embodiment of the present invention. Since multiplexing sections extended between an OSU 10 and ONUs 30-1 to 30-n and extended between the OSU 10 and a W-MULDEM unit 20, and access sections between the individual ONUs 30 to 30-n and the W-MULDEM unit 20 are the same as those for the second embodiment, only the configuration of the W-MULDEM unit 20 is shown here.

The downstream AWG 22d of the second embodiment has a configuration wherein the current-use downstream optical signal received at the port W and the reserve downstream optical signal received at the port P are distributed to the ports #1 to #n. In this embodiment, a special downstream current-use multiplexing/demultiplexing unit 23dw and a special reserve multiplexing/demultiplexing unit 23dp are employed. Further, in the second embodiment, the upstream AWG 22u has a configuration wherein the current-use downstream optical signals received at the ports #1 to #n are merged at the port W, and the reserve downstream optical signals are merged at the port P. In this embodiment, a special upstream current-use multiplexing/demultiplexing unit 23uw and a special upstream reserve multiplexing/demultiplexing unit 23up are employed.

So long as multiplexing or demultiplexing for the one-to-n correspondence can be performed, the downstream current-use multiplexing/demultiplexing unit 23dw, the downstream reserve multiplexing/demultiplexing unit 23dp, the upstream current-use multiplexing/demultiplexing unit 23uw and the upstream reserve multiplexing/demultiplexing unit 23up need not always be AWGs.

Downstream optical signals having wavelengths λdw1 to λdwn, received along a downstream current-use optical fiber 111, are sorted by the downstream current-use multiplexing/demultiplexing unit 23dw. Downstream optical signals having wavelengths λdp1 to λdpn, received along a downstream redundant optical fiber 121, are sorted by the downstream reserve multiplexing/demultiplexing unit 23dp. Wavelength group filters 24-1d to 24-nd transmit, to downstream optical fibers corresponding to the ONUs 30, the downstream optical signals having wavelengths λdw1 to λdwn, or λdp1 to λdpn.

Upstream optical signals having wavelengths λuw1 to λuwn, or λup1 to λupn, received from the optical fibers corresponding to the ONUs 30, are transmitted through wavelength group filters 24-1u to 23-nu to corresponding ports #1 to #n of the upstream current-use multiplexing/demultiplexing unit 23uw or the upstream reserve multiplexing/demultiplexing unit 23up. The upstream optical signals having wavelengths λuw1 to λuwn, which are received by the upstream current-use multiplexing/demultiplexing unit 23uw, are multiplexed, and the resultant signal is transmitted to the upstream current-use optical fiber 112. The upstream optical signals having wavelengths λup1 to λupn, which are received by the upstream reserve multiplexing/demultiplexing unit 23up, are multiplexed, and the resultant signal is transmitted to the upstream redundant optical fiber 122.

Figure 14A:
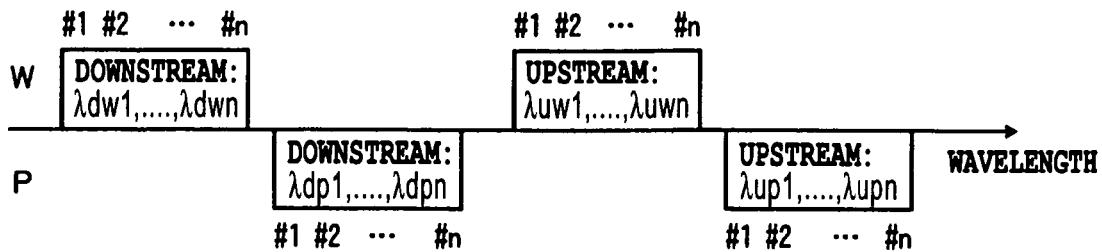
FIGS. 14A to 14C are diagrams showing example wavelength allocations according to the third embodiment.

In FIG. 14A are shown example wavelength allocations for the ports W and P and the ports #1 to #n of each multiplexing/demultiplexing unit. According to the configuration for this embodiment, the downstream current-use multiplexing/demultiplexing unit 23dw, the downstream reserve multiplexing/demultiplexing unit 23dp, the upstream current-use multiplexing/demultiplexing unit 23uw and the upstream reserve multiplexing/demultiplexing unit 23up are provided independently, and the wavelength group filters 24-1d to 24-nd multiplex the current-use and reserve signals, while the wavelength group filters 24-1u to 24-nu demultiplex the current-use signals from the reserve use signals. Therefore, the downstream current-use optical signals having wavelengths λdw1 to λdwn and the downstream reserve optical signals having wavelengths λdp1 to λdpn belong to different bands, and the upstream current-use optical signals having wavelengths λuw1 to λuwn and the upstream reserve optical signals having wavelengths λup1 to λupn belong to different bands.

Figure 14B:
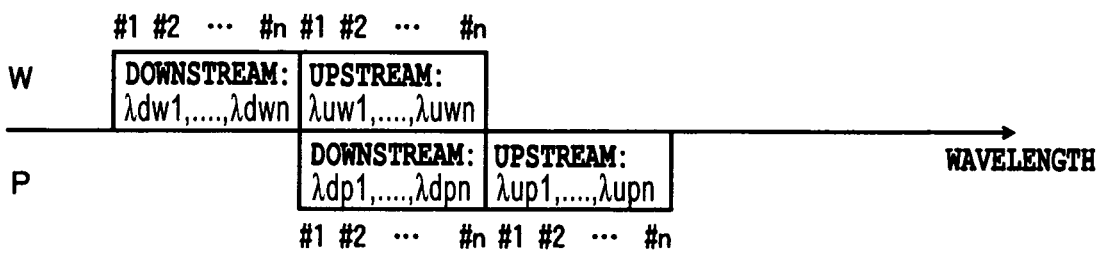
Figure 14C:
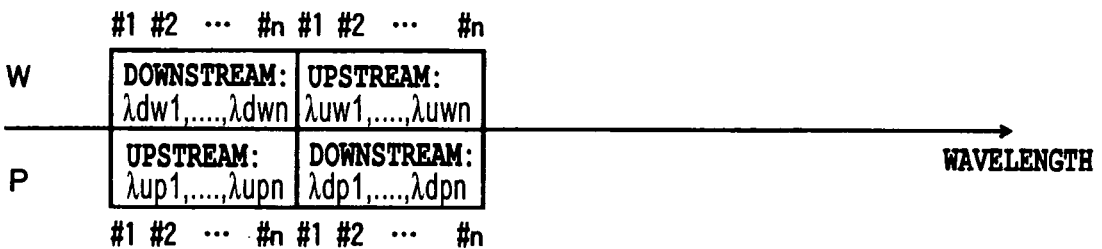

However, since the downstream optical signals and the upstream optical signals are independent of each other, the wavelengths can be equalized for the upstream current-use optical signals, for example, and the downstream reserve optical signals, as is shown in FIG. 14B. Furthermore, as is shown in FIG. 14C, the wavelengths can be equalized for the downstream current-use optical signals, for example, and the upstream reserve optical signals, and for the upstream current-use optical signals and the downstream reserve optical signals. As a result, switching between the current-use system and the reserve system can be passively performed by using four multiplexing/demultiplexing units, while a dual stranded optical fiber is obtained at the multiplexing section.

Specifically, for the transmission of downstream optical signals along the downstream current-use optical fiber 111 to the ONUs 30-1 to 30-n, the OSU 10 need only multiplex the downstream optical signals having wavelengths $\lambda dw1$ to $\lambda dwn$ that correspond to the individual ONUs 30, and for the transmission along the downstream redundant optical fiber 121, need only multiplex the downstream optical signals having wavelengths $\lambda dp1$ to $\lambda dpn$ that correspond to the ONUs 30. On the other hand, for the transmission of upstream optical signals along the upstream current-use optical fiber 112 at the multiplexing section, the ONUs 30-1 to 30-n need only transmit the upstream optical signals having wavelengths $\lambda uw1$ to $\lambda uwn$, and for the transmission along the upstream redundant optical fiber 122, need only transmit the upstream optical signals having wavelengths $\lambda up1$ to $\lambda upn$. Using this wavelength selection, the W-MULDEM unit 20 can passively switch between the current-use system and the reserve system.

FOURTH EMBODIMENT

According to this embodiment, the ONUs provided for the configuration in the third embodiment, shown in FIG. 13, are divided into two groups, #1 to #k and #k+1 to #n, and further, the downstream optical signals are divided into two wavelength groups $\lambda d1$ to $\lambda dk$ and $\lambda dk+1$ to $\lambda dn$. At this time, the wavelengths $\lambda d1$ to $\lambda$ for the current use and the wavelengths $\lambda +1$ to $\lambda dn$ as reserves are allocated to the ONUs #1 to #k, and the wavelengths $\lambda dk+1$ to $\lambda dn$ for the current use and the wavelengths $\lambda d1$ to $\lambda$ as reserves are allocated to the ONUs #k+1 to #n. The upstream optical signals are also divided into two wavelength groups, $\lambda u1$ to $\lambda uk$ and $\lambda uk+1$ to $\lambda un$. At this time, the wavelengths $\lambda u1$ to $\lambda uk$ for the current use and the wavelengths $\lambda uk+1$ to $\lambda un$ for the reserves are allocated to the ONUs #1 to #k, and the wavelengths $\lambda uk+1$ to $\lambda un$ for the current use and the wavelengths $\lambda u1$ to $\lambda uk$ for the reserves are allocated to the ONUs #k+1 to #n.

In FIG. 15A is shown an example wavelength allocation for the ports W and P and the ports #1 to #64 when n=64 and k=32. Specifically, the downstream current-use multiplexing/demultiplexing unit 23dw demultiplexes the downstream optical signals having wavelengths $\lambda d1$ to $\lambda d32$ and wavelengths $\lambda d33$ to $\lambda d64$ and demultiplexes them to the respective ports #1 to #64, and the downstream reserve multiplexing/demultiplexing unit 23dp demultiplexes the downstream optical signals having wavelengths $\lambda d33$ to $\lambda d64$ and wavelengths $\lambda d1$ to $\lambda d32$ and demultiplexes them to the respective ports #1 to #64. Then, wavelength group filters 24-1d to 24-nd couple the wavelength group $\lambda d1$ to $\lambda d32$ with the wavelength group $\lambda d33$ to $\lambda d64$.

The upstream current-use multiplexing/demultiplexing unit 23uw multiplexes the upstream optical signals having wavelengths $\lambda u1$ to $\lambda u32$ and wavelengths $\lambda u33$ to $\lambda u64$, which are received at the ports #1 to #64, and the upstream reserve multiplexing/demultiplexing unit 23up multiplexes the upstream optical signals having wavelengths $\lambda u33$ to $\lambda u64$ and wavelengths $\lambda u1$ to $\lambda u32$, which are received at the ports #1 to #64. Then, the wavelength group filters 24-1n to 24-nu couple the wavelength group $\lambda u1$ to $\lambda u32$ with the wavelength group $\lambda u33$ to $\lambda u64$.

Since the downstream optical signals (wavelengths $\lambda d1$ to $\lambda dn$) and the upstream optical signals (wavelengths $\lambda u1$ to $\lambda un$) are independent of each other, these signals may be set in different bands, as shown in FIG. 15B, or may be set in the same band, as is shown in FIG. 15C. In the second case, n wavelengths can be designated for the current-use system and the reserve system that correspond to n ONUs. Further, so long as multiplexing and demultiplexing can be performed with a one-to-n correspondence, the downstream current-use multiplexing/demultiplexing unit 23dw, the downstream reserve multiplexing/demultiplexing unit 23dp, the upstream current-use multiplexing/demultiplexing unit 23uw and the upstream reserve multiplexing/demultiplexing unit up need not always be AWGs.

FIFTH EMBODIMENT

Figure 16:
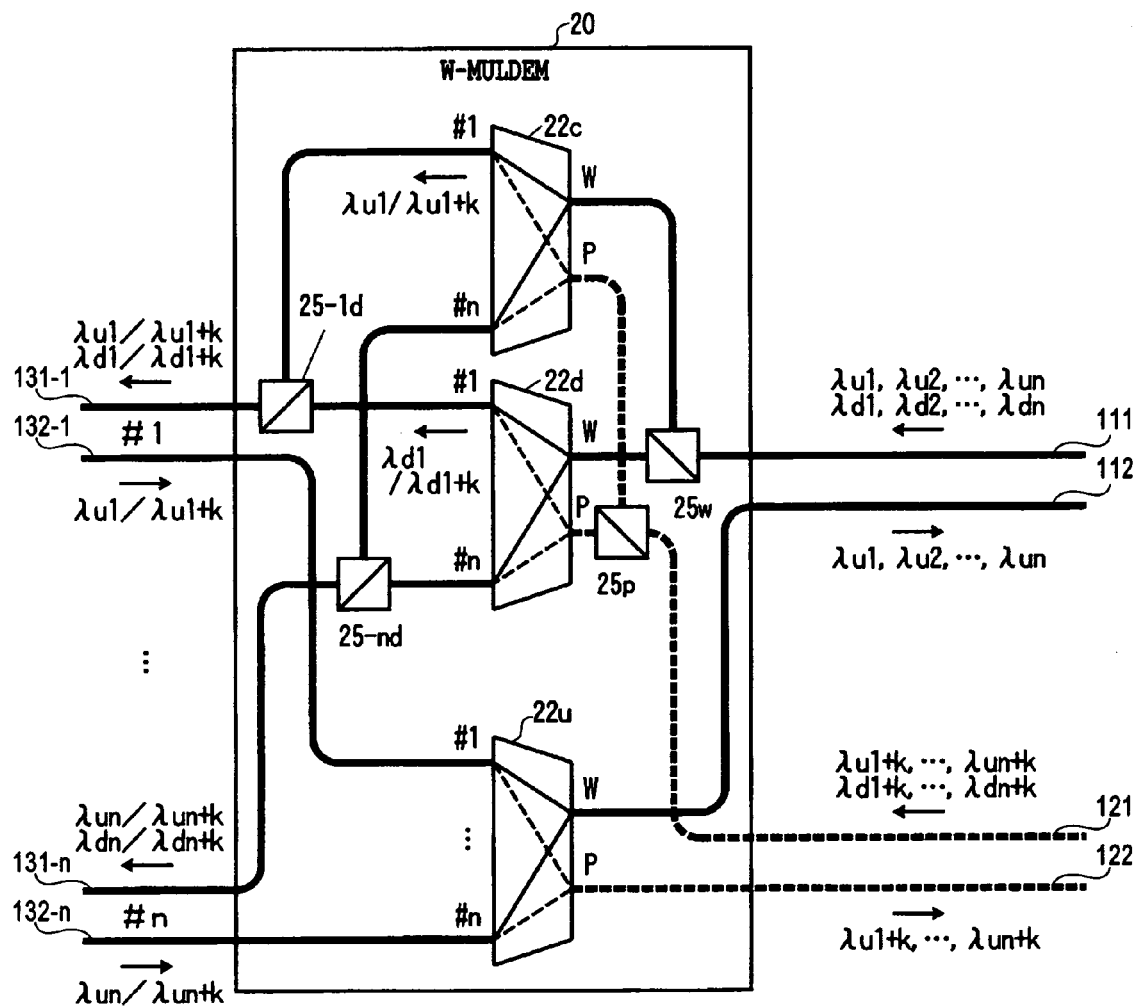
FIG. 16 is a diagram showing an optical wavelength division multiplexing access system according to a fifth embodiment of the present invention.

In FIG. 16 is shown an optical wavelength division multiplexing access system according to a fifth embodiment of the present invention. Since the optical wavelength division multiplexing access system in this embodiment is the same as that for the second embodiment shown in FIG. 12, except for a W-MULDEM unit 20, only the configuration for the W-MULDEM unit 20 is shown here.

The W-MULDEM unit 20 includes: an optical carrier AWG 22c and wavelength group filters 25w, 25p and 25-1d to 25-nd, in addition to the downstream AWG 22d and the upstream AWG 22u for the second embodiment in FIG. 7. The wavelength group filter 25w demultiplexes downstream optical signals having wavelengths $\lambda d1$ to $\lambda dn$, which are received, along a downstream current-use optical fiber 111, from optical carriers having wavelengths $\lambda u1$ to $\lambda un$, which are used for upstream signals, and respectively transmits the downstream optical signals and the optical carriers to the port W of the downstream AWG 22d and the port W of the optical carrier AWG 22c. The wavelength group filter 25p demultiplexes downstream optical signals having wavelengths $\lambda d2$ ($\lambda d1 + \Delta \lambda d$) to $\lambda dn+1$ ($\lambda dn + \Delta \lambda d$), which are received along a downstream redundant optical fiber 121, from optical carriers having wavelengths $\lambda u2$ ($\lambda u1 + \Delta \lambda u$) to $\lambda un+1$ (un+$\Delta \lambda u$), which are used for upstream signals, and respectively transmits the downstream optical signals and the optical carriers to the port P of the downstream AWG 22d and to the port P of the optical carrier AWG 22c.

The optical carrier AWG 22c demultiplexes the optical carriers having wavelengths $\lambda u1$ to $\lambda un$, which are used for upstream signals, to the ports #1 to #n that correspond to the individual ONUs. The wavelength group filters 25-1d to 25-nd multiplex the downstream optical signals, demultiplexed by the downstream AWG 22d, with the optical carriers for upstream signals that are demultiplexed by the upstream signal optical carrier AWG 22c, and transmits the obtained signals to the downstream optical fibers that correspond to the individual ONUs.

The wavelengths are allocated, as shown in FIGS. 8A and 8B, to the ports W and P and the ports #1 to #n of the downstream AWG 22d, the upstream AWG 22u and the optical carrier AWG 22c. In this embodiment, since the downstream optical signals and the upstream optical signals (optical carriers for upstream signals) should be set to different bands, the wavelengths can not be equalized for the downstream optical signals and the upstream optical signals.

SIXTH EMBODIMENT

Figure 17:
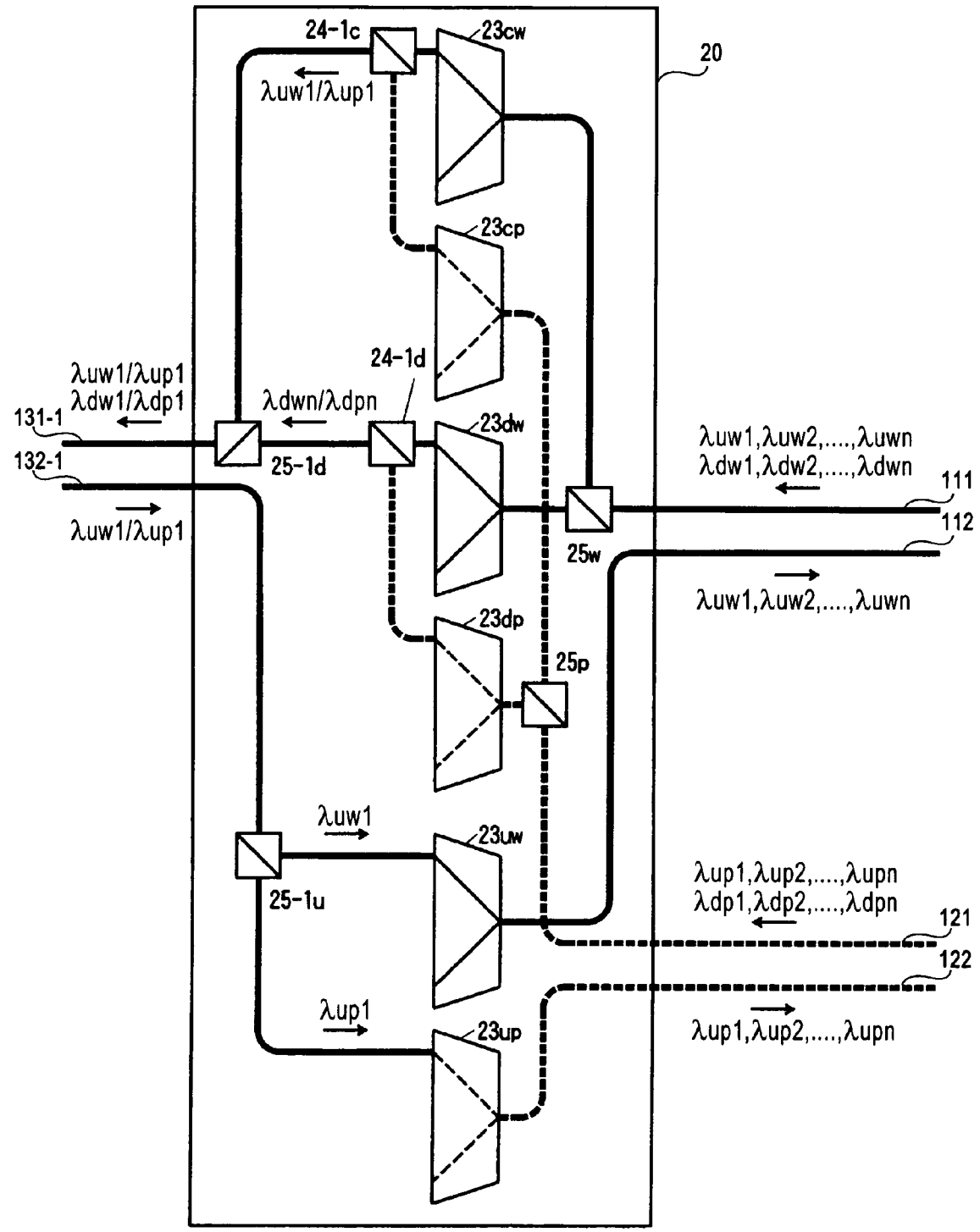
FIG. 17 is a diagram showing an optical wavelength division multiplexing access system according to a sixth embodiment of the present invention.

In FIG. 17 is shown an optical wavelength division multiplexing access system according to a sixth embodiment of the present invention. Since the optical wavelength division multiplexing access system in this embodiment is the same as that for the second embodiment shown in FIG. 12, except for a W-MULDEM unit 20 and wavelengths for optical carriers, upstream optical signals and downstream optical signals shown in the drawing, only the configuration of the W-MUL-DEM unit 20 is shown here.

According to the configuration for the fifth embodiment, the optical carrier AWG 22c demultiplexes both the optical carrier, which is received at the port W for the upstream current-use signal, and the optical carrier, which is received at the port P for the upstream reserve signal, to the ports #1 to #n. In this embodiment, a special current-use optical carrier multiplexing/demultiplexing unit 23cw and a special reserve optical carrier multiplexing/demultiplexing unit 23cp are employed. In addition, according to the configuration for the fifth embodiment, the downstream AWG 22d demultiplexes both the downstream current-use optical signal received at the port W and the downstream reserve optical signal received at the port P to the ports #1 to #n. In this embodiment, a special downstream current-use multiplexing/demultiplexing unit 23dw and a special downstream reserve multiplexing/demultiplexing unit 23dp are employed. Moreover, according to the configuration for the fifth embodiment, the upstream AWG 22u multiplexes at the port W the downstream current-use optical signals received at the ports #1 to #n, and multiplexes the downstream reserve optical signals at the port P. In this embodiment, a special upstream current-use multiplexing/demultiplexing unit 23uw and a special upstream reserve multiplexing/demultiplexing unit 23up are employed.

A wavelength group filter 25w demultiplexes the downstream optical signals having wavelengths λdw1 to λdwn, which are received along a downstream current-use optical fiber 111, from the optical carriers having wavelengths λuw1 to λuwn, which are used for upstream signals, and transmits these signals and carriers to the current-use optical carrier multiplexing/demultiplexing unit 23cw and the downstream current-use multiplexing/demultiplexing unit 23dw. A wavelength group filter 25p demultiplexes the downstream optical signals having wavelengths λd1 to λdn, which are received along a downstream redundant optical fiber 121, from optical carriers having wavelengths λup1 to λupn, which are used for upstream signals, and transmits the signals and carriers to the reserve optical carrier multiplexing/demultiplexing unit 23cp and the downstream reserve multiplexing/demultiplexing unit 23dp.

The current-use optical carrier multiplexing/demultiplexing unit 23cw demultiplexes the optical carriers having wavelengths λuw1 to λuwn, which are used for upstream signals, and the reserve optical carrier multiplexing/demultiplexing unit 23cp demultiplexes the optical carriers having wavelengths λup1 to λupn, which are used for upstream signals, and transmits the demultiplexed carriers to the wavelength group filter 25-1d through the wavelength group filters 24-1c (to 24-nc). The downstream reserve multiplexing/demultiplexing unit 23dw demultiplexes the downstream optical signals having wavelengths λdw1 to λdwn, and the downstream current multiplexing/demultiplexing unit 23dp demultiplexes the downstream optical signals having wavelengths λdp1 to λdpn, and transmits the demultiplexed signals to the wavelength group filter 25-1d through the wavelength group filters 24-1d (to 24-nd). The wavelength group filters 25-1d (to 25-nd) transmit, to downstream optical fibers 131 that correspond to the individual ONUs 30, the optical carriers for upstream signals and the downstream signals for current use, or the optical carriers for upstream signals and the downstream optical signals for reserves.

The wavelength group filters 25-1u (to 25-nu) transmit the upstream optical signals having wavelengths λuw1 to λuwn, which are received along upstream optical fibers 132 corresponding to the ONUs 30, to the upstream current-use multiplexing/demultiplexing unit 23uw, and transmit the upstream optical signals having wavelengths λup1 to λupn to the upstream reserve multiplexing/demultiplexing unit 23up. The upstream current-use multiplexing/demultiplexing unit 23uw multiplexes the received upstream optical signals having wavelengths λuw1 to λuwn, and transmits the resultant signal to the upstream current-use optical fiber 112. The upstream reserve multiplexing/demultiplexing unit 23up multiplexes the received upstream optical signals having wavelengths λup1 to λupn, and transmits the resultant signal to the upstream redundant optical fiber 122.

The wavelengths are allocated, as shown in FIG. 14A or FIGS. 15A and 15B, to the ports W and P and the ports #1 to #n of the current-use optical carrier multiplexing/demultiplexing unit 23cw, the reserve optical carrier multiplexing/demultiplexing unit 23cp, the downstream current-use multiplexing/demultiplexing unit 23dw, the downstream reserve multiplexing/demultiplexing unit 23dp, the upstream current-use multiplexing/demultiplexing unit 23uw and the upstream reserve multiplexing/demultiplexing unit 23up. In this embodiment, the downstream optical signals and the upstream optical signals (optical carriers for upstream signals) must be set to different bands. Therefore, unlike shown in FIGS. 14B, 14C and 15C, the wavelengths can not be equalized for the optical signals and the upstream optical signals (optical carriers for upstream signals).

SEVENTH EMBODIMENT

Figure 18:
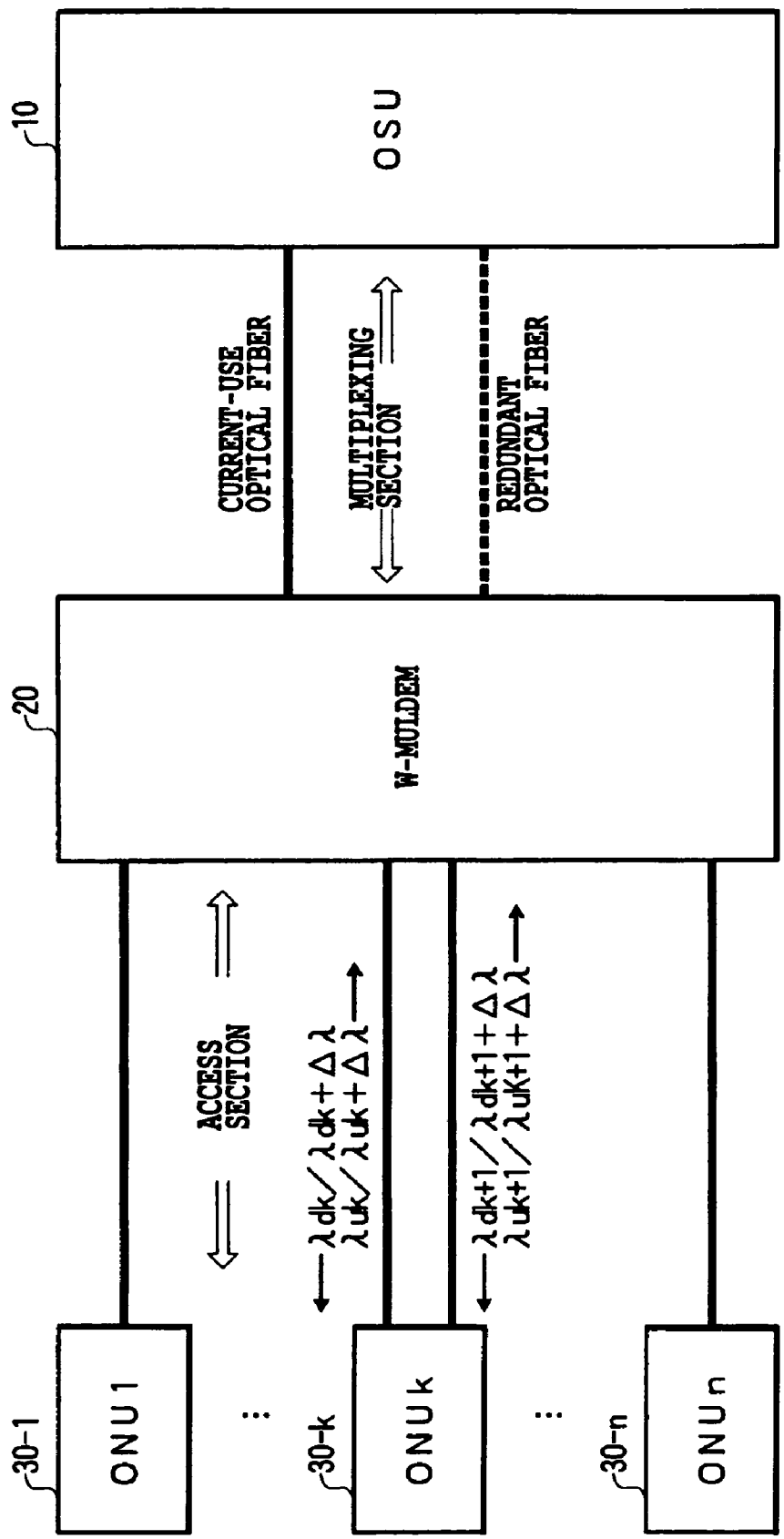
FIG. 18 is a diagram showing an optical wavelength division multiplexing access system according to a seventh embodiment of the present invention.

An optical wavelength division multiplexing access system according to a seventh embodiment of the present invention is shown in FIG. 18. In this embodiment, a dual structure is provided for the optical fiber at each access section shown in the above described embodiments (hereinafter, the first embodiment shown in FIG. 3 is employed for the explanation). For an ONU 30-2 for which a dual access section is provided, two wavelengths are allocated to downstream current-use optical signals (λdk, λdk+1), downstream reserve optical signals (λ+Δλ, λdk+1+Δλ), upstream current-use optical signals (λuk, λuk+1) and the upstream reserve optical signals (λuk+Δλ, λuk+1+Δλ). That is, the same arrangement is provided as when two ONUs that do not have dual structures are employed.

EIGHTH EMBODIMENT

In this embodiment, a dual structure is provided for current-use optical transmitter/receiver 11-1w to 11-nw and reserve optical transmitter/receiver 11-1p to 11-np in an OSU 10. When a failure occurs in the current-use optical fiber and the reserve optical transmitter/receiver 11-1p to 11-np, the redundant optical fiber and the reserve optical transmitter/receiver in a reserve system are employed to continue the operation. When a failure occurs in the redundant optical fiber and the current-use optical transmitter/receiver 11-1w to 11-nw, the current-use optical fiber and reserve optical transmitter/receiver in the current-use system are employed to continue the operation. In this manner, a redundant structure can be obtained that can cope with a double failure in the optical fiber and the optical transmitter/receiver.

NINTH EMBODIMENT

Figure 19:
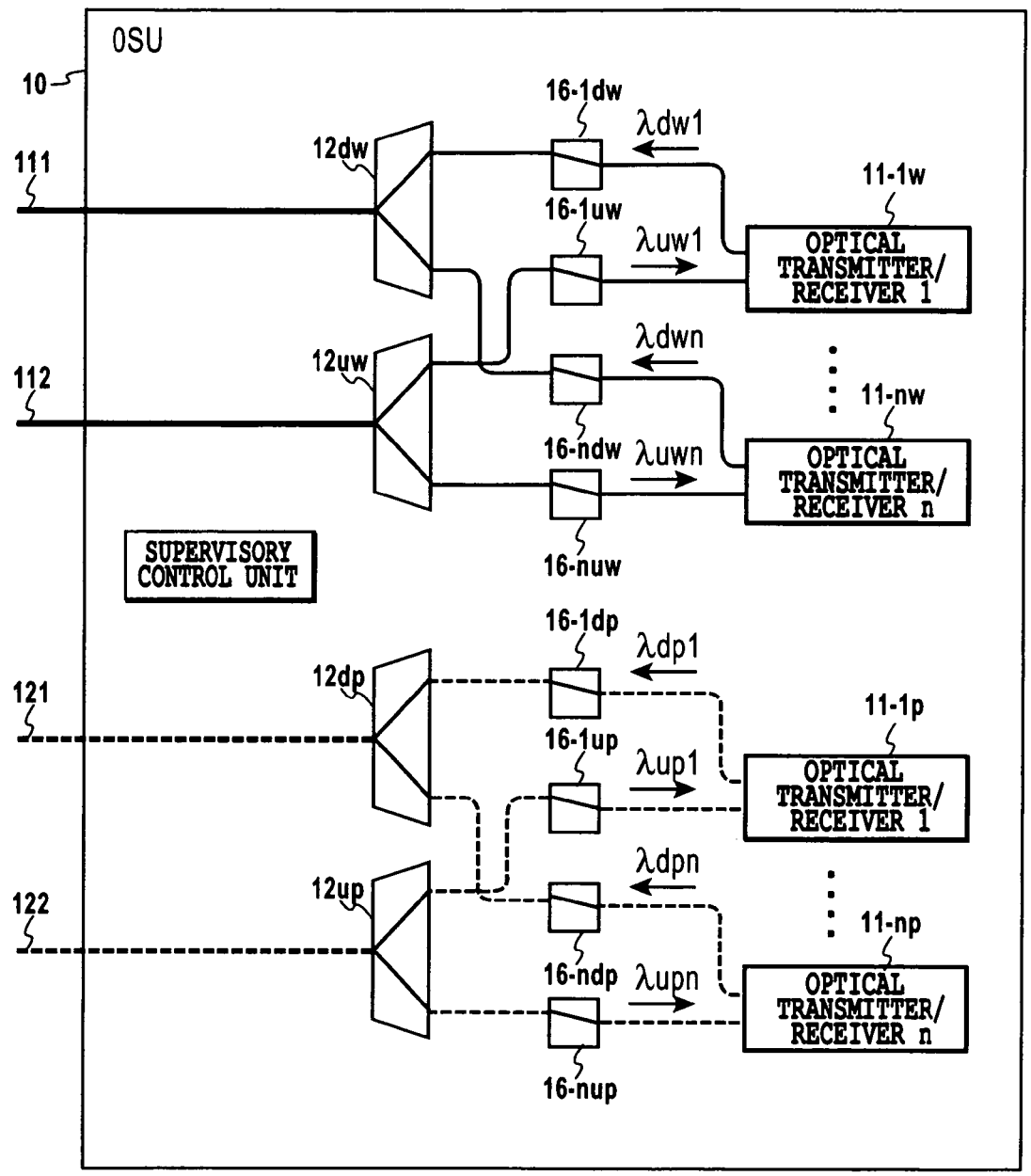
FIG. 19 is a diagram showing an optical wavelength division multiplexing access system according to a ninth embodiment of the present invention.

According to the configuration for the above embodiments, the supervisory light has been employed to supervise the current-use optical fiber and the redundant optical fiber. In this embodiment, instead of using supervisory light, a cutoff of the transmission of upstream optical signals by optical transmitter/receiver of an OSU 10 is detected, so that shearing of an optical fiber is determined. An optical wavelength division multiplexing access system according to a ninth embodiment of the present invention is shown in FIG. 19. As is shown in FIG. 19, the configuration for the system in the second embodiment is also employed for the optical wavelength division multiplexing access system for this embodiment, except that the light source 15, for emitting supervisory light, and the multiplexing/demultiplexing unit 13, for transmitting the supervisory light to each optical fiber by performing the multiplexing or demultiplexing process, are not included.

The OSU 10 further includes: current-use optical transmitter/receiver 11-1w to 11-nw; optical switches 16-1dw to 16-ndw and 16-1uw to 16 nuw, used to set ON or OFF for input/output of light; reserve optical transmitter/receiver 11-1w to 1-nw; and optical switches 16-1dp to 16-ndp and 16-1up to 16 nup, used to set ON or OFF for input/output of light.

In this embodiment, when a current-use optical fiber is employed, the optical switches 16-1dw to 16-ndw and 16-1uw to 16-nuw are in the ON state, and the optical switches to 16-ndp and 16-1up to 16-nup are in the OFF state. When a failure has occurred in the current-use optical fiber, transmission of the upstream optical signals by the optical transmitter/receiver 11-1w to 11-nw is cut off, and a supervisory control unit 14 transmits a select switch to the individual optical switches. When the optical switches 16-1dw to 16-ndw and 16-uw to 16-nuw are set to the OFF state, and the optical switches 16-1dp to 16-ndp and 16-1up to 16-nup are set to the ON state, the current-use optical fiber can be changed to the redundant optical fiber.

When failures occur in some of the current-use optical transmitter/receiver 11-1w to 11-nw, a selection switch need only be transmitted to the optical switches that correspond to those current-use optical transmitter/receiver 11-1w to 11-nw that have malfunctioned, so that the optical transmitter/receiver can be changed.

As means for collectively detecting a cutoff of the transmission of upstream signals from the ONUs 30, a small number of upstream optical signals obtained by multiplexing are branched at the upstream current-use optical fiber 112 and the redundant optical fiber 122, and are monitored. The states of the current-use and redundant optical fibers can also be monitored by detecting the presence/absence of optical signals.

With the above described arrangement, the optical fibers to be employed and the current-use system and the reserve system for the optical transmitter/receiver of the OSU 10 can be selected by the W-MULDEM unit 20 that is constituted only by passive parts.

TENTH EMBODIMENT

Figure 20:
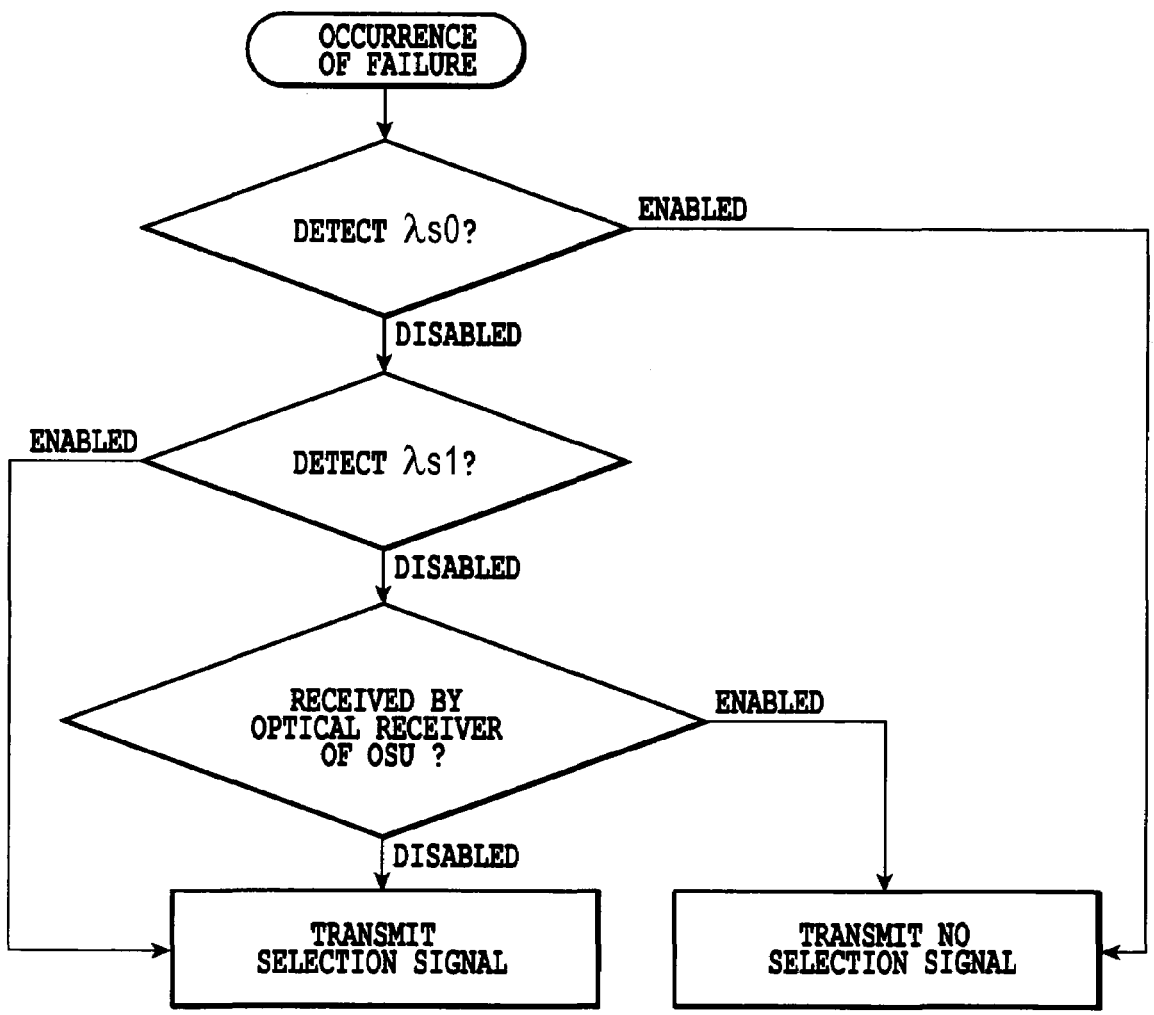
FIG. 20 is a diagram showing an optical wavelength division multiplexing access system according to a tenth embodiment of the present invention.

The processing for performing current-use and reserve-use switching is shown in FIG. 20 as a tenth embodiment. Assume that, for example, for the second embodiment in FIG. 7, a failure occurs in the light source 15 that emits supervisory light having wavelengths $\lambda s0$ and $\lambda s1$, or the supervisory monitor control unit 15 that detects the supervisory light having wavelengths $\lambda s0$ and $\lambda s1$. At this time, the following four cases are expected.

(1) A selection signal is to be transmitted when the supervisory light having wavelength $\lambda s0$ can not be detected, and the supervisory light having wavelength $\lambda s1$ can be detected.

(2) A selection signal is to be transmitted when supervisory lights having wavelengths $\lambda s0$ and $\lambda s1$ can not be detected, and upstream optical signals cannot be received from the optical receivers of the OSU and can also not be detected.

(3) A selection signal is not to be transmitted when the supervisory light having wavelength $\lambda s0$ can be detected.

(4) A selection signal is not to be transmitted when supervisory lights having wavelengths $\lambda s0$ and $\lambda s1$ can not be detected, and upstream optical signals can not be received by the optical receivers of the OSU.

In this manner, when one of the above described failures has occurred, the current-use optical fiber and the redundant optical fiber that is to be used can be switched without halting the communication between the ONUs and the OSU.

ELEVENTH EMBODIMENT

Figure 21:
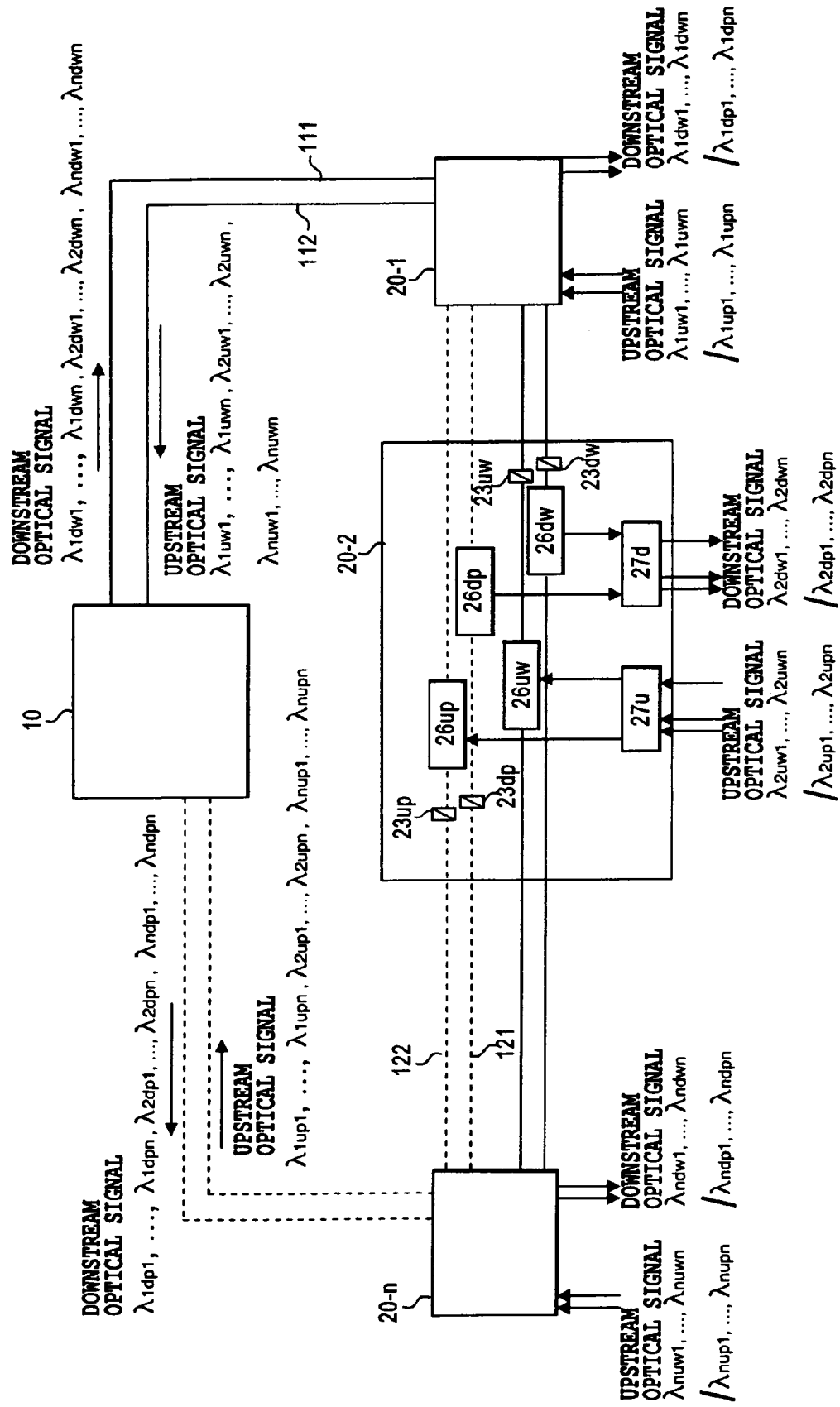
FIG. 21 is a diagram showing an optical wavelength division multiplexing access system according to an eleventh embodiment of the present invention.

In the above described embodiments, a star network configuration has been employed wherein one W-MULDEM unit is connected to one OSU. In this embodiment, a bus network configuration is employed wherein a plurality of W-MULDEM units are connected to one OSU. An optical wavelength division multiplexing access system according to an eleventh embodiment of the present invention is shown in FIG. 21. In the optical wavelengths division multiplexing access system of this embodiment, n W-MULDEM units 20-1 to 20-n are connected, by bus wiring, to one OSU 10 along a downstream current-use optical fiber 111 and an upstream current-use optical fiber 121, and are also connected, by bus wiring opposite the current-use optical fiber, to the OSU 10 along a downstream redundant optical fiber 121 and an upstream redundant optical fiber 122.

Each one of W-MULDEM units 20-k ($1 \leq k \leq n$) includes: a demultiplexing unit 26dw, for demultiplexing downstream optical signals, having wavelengths $\lambda\lambda dw1$ to $\lambda\lambda dwn$, which are received along the downstream current-use optical fiber 111; a multiplexing unit 26uw, for multiplexing upstream optical signals, having wavelengths $\lambda kuw1$ to $\lambda kuwn$, to be transferred to the upstream current-use optical fiber 112; a demultiplexing unit 26dp, for demultiplexing downstream optical signals having wavelengths $\lambda dp1$ to $\lambda\lambda dpn$, which are received along the downstream redundant optical fiber 121; and a multiplexing unit 326up, for multiplexing upstream optical signals having wavelengths $\lambda kup1$ to $\lambda kupn$, which are to be transferred to the upstream redundant optical fiber 122.

The W-MULDEM unit 20-k also includes: a demultiplexing unit 23dw, for demultiplexing a current-use supervisory light having wavelength $\lambda sk0$ that is received along the downstream current-use optical fiber 111; a multiplexing unit 23uw, for multiplexing the current-use supervisory light having wavelength $\lambda sk0$ that is to be transferred to the upstream current-use optical fiber 112; a demultiplexing unit 23dp, for demultiplexing the reserve supervisory light having wavelength $\lambda sk1$ that is received along the downstream redundant optical fiber 121; a multiplexing unit 23up, for multiplexing the reserve supervisory light having wavelength $\lambda sk1$ that is to be transferred to the upstream redundant optical fiber 122; and a downstream AWG 27d and an upstream AWG 27u.

The downstream optical signals having wavelengths $\lambda 1dw1$ to $\lambda 1dwn$, $\lambda 2dw1$ to $\lambda 2dwn$ and $\lambda ndw1$ to $\lambda ndwn$, or wavelengths $\lambda 1dp1$ to $\lambda 1dpn$, $\lambda 2dp1$ to $\lambda 2dpn$ and $\lambda ndp1$ to $\lambda ndpn$, and the upstream optical signals having wavelengths $\lambda 1uw1$ to $\lambda 1uwn$, $\lambda 2uw1$ to $\lambda 2uwn$ and $\lambda nuw1$ to $\lambda udwn$, or wavelengths $\lambda 1up1$ to $\lambda 1upn$, $\lambda 2up1$ to $\lambda udpn$ and $\lambda nup1$ to $\lambda nupn$, are employed to perform communication between ONUs, which are connected to the corresponding W-MULDEM units 20-1 to 20-n, and the OSU 10.

In this embodiment, the downstream optical signals having wavelengths λλdw1 to λλdwn, which are transmitted by the OSU 10, or the upstream optical signals having wavelengths λkuw1 to λkuwn, which are transmitted by the ONUs, are multiplexed or demultiplexed by the corresponding W-MULDEM units 20-*k*. When a failure occurs in an optical fiber extended at each interval, a fiber malfunction interval is detected by using the supervisory lights for λs10 to λsn0 and λs11 to λsn1, which are output by the OSU 10, and switching can be performed by employing the same switching means as used for the above embodiments.

With this arrangement wherein n W-MULDEM units 20-1 to 20-*n* are connected by bus wiring to one OSU 10, the current-use system and the reserve system to be used can be switched for the optical fiber and the optical transmitter/receiver of the OSU 10.

TWELFTH EMBODIMENT

Figure 22:
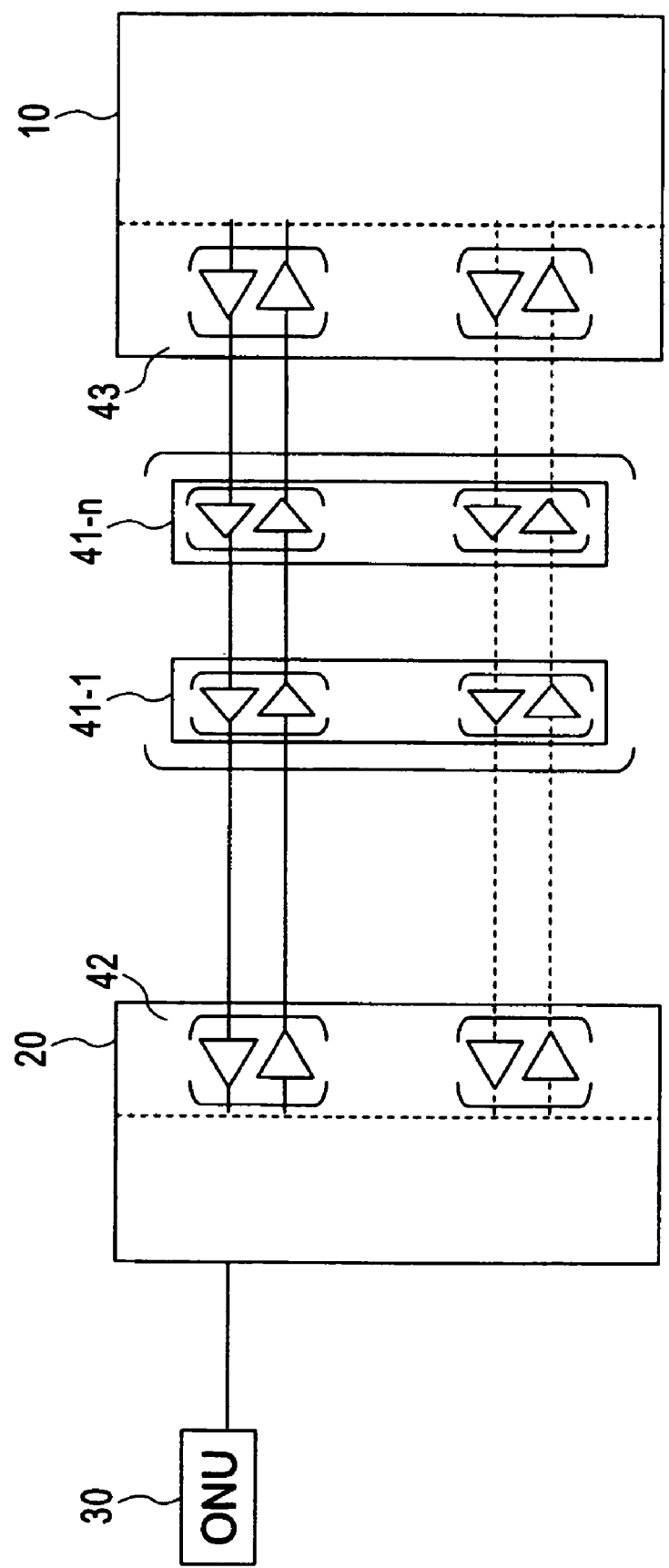
FIG. 22 is a diagram showing an optical wavelength division multiplexing access system according to a twelfth embodiment of the present invention.

An optical wavelength division multiplexing access system according to a twelfth embodiment of the present invention is shown in FIG. 22. In the optical wavelength division multiplexing access system, when there is a great transmission loss for the optical fiber at the multiplexing section, amplifiers 41-1 to 41-*n*, for collectively amplifying a plurality of WDM signals, are inserted between an OSU 10 and a W-MULDEM unit 20. Multi-signal amplifiers 42 and 423 may be internally provided for the W-MULDEM unit 20 and the OSU 10.

The invention claimed is:

1. An optical wavelength division multiplexing access system, comprising a center node (OSU) and n optical network units (ONUs) arranged by using a W-MULDEM unit, a multiplexing section between the OSU and the W-MULDEM unit established by extending a current-use optical fiber and a redundant optical fiber and access sections between the W-MULDEM unit and the individual ONUs established by the extension of optical fibers, wherein downstream optical signals from the OSU to the ONUs and upstream optical signals from the ONUs to the OSU are multiplexed using wavelengths that are allocated to individual ONUs and the resultant signals are transmitted across the multiplexing section, and wherein the W-MULDEM unit performs wavelength multiplexing or wavelength demultiplexing for the upstream or downstream optical signals to provide bidirectional transmission, the OSU includes:
a transmission device for multiplexing downstream optical signals having wavelengths λd1 to λdn that correspond to the ONUs and transmitted to the ONUs along the current-use optical fiber, for multiplexing downstream optical signals having wavelengths λd1+Δλ to λdn+Δλ that correspond to the ONUs and transmitted to the ONUs along the redundant optical fiber, and for selecting either the current-use optical fiber or the redundant optical fiber for transmission, and a reception device for receiving upstream optical signals having wavelengths λu1 to λun along the current-use optical fiber or for receiving upstream optical signals having wavelengths λu1+Δλ to λun+Δλ along the redundant optical fiber;

the individual ONUs receive corresponding downstream optical signals having wavelengths λd1 to λdn or corresponding downstream optical signals having wavelengths λd1+Δλ to λdn+Δλ, which are received along the optical fibers extended across the access sections, the individual ONUs transmit, to the optical fibers extended across the access sections, corresponding upstream optical signals that have wavelengths λu1 to λun and transmitted along the current-use optical fiber extended across the multiplexing section, or corresponding upstream optical signals that have wavelengths λu1+Δλ to λun+Δλ and transmitted along the redundant optical fiber;

the W-MULDEM unit includes an array waveguide diffraction grating (AWG) having two ports, respectively connected to the current-use optical fiber and the redundant optical fiber, and n ports, connected to optical fibers corresponding to the ONUs;

the W-MULDEM unit demultiplexes to the ports corresponding to the ONUs the downstream optical signals that have wavelengths λd1 to λdn and are received along the current-use optical fiber, or the downstream optical signals that have wavelengths λd1+Δλ to λdn+Δλ and are received along the redundant optical fiber, or multiplexes, to the port corresponding to the current-use optical fiber or the redundant optical fiber, the upstream optical signals that have wavelengths λu1 to λun or wavelengths λu1+Δλ to λun+Δλ and that are received along the optical fibers corresponding to the ONUs;

a wavelength difference between the downstream optical signal and the upstream optical signal corresponding to each of the ONUs is integer times a free spectrum range (FSR) of the AWG;

the two ports of the AWG are provided at locations consonant with a wavelength difference (Δλ) between optical signals transmitted along the current-use optical fiber and optical signals transmitted along the redundant optical fiber corresponding to each of the ONUs; and wherein the transmission device includes:
a switching device for changing from a current-use optical fiber to a redundant optical fiber;

a supervisory light source for outputting current-use fiber supervisory light and reserve fiber supervisory light having wavelengths λs0 and λs1 that differ from the wavelengths of the upstream optical signals and the downstream optical signals;

a supervisory control unit, for detecting the supervisory light having wavelengths λs0 and λs1 that is received along the current-use optical fiber and the redundant optical fiber, and outputting a selection signal to the switching device to change from the current-use optical fiber to the redundant optical fiber;

a multiplexing unit, for multiplexing the current-use fiber supervisory light having wavelength λs0 and an optical signal transmitted along the current-use optical fiber;

a demultiplexing unit, for demultiplexing the current-use fiber supervisory light having wavelength λs0 from an optical signal transmitted along the current-use optical fiber;

a multiplexing unit, for multiplexing the reserve fiber supervisory light having wavelength λs1 and an optical signal transmitted along the redundant optical fiber; and a demultiplexing unit, for demultiplexing the reserve fiber supervisory light having wavelength λs1 from an optical signal transmitted along the redundant optical fiber.

2. The optical wavelength division multiplexing access system according to claim 1, wherein:
when λd1, λd2, . . . and λdn are defined as wavelengths of downstream optical signals that are transferred along the current-optical fiber and correspond to the ONUs, and when a wavelength interval is a constant, defining λd1+k, λd2+k, . . . and λdn+k (1≦k<n) as wavelengths of downstream optical signals that are transferred along the redundant optical fiber to the ONUs, and when $\lambda u1, \lambda u2, \ldots$ and $\lambda un$ are defined as wavelengths of upstream optical signals that are transferred along the current-optical fiber and correspond to the ONUs, and when a wavelength interval is a constant, defining $\lambda u1+k, \lambda u2+k, \ldots$ and $\lambda un+k$ (k is an integer of one or greater) as wavelengths of upstream optical signals that are transferred along the redundant optical fiber to the ONUs.

3. The optical wavelength division multiplexing access system according to claim 2, wherein:
 replacing $\lambda dn+i$ with $\lambda di$ when $\lambda dn+i=\lambda di+FSR$ is established; and
 replacing $\lambda un+i$ with $\lambda ui$ when $\lambda un+i=\lambda ui+FSR$ is established (i is an integer of 1 to k).

4. The optical wavelength division multiplexing access system according to claim 1, wherein, under a condition that current-use optical receivers are in normal state, when the current-use fiber supervisory light having wavelength $\lambda s0$ is not detected and the reserve fiber supervisory light having wavelength $\lambda s1$ is detected, or when the current-use fiber supervisory light having wavelength $\lambda s0$ is not detected and the reserve fiber supervisory light having wavelength $\lambda s1$ is also not detected, and when the upstream optical receivers of the OSU do not receive upstream optical signals, the supervisory control unit transmits a selection signal to perform communication using the redundant optical fiber.

5. An optical wavelength division multiplexing access system, whereby a center node (OSU) and n optical network units (ONUs) are arranged through a W-MULDEM unit, whereby a multiplexing section between the OSU and the W-MULDEM unit is established by extending a current-use downstream optical fiber, a current-use upstream optical fiber, a reserve downstream optical fiber and a reserve upstream optical fiber and access sections between the W-MULDEM unit and the individual ONUs are established by extension of downstream optical fibers and of upstream optical fibers, whereby downstream optical signals from the OSU to the ONUs and upstream optical signals from the ONUs to the OSU are multiplexed, using wavelengths that are allocated to the individual ONUs, and resultant optical signals are transmitted across the multiplexing section, and whereby the W-MULDEM unit performs either wavelength multiplexing or wavelength division for the upstream or downstream optical signals to provide bidirectional transmission, wherein the OSU includes:
 a transmission device for multiplexing downstream optical signals having wavelengths $\lambda d1$ to $\lambda dn$ that correspond to the ONUs and that are to be transmitted to the ONUs along the current-use downstream optical fiber, for multiplexing downstream optical signals having wavelengths $\lambda d1+\Delta\lambda d$ to $\lambda dn+\Delta\lambda d$ that correspond to the ONUs and that are to be transmitted to the ONUs along the reserve downstream optical fiber, and for selecting either the current-use downstream optical fiber or the reserve downstream optical fiber used for transmission, and
 receivers for receiving upstream optical signals having wavelengths $\lambda u1$ to $\lambda un$ transmitted along the current-use upstream optical fiber, or for receiving upstream optical signals having wavelengths $\lambda u1+\Delta\lambda u$ to $\lambda un+\Delta\lambda u$ transmitted alone the reserve upstream optical fiber;

the ONUs receive, along the optical fibers extended across the access sections, corresponding downstream optical signals having wavelenaths $\lambda d1$ to $\lambda dn$ or corresponding downstream optical signals having wavelenaths $\lambda d1+\Delta\lambda d$ to $\lambda dn+\Delta\lambda d$, the ONUs transmit, to the optical fibers extended across the access sections, corresponding upstream optical signals that have wavelengths $\lambda u1$ to $\lambda un$ and that are to be transmitted along the current-use optical fiber extended across the multiplexing section, or corresponding upstream optical signals that have wavelengths $\lambda u1+\Delta\lambda u$ to $\lambda un+\Delta\lambda u$ and are to be transmitted along the redundant optical fiber;

the W-MULDEM unit includes:
 a downstream array waveguide diffraction grating (downstream AWG) having two ports, which are to be respectively connected to the current-use downstream optical fiber and the reserve downstream optical fiber, and n ports, which are to be connected to optical fibers corresponding to the ONUs, and
 an upstream array waveguide diffraction grating (upstream AWG) having two ports, which are to be respectively connected to the current-use upstream optical fiber and the reserve upstream optical fiber, and n ports, which are connected to the optical fibers corresponding to the ONUs;

the W-MULDEM unit demultiplexes to the ports of the downstream AWG that correspond to the ONUs the downstream optical signals that have wavelengths $\lambda d1$ to $\lambda dn$ and are received along the current-use downstream optical fiber, or the downstream optical signals that have wavelengths $\lambda d1+\Delta\lambda d$ to $\lambda dn+\Delta\lambda d$ and are received along the reserve downstream optical fiber, or multiplexes, to the port corresponding to the current-use upstream optical fiber or the reserve upstream optical fiber, the upstream optical signals that have wavelengths $\lambda u1$ to $\lambda un$ or wavelengths $\lambda u1+\Delta\lambda u$ to $\lambda un+\Delta\lambda u$ and that are transmitted to the upstream AWG along the optical fibers corresponding to the ONUs;

the two ports of the downstream AWG are provided at locations consonant with a wavelength difference ($\Delta\lambda d$) between optical signals transmitted alone the current-use downstream optical fiber and optical signals transmitted along the redundant downstream optical fiber corresponding to each of the ONUs and the two ports of the upstream AWG are provided at locations consonant with a wavelength difference ($\Delta\lambda u$) between optical signals transmitted along the current-use upstream optical fiber and optical signals transmitted along the redundant upstream optical fiber corresponding to each of the ONUs; and the transmission device includes:
 a switching device for changing from the upstream (or downstream) current-use optical fiber to the upstream (or downstream) redundant optical fiber,
 a supervisory light source for outputting a current-use fiber supervisory light and a reserve fiber supervisory light having wavelengths $\lambda s0$ and $\lambda s1$ that differ from wavelengths of the upstream optical signals and the downstream optical signals,
 a supervisory control unit, for detecting the supervisory lights having wavelengths $\lambda s0$ and $\lambda s1$ that are received along the upstream current-use fiber and the upstream reserve fiber, and for outputting a selection signal to the switching device to change from the upstream (or downstream) current-use fiber to the upstream (or downstream) reserve fiber,
 a multiplexing unit, for multiplexing the current-use fiber supervisory light having wavelength $\lambda s0$ and an optical signal transmitted along the downstream (or upstream) current-use optical fiber, a demultiplexing unit, for demultiplexing the current-use fiber supervisory light having wavelength λs0 from an optical signal transmitted along the upstream (or downstream) current-use optical fiber, a multiplexing unit, for multiplexing the reserve fiber supervisory light having wavelength λs1 and an optical signal transmitted along the downstream (or upstream) redundant optical fiber, and a demultiplexing unit, for demultiplexing the reserve fiber supervisory light having wavelength λs1 from an optical signal transmitted along the upstream (or downstream) redundant optical fiber; and the W-MULDEM unit includes:

a demultiplexing unit, for demultiplexing the current-use optical fiber supervisory light having wavelength λs0, which has been multiplexed with the optical signal and has been received along the downstream (or upstream) current-use optical fiber, a multiplexing unit, for re-multiplexing the current-use optical fiber supervisory light having wavelength λs0 and an optical signal transmitted along the upstream (or downstream) current-use optical fiber, a demultiplexing unit, for demultiplexing the redundant optical fiber supervisory light having wavelength λs1 that has been multiplexed with an optical signal and received along the downstream (or upstream) redundant optical fiber, and a multiplexing unit, for re-multiplexing the redundant optical fiber supervisory light having wavelength λs1 and an optical signal transmitted along the upstream (or downstream) optical fiber.

6. The optical wavelength division multiplexing access system according to claim 5, wherein, under a condition that current-use optical receivers are in the normal state, when the current-use fiber supervisory light having wavelength λs0 is not detected and the reserve fiber supervisory light having wavelength λs1 is detected, or when the current-use fiber supervisory light having wavelength λs0 is not detected and the reserve fiber supervisory light having wavelength λs1 is also not detected, and when the upstream optical receivers of the OSC do not receive upstream optical signals, the supervisory control unit transmits a selection signal to perform communication using the redundant optical fiber.

7. The optical wavelength division multiplexing access system according to claim 5, wherein the transmission device includes:

n current-use optical transmitters and n reserve optical transmitters, for transmitting downstream optical signals having wavelengths λdw1 to λdwn and downstream optical signals having wavelengths λdp1 to λdpn, a downstream current-use wavelength multiplexing unit, having n ports to be connected to the n current-use optical transmitters and one port to be connected to the downstream current-use optical fiber, and a downstream reserve wavelength multiplexing unit, having n ports to be connected to the n reserve optical transmitters and one port to be connected to the downstream optical fiber;

the downstream optical signals having wavelengths λdw1 to λdwn, which are received from the n current-use optical transmitters and are multiplexed by the downstream current-use wavelength multiplexing unit, and a resultant signal is output to the downstream current-use optical fiber;

the downstream optical signals having wavelengths λdp1 to λdpn, which are received from the n reserve optical transmitters, are multiplexed by the downstream reserve wavelength multiplexing unit, and a resultant signal is output to the downstream redundant optical fiber; and the current-use and reserve optical transmitters include devices for selecting the presence/absence of an optical output in accordance with a selection signal received from the supervisory control unit.

8. The optical wavelength division multiplexing access system according to claim 5, wherein the transmission device includes:

n current-use optical transmitters and n reserve optical transmitters, for transmitting downstream optical signals having wavelengths λdw1 to λdwn and downstream optical signals having wavelengths λdp1 to λdpn, n downstream current-use optical switches, for setting ON or OFF for the output of received optical signals, a downstream current-use multiplexing unit, having n ports to be connected to the n downstream current-use optical switches and one port to be connected to the downstream current-use optical fiber, n downstream reserve optical switches, for setting ON or OFF for the input of received optical switches, and a downstream reserve multiplexing unit, having n ports to be connected to the n downstream reserve optical switches and one port to be connected to the downstream redundant optical fiber;

the downstream optical signals transmitted by the current-use optical transmitters and the reserve optical transmitters are received by the optical switches, and outputs of the optical switches are selected in accordance with a selection signal transmitted by the supervisory control unit;

the downstream optical signals having wavelengths λdw1 to λdwn, output by the n current-use optical switches, are multiplexed by the downstream current-use multiplexing unit and a resultant signal is output to the downstream current-use optical fiber;

the downstream optical signals having wavelengths λdp1 to λdpn, output by the n reserve optical switches, are multiplexed by the downstream reserve multiplexing unit and a resultant signal is output to the downstream current-use optical fiber; and when the downstream current-use optical fiber is employed for transmission of downstream optical signals to the ONUs, the downstream optical signals having wavelengths λdw1 to λdwn, corresponding to the ONUs, are multiplexed, and when the downstream redundant optical fiber is employed for transmission, the downstream optical signals having wavelengths λdp1 to λdpn, corresponding to the ONUs, are multiplexed, so that the transmission is performed by selecting either the downstream current-use optical fiber, or the downstream redundant optical fiber.

9. The optical wavelength division multiplexing access system according to claim 5, wherein the transmission device includes:

n current-use optical transmitters for, upon receiving downstream electric signals, transmitting downstream optical signals having wavelengths λdw1 to λdwn, and n reserve optical transmitters, for, upon receiving downstream electric signals, transmitting downstream optical signals having wavelengths λdp1 to λdpn, a downstream current-use multiplexing unit, having n ports to be connected to the n current-use optical transmitters and one port to be connected to a downstream current-use optical switch, a downstream reserve multiplexing unit, having n ports to be connected to the n reserve optical transmitters and one port to be connected to a downstream reserve optical switch, one downstream current-use optical switch, for setting ON/OFF for the output of a multiplexed downstream optical signal received from the downstream current-use multiplexing unit, and one downstream current-use optical switch, for setting ON/OFF for the output of a multiplexed downstream optical signal received from the downstream reserve multiplexing unit;

the downstream current-use optical signals having wavelengths $\lambda dp1$ to $\lambda dwn$, output by the n current-use optical transmitters, are multiplexed by the downstream current-use multiplexing unit and a resultant signal is output to the downstream current-use optical switch;

the downstream reserve optical signals having wavelengths $\lambda dp1$ to $\lambda dpn$, output by the n reserve optical transmitters, are multiplexed by the downstream reserve multiplexing unit and a resultant signal is output to the downstream reserve optical switch; and either a current-use optical fiber or a redundant optical fiber to be used for output is selected in accordance with a selection signal transmitted by the supervisory control unit.

10. The optical wavelength division multiplexing access system according to claim 5, wherein a wavelength $\lambda dpk$ (k=1 to n) is set as $\lambda dwk+\Delta\lambda d$ (k=1 to n; $\Delta\lambda d$ is a constant value);

the transmission device includes:

n current-use optical transmitters and n reserve optical transmitters for, upon receiving downstream electric signals, outputting downstream optical signals having wavelengths $\lambda dw1$ to $\lambda dwn$ and downstream optical signals having wavelengths $\lambda dp1$ to $\lambda dpn$, n optical switches, used to select the current-use optical transmitters that transmit a downstream optical signal having wavelength $\lambda dwk$ (k is an integer of one or greater to n or smaller), or the reserve optical transmitters that transmit a downstream optical signal having wavelength $\lambda dpk$ (k is an integer of one or greater to n or smaller), and a downstream array waveguide diffraction grating (downstream AWG), having n ports to be connected to the n optical switches and two ports to be connected to the downstream current-use optical fiber and the redundant optical fiber; and the downstream optical signals having wavelength $\lambda dwk$ and wavelength $\lambda dpk$ are transmitted from the current-use optical transmitters to the optical switches, either the downstream optical signal having wavelength $\lambda dwk$ or wavelength $\lambda dpk$ is selected and output by the n optical switches to the downstream AWG, and in accordance with the downstream optical signal having the selected wavelength, the downstream current-use optical fiber or the downstream redundant optical fiber is employed to multiplex and output the resultant signal.

11. The optical wavelength division multiplexing access system according to claim 5, wherein a wavelength $\lambda dpk$ (k=1 to n) is set as $\lambda dwk+\Delta\lambda d$ (k=1 to n; $\Delta\lambda d$ is a constant value);

the transmission device includes:

n current-use optical transmitters for selecting and transmitting downstream signals having either wavelength $\lambda dwk$ (k is an integer of one or greater to n or smaller) or wavelength $\lambda dpk$ (k is an integer of one or greater or n or smaller), and a downstream array waveguide diffraction grating (downstream AWG), having n ports to be connected to the n optical transmitters and two ports to be connected to the downstream current-use optical fiber and the redundant optical fiber;

the downstream optical signals having wavelength $\lambda dwk$ (k is an integer of one or greater to n or smaller) or wavelength $\lambda dpk$ (k is an integer of one or greater to n or smaller) are selected in accordance with a selection signal received from the supervisory control unit and are output by the optical transmitters; and the downstream AWG multiplexes and outputs an obtained signal along the downstream optical fiber or the downstream redundant optical fiber that is consonant with the downstream optical signals having the selected wavelength.

12. The optical wavelength division multiplexing access system according to claim 5, wherein transmission device includes:

n current-use optical receivers, for converting received upstream optical signals having wavelengths $\lambda uw1$ to $\lambda uwn$ into upstream electric signals and outputting the upstream electric signals, and n reserve optical receivers, for converting received upstream optical signals having wavelengths $\lambda up1$ to $\lambda upn$ into upstream electric signals and for outputting the upstream electric signals, an upstream current-use demultiplexing unit, having n ports to be connected to the n current-use optical receivers and one port to be connected to the upstream current-use optical fiber, and an upstream reserve demultiplexing unit, having n ports to be connected to the n reserve optical receivers and one port to be connected to the upstream reserve fiber;

the upstream optical signals received along the upstream current-use optical fiber are divided by the upstream current-use demultiplexing unit and transmitted to the current-use optical receivers;

the upstream optical signals received along the upstream redundant optical fiber are divided by the upstream demultiplexing unit and transmitted to the reserve optical receivers; and upstream electric signals to be output are selected in accordance with a selection signal transmitted by the supervisory control unit.

13. The optical wavelength division multiplexing access system according to claim 5, wherein the transmission device includes:

n current-use optical receivers, for converting received upstream optical signals having wavelengths $\lambda uw1$ to $\lambda uwn$ into upstream electric signals and outputting the upstream electric signals, and n reserve optical receivers, for converting received upstream optical signals having wavelengths $\lambda up1$ to $\lambda upn$ into upstream electric signals and for outputting the upstream electric signals, an upstream current-use demultiplexing unit, having n ports to be connected to the n current-use optical receivers and one port to be connected to the upstream current-use optical fiber, an upstream reserve demultiplexing unit, having n ports to be connected to the n reserve optical receivers and one port to be connected to the upstream reserve fiber, one upstream current-use optical switch, used to set ON/OFF for the output, to the upstream current-use demultiplexing unit, of upstream optical signals received from the upstream current-use demultiplexing unit, and one upstream reserve optical switch, used to set ON/OFF for the output, to the upstream reserve demultiplexing unit, of upstream reserve optical signals received from the upstream reserve demultiplexing unit;

when the upstream current-use optical switch and the upstream reserve optical switch are set to ON or OFF in accordance with a selection signal received from the supervisory control unit, either a multiplexed upstream optical signal, transmitted along the upstream current-use optical fiber, or a multiplexed upstream signal, transmitted along the upstream redundant optical fiber, is selected and is output to the upstream current-use demultiplexing unit or the upstream reserve demultiplexing unit, and signals obtained by the demultiplexing unit are transmitted to the current-use optical receivers or the reserve optical receivers.

14. The optical wavelength division multiplexing access system according to claim 5, wherein transmission device includes:

n current-use optical receivers, for converting received upstream optical signals having wavelengths $\lambda uw1$ to $\lambda uwn$ into upstream electric signals and outputting the upstream electric signals, and n reserve optical receivers, for converting received upstream optical signals having wavelengths $\lambda up1$ to $\lambda upn$ into upstream electric signals and for outputting the upstream electric signals, an upstream current-use demultiplexing unit, having n ports to be connected to the n current-use optical receivers and one port to be connected to the upstream current-use optical fiber, an upstream reserve demultiplexing unit, having n ports to be connected to the n reserve optical receivers and one port to be connected to the upstream reserve fiber, n upstream current-use optical switches, used to set ON/OFF for the output, to the upstream current-use demultiplexing unit, of upstream optical signals received from the upstream current-use demultiplexing unit, and n upstream current-use optical switches, used to set ON/OFF for the output, to the upstream current-use demultiplexing unit, of upstream optical signals received from the upstream current-use demultiplexing unit;

a multiplexed upstream optical signal transmitted to the upstream current-use demultiplexing unit along the upstream current-use fiber is demultiplexed and obtained signals are output to the upstream current-use optical switches;

a multiplexed upstream optical signal transmitted to the upstream reserve demultiplexing unit along the upstream reserve fiber is demultiplexed and obtained signals are output to the upstream reserve optical switches; and when the upstream current-use optical switches or the upstream reserve optical switches are set to ON/OFF in accordance with a selection signal received from the supervisory control unit, the upstream current-use demultiplexing unit or the upstream reserve demultiplexing unit is selected and signals are transmitted to the current-use optical receivers or the reserve optical receivers.

15. The optical wavelength division multiplexing access system according to claim 5, wherein a wavelength $\lambda upk$ (k=1 to n) is set as $\lambda uwk + \Delta\lambda u$ (k=1 to n; $\Delta\lambda u$ is a constant value); the transmission device includes:

optical transmitters for selecting and outputting upstream optical signals having either wavelength $\lambda uwk$ (k is an integer of one or greater to n or smaller) or wavelength $\lambda upk$ (k is an integer of one or greater or n or smaller), n optical receivers, for converting, into electric signals, received upstream optical signals having either wavelengths $\lambda uw1$ to $\lambda uwn$, or wavelengths $\lambda up1$ to $\lambda upn$, and outputting the electric signals, and an upstream array waveguide diffraction grating (upstream AWG), having two ports to be connected to the upstream current-use optical fiber and the redundant optical fiber and n ports to be connected to the n optical receivers;

the upstream optical signal having wavelength $\lambda uwk$ (k is an integer of one or greater to n or smaller) or wavelength $\lambda upk$ (k is an integer of one or greater to n or smaller), which has been selected in accordance with a selection signal received from the supervisory control unit, is transmitted to the W-MULDEM unit; and the W-MULDEM unit outputs the upstream optical signal to the current-use optical fiber or the redundant optical fiber that is consonant with the wavelength, and the upstream AWG demultiplexes the upstream optical signal and transmits the obtained signals to the optical receivers.

16. The optical wavelength division multiplexing access system according to claim 15, wherein the OSU includes:

a device for oscillating optical carriers having wavelengths $\lambda uw1$ to $\lambda uwn$, which are used for upstream signals, so as to permit the ONUs to generate upstream optical signals, and for multiplexing the optical carriers and transmitting a resultant carrier to the downstream current-use optical fiber, and n optical transmitters, for selecting and outputting an upstream optical signal having wavelength $\lambda uwk$ (k is an integer of one or greater to n or smaller) or wavelength $\lambda upk$ (k is an integer of one or greater to n or smaller), and an upstream signal AWG, having two ports to be connected to the current-use optical fiber and the redundant optical fiber and n ports to be connected to the optical transmitters, both of the optical transmitters and the upstream signal AWG being provided as a device for oscillating optical carriers having wavelengths $\lambda up1$ to $\lambda upn$, that are used for upstream signals, so as to permit the ONUs to generate upstream optical signals, and for multiplexing the optical carriers and transmitting a resultant carrier to the downstream redundant optical fiber;

the upstream optical signal, which has wavelength $\lambda uwk$ (k is an integer of one or greater to n or smaller) or wavelength $\lambda upk$ (k is an integer of one or greater to n or smaller), is output by the upstream signal AWG to either the current-use optical fiber or the redundant optical fiber, which is consonant with a selection signal transmitted by the supervisory control unit, and is multiplexed with a downstream optical signal and the resultant signal is transmitted to the wavelength multiplexer.

17. The optical wavelength division multiplexing access system according to claim 16, wherein the optical transmitters add, to downstream signals, a selection signal transmitted by the supervisory control unit and transmit the obtained signals to the ONUs.

18. An optical wavelength division multiplexing access system, whereby a center node (OSU) and n optical network units (ONUs) are arranged through a W-MULDEM unit, whereby a multiplexing section between the OSU and the W-MULDEM unit is established by extending a current-use downstream optical fiber, a current-use upstream optical fiber, a reserve downstream optical fiber and a reserve upstream optical fiber and access sections between the W-MULDEM unit and the individual ONUs are established by extension of downstream optical fibers and of upstream optical fibers, whereby downstream optical signals from the OSU to the ONUs and upstream optical signals from the ONUs to the OSU are multiplexed, using wavelengths that are allocated to the individual ONUs, and resultant optical signals are transmitted across the multiplexing section, and whereby the W-MULDEM unit performs either wavelength multiplexing or wavelength division for the upstream or downstream optical signals to provide bidirectional transmission, wherein the OSU includes:

a transmission device for multiplexing downstream optical signals having wavelengths $\lambda d1$ to $\lambda dn$ that correspond to the ONUs and that are to be transmitted to the ONUs along the current-use downstream optical fiber, for multiplexing downstream optical signals having wavelengths $\lambda d1+\Delta\lambda d$ to $\lambda dn+\Delta\lambda d$ that correspond to the ONUs and that are to be transmitted to the ONUs alone the reserve downstream optical fiber, and for selecting either the current-use downstream optical fiber or the reserve downstream optical fiber used for transmission, and receivers for receiving upstream optical signals having wavelengths $\lambda u1$ to $\lambda un$ transmitted alone the current-use upstream optical fiber, or for receiving upstream optical signals having wavelengths $\lambda u1+\Delta\lambda u$ to $\lambda un+\Delta\lambda u$ transmitted alone the reserve upstream optical fiber:

the ONUs receive, along the optical fibers extended across the access sections, corresponding downstream optical signals having wavelengths $\lambda d1$ to $\lambda dn$ or corresponding downstream optical signals having wavelengths $\lambda d1+\Delta\lambda d$ to $\lambda dn+\Delta\lambda d$, the ONUs transmit, to the optical fibers extended across the access sections, corresponding upstream optical signals that have wavelengths $\lambda u1$ to $\lambda un$ and that are to be transmitted along the current-use optical fiber extended across the multiplexing section, or corresponding upstream optical signals that have wavelengths $\lambda u1+\Delta\lambda u$ to $\lambda un+\Delta\lambda u$ and are to be transmitted along the redundant optical fiber;

the W-MULDEM unit includes:

a downstream array waveguide diffraction grating (downstream AWG) having two ports, which are to be respectively connected to the current-use downstream optical fiber and the reserve downstream optical fiber, and n ports, which are to be connected to optical fibers corresponding to the ONUs, and an upstream array waveguide diffraction grating (upstream AWG) having two ports, which are to be respectively connected to the current-use upstream optical fiber and the reserve upstream optical fiber, and n ports, which are connected to the optical fibers corresponding to the ONUs;

the W-MULDEM unit demultiplexes to the ports of the downstream AWG that correspond to the ONUs the downstream optical signals that have wavelengths $\lambda d1$ to $\lambda dn$ and are received along the current-use downstream optical fiber, or the downstream optical signals that have wavelengths $\lambda d1+\Delta\lambda d$ to $\lambda dn+\Delta\lambda d$ and are received along the reserve downstream optical fiber, or multiplexes, to the port corresponding to the current-use upstream optical fiber or the reserve upstream optical fiber, the upstream optical signals that have wavelengths $\lambda u1$ to $\lambda un$ or wavelengths $\lambda u1+\Delta\lambda u$ to $\lambda un+\Delta\lambda u$ and that are transmitted to the upstream AWG alone the optical fibers corresponding to the ONUs;

the two ports of the downstream AWG are provided at locations consonant with a wavelength difference ($\Delta\lambda d$) between optical signals transmitted alone the current-use downstream optical fiber and optical signals transmitted alone the redundant downstream optical fiber corresponding to each of the ONUs and the two ports of the upstream AWG are provided at locations consonant with a wavelength difference ($\Delta\lambda u$) between optical signals transmitted along the current-use upstream optical fiber and optical signals transmitted along the redundant upstream optical fiber corresponding to each of the ONUs;

wherein the OSU further comprises:

a device for oscillating optical carriers having wavelengths $\lambda u1$ to $\lambda un$, which are used for upstream signals, so as to permit the ONUs to generate upstream optical signals, and for multiplexing the optical carriers and transmitting a resultant carrier to the downstream current-use optical fiber, and a device for oscillating optical carriers having wavelengths $\lambda u1+\Delta\lambda u$ to $\lambda un+\Delta\lambda u$, which are used for upstream signals, so as to permit the ONUs to generate upstream optical signals, and for multiplexing the optical carriers and transmitting a resultant carrier to the downstream redundant optical fiber;

the W-MULDEM unit includes, in addition to the downstream AWG and the upstream AWG, two wavelength group demultiplex filters, for demultiplexing downstream optical signals having wavelengths $\lambda d1$ to $\lambda dn$, which are received along the downstream current-use optical fiber from the optical carriers having wavelengths $\lambda u1$ to $\lambda un$ that are used for upstream signals, and for demultiplexing the downstream optical signals having wavelengths $\lambda d1+\Delta\lambda d$ to $\lambda dn+\Delta\lambda d$, which are received, along the downstream redundant optical fiber, from the optical carriers having wavelengths $\lambda u1+\Delta\lambda u$ to $\lambda un+\Delta\lambda u$ that are used for upstream signals, an upstream signal optical carrier AWG, for routing the optical carriers having wavelengths $\lambda u1$ to $\lambda un$, used for upstream signals, to ports corresponding to the ONUs, and n wavelength group coupling filters, for multiplexing the downstream optical signals that are sorted by the downstream AWG and the optical carriers, used for upstream signals, that are sorted by the upstream signal optical carrier AWG, and transmitting the resultant signals to the downstream optical fibers that correspond to the ONUs;

the ONUs are so constituted as to modulate corresponding optical carriers, used for upstream signals, from among those that are received while multiplexed with the downstream optical signals, and to transmit the obtained signals as upstream optical signals having wavelengths $\lambda u1$ to $\lambda un$, or wavelengths $\lambda u1+\Delta\lambda u$ to $\lambda un+\Delta\lambda u$.

19. The optical wavelength division multiplexing access system according to claim 18, wherein, when $\lambda d1, \lambda d2, \ldots$ and $\lambda dn$ are defined as wavelengths of downstream optical signals that are transferred along the current-optical fiber and correspond to the ONUs, and when a wavelength interval is a constant, defining $\lambda d1+k, \lambda d2+k, \ldots$ and $\lambda dn+k$ ($1 \leq k < n$) as wavelengths of downstream optical signals that are transferred along the redundant optical fiber to the ONUs, and when λu1, λu2, . . . and λun are defined as wavelengths of upstream optical signals that are transferred along the current-optical fiber and correspond to the ONUs, and when a wavelength interval is a constant, defining λu1+k, λu2+k, . . . and λun+k (k is an integer of one or greater) as wavelengths of upstream optical signals that are transferred along the redundant optical fiber to the ONUs.

20. The optical wavelength division multiplexing access system according to claim 19, wherein,
replacing λdn+i with λdi when λdn+i=λdi+FSR is established; and
replacing λun+i with λui when λun+i=λui+FSR is established (i is an integer of 1 to k).

21. The optical wavelength division multiplexing access system according to claim 19, wherein the device for oscillating the optical carriers, having wavelengths λu1 to λun, that are used for upstream signals, and the device for oscillating the optical carriers, having wavelengths λu1+k to λun+k, that are used for upstream signals, are constituted by one device for oscillating optical carriers having wavelengths λu1 to λun+k; and the optical carriers having wavelengths λu1 to λun+1, used for upstream signals, are transmitted to the downstream current-use optical fiber and the downstream redundant optical fiber.

22. An optical wavelength division multiplexing access system, whereby a center node (OSU) and n optical network units (ONUs) are arranged by using a W-MULDEM unit, whereby a multiplexing section between the OSU and the W-MULDEM unit established by extending a downstream current-use optical fiber, an upstream current-use optical fiber, a downstream redundant optical fiber and an upstream redundant optical fiber, and access sections between the W-MULDEM unit and the individual ONUs are established by extension of downstream optical fibers and upstream optical fibers, whereby downstream optical signals from the OSU to the ONUs and upstream optical signals from the ONUs to the OSU are multiplexed using wavelengths that are allocated to individual ONUs and resultant signals are transmitted across the multiplexing section, and whereby the W-MULDEM unit performs wavelength multiplexing or wavelength division for the upstream or downstream optical signals to provide bidirectional transmission,
the OSU includes:
transmission device for multiplexing downstream optical signals having wavelengths λdw1 to λdwn that correspond to the ONUs and that are to be transmitted to the ONUs along the downstream current-use optical fiber, for multiplexing downstream optical signals having wavelengths λdp1 to λdpn that correspond to the ONUs and that are to be transmitted to the ONUs along the downstream redundant optical fiber, and for selecting either the downstream current-use optical fiber or the downstream redundant optical fiber for use for transmission, and
reception device for receiving upstream optical signals having wavelengths λuw1 to λuwn along the upstream current-use optical fiber or for receiving upstream optical signals having wavelengths λup1 to λupn along the upstream redundant optical fiber;
the individual ONUs receive corresponding downstream optical signals having wavelengths λdw1 to λdwn or corresponding downstream optical signals having wavelengths λdp1 to λdpn, which are received along the optical fibers extended across the access sections, and transmit, to the optical fibers extended across the access sections, corresponding upstream optical signals that have wavelengths λuw1 to λuwn and are to be transmitted along the upstream current-use optical fiber extended across the multiplexing section, or corresponding upstream optical signals that have wavelengths λup1 to λupn and are to be transmitted along the upstream redundant optical fiber;
the W-MULDEM unit includes:
a downstream current-use demultiplexing unit corresponding to the downstream current-use optical fiber, and a downstream reserve demultiplexing unit corresponding to the downstream redundant optical fiber,
n wavelength group coupling filters for multiplexing, for corresponding ports, downstream optical signals having wavelengths λdw1 to λdwn, which have been demultiplexed by the current-use demultiplexing unit, and downstream optical signals having wavelengths λdp1 to λdpn, which have been demultiplexed by the downstream reserve demultiplexing unit, and for outputting obtained signals to the downstream optical fibers that correspond to the ONUs,
an upstream current-use multiplexing unit corresponding to the upstream current-use optical fiber and an upstream reserve multiplexing unit corresponding to the upstream redundant optical fiber, and
n wavelength group demultiplex filters, for dividing and transmitting, to corresponding ports of the upstream current-use multiplexing unit or the upstream reserve multiplexing unit, the upstream optical signals having wavelengths λuw1 to λuwn and having wavelengths λup1 to λupn, all of which are received from the upstream optical fibers corresponding to the ONUs;
wherein the downstream optical signals having wavelengths λdw1 to λdwn, which are received along the downstream current-use optical fiber, or the downstream optical signals having wavelengths λdp1 to λdpn, which are received along the downstream redundant optical fiber, are divided into ports corresponding to the ONUs;
the upstream optical signals having wavelengths λuw1 to λuwn, or the upstream optical signals having wavelengths λup1 to λupn, which are received from the upstream optical fibers corresponding to the ONUs, are merged at the port that corresponds to the upstream current-use optical fiber or the upstream redundant optical fiber; and
different bands are provided for the wavelengths λdw1 to λdwn of the downstream current-use optical signals and the wavelengths λuw1 to λuwn of the downstream reserve optical signals, and different bands are provided for the wavelengths λuw1 to λuwn of the upstream current-use optical signals and the wavelengths λup1 to λupn of the upstream reserve optical signals.

23. The optical wavelength division multiplexing access system according to claim 22, wherein wavelengths of downstream current-use optical signals that correspond to the ONUs are equalized with wavelengths of upstream reserve optical signals, and wavelengths of upstream current-use optical signals are equalized with wavelengths of downstream reserve optical signals.

24. An optical wavelength division multiplexing access system, whereby a center node (OSU) and n optical network units (ONUs) are arranged by using a W-MULDEM unit, whereby a multiplexing section between the OSU and the W-MULDEM unit is established by extending a downstream current-use optical fiber, an upstream current-use optical fiber, a downstream redundant optical fiber and an upstream redundant optical fiber, and access sections between the W-MULDEM unit and the individual ONUs are established by the extension of downstream optical fibers and upstream optical fibers, whereby downstream optical signals from the OSU to the ONUs and upstream optical signals from the ONUs to the OSU are multiplexed using wavelengths that are allocated to individual ONUs and the resultant signals are transmitted across the multiplexing section, and whereby the W-MULDEM unit performs wavelength multiplexing or wavelength division for the upstream or downstream optical signals to provide bidirectional transmission, wherein the OSU includes:
transmission device for, when the ONUs are divided into two groups, #1 to #k and #k+1 to #n, and downstream optical signals are divided into two wavelength groups, $\lambda d1$ to $\lambda dk$ and $\lambda dk+1$ to $\lambda dn$, multiplexing downstream optical signals having wavelengths $\lambda d1$ to $\lambda dk$ so as to transmit downstream optical signals to the ONUs #1 to #k along the downstream current-use optical fiber, for multiplexing downstream optical signals having wavelengths $\lambda dk+1$ to $\lambda dn$ for transmission along the downstream redundant optical fiber to the ONUs #1 to #k, for multiplexing downstream optical signals having wavelengths $\lambda dk+1$ to $\lambda dn$ so as to transmit downstream optical signals to the ONUs #k+1 to #n along the downstream current-use optical fiber, and for multiplexing downstream optical signals having wavelengths $\lambda d1$ to $\lambda dk$ for transmission along the downstream redundant optical fiber to the ONUs #k+1 to #n, so that either the downstream current-use optical fiber or the downstream redundant optical fiber is selected for transmission, and
reception device for, when upstream optical signals are divided into two wavelength groups, $\lambda u1$ to $\lambda uk$ and $\lambda uk+1$ to $\lambda un$, receiving upstream optical signals, for which wavelengths $\lambda u1$ to $\lambda uk$ for current use and wavelengths $\lambda uk+1$ to $\lambda un$ for reserve use are allocated for the ONUs #1 to #k, and for which wavelengths $\lambda uk+1$ to $\lambda un$ for current use and wavelengths $\lambda u1$ to $\lambda uk$ for reserve use are allocated for the ONUs #k+1 to #n;

the ONUs receive, along the downstream optical fibers at the access sections, downstream optical signals having corresponding wavelengths $\lambda d1$ to $\lambda dk$, or wavelengths $\lambda dk+1$ to $\lambda dn$, and transmit, to the upstream optical fibers, upstream optical signals having corresponding wavelengths $\lambda u1$ to $\lambda uk$ when the upstream current-use optical fiber at the multiplexing section is employed for transmission, or transmit upstream optical signals having corresponding wavelengths $\lambda uk+1$ to $\lambda un$ when the upstream redundant optical fiber is employed for transmission;

the W-MULDEM unit includes:
two ports to be connected to the downstream current-use optical fiber and the downstream redundant optical fiber,
a downstream current-use demultiplexing unit corresponding to the downstream current-use optical fiber and a downstream reserve demultiplexing unit corresponding to the downstream redundant optical fiber,
n wavelength group coupling filters, for multiplexing, for the ndividual ports, the downstream optical signals having wavelengths $\lambda d1$ to $\lambda dk$ and $\lambda dk+1$ to $\lambda dn$, which have been demultiplexed by the downstream current-use demultiplexing unit, and the downstream optical signals having wavelengths $\lambda dk+1$ to $\lambda dn$ and $\lambda d1$ to $\lambda dk$, which have been demultiplexed by the downstream reserve demultiplexing unit, and for transmitting obtained signals to the upstream current-use optical fiber and the upstream redundant optical fiber, two ports to be connected to the upstream current-use optical fiber and the upstream redundant optical fiber,
an upstream current-use multiplexing unit corresponding to the upstream current-use optical fiber and an upstream reserve multiplexing unit corresponding to the upstream redundant optical fiber, and
n wavelength group demultiplex filters, for dividing the upstream optical signals having wavelengths $\lambda u1$ to $\lambda uk$ and $\lambda uk+1$ to $\lambda un$ and wavelengths $\lambda uk+1$ to $\lambda un$ and $\lambda u1$ to $\lambda uk$, which are received along the upstream optical fiber corresponding to the ONUs, and outputting the signals to the corresponding ports of the upstream current-use multiplexing unit or the upstream reserve multiplexing unit; and the downstream optical signals having wavelengths $\lambda d1$ to $\lambda dn$, which are received along the downstream current-use optical fiber or the downstream redundant optical fiber, are divided among the ports corresponding to the ONUs, and the upstream optical signals having wavelengths $\lambda u1$ to $\lambda un$, which are received along the upstream optical fibers corresponding to the ONUs, are multiplexed at the port that corresponds to the upstream current-use optical fiber or the redundant optical fiber.

25. An optical wavelength division multiplexing access system, whereby a center node (OSU) and n optical network units (ONUs) are arranged by using a W-MULDEM unit, whereby a multiplexing section between the OSU and the W-MULDEM unit is established by extending a downstream current-use optical fiber, an upstream current-use optical fiber, a downstream redundant optical fiber and an upstream redundant optical fiber, and access sections between the W-MULDEM unit and the individual ONUs are established by the extension of downstream optical fibers and upstream optical fibers, whereby downstream optical signals from the OSU to the ONUs and upstream optical signals from the ONUs to the OSU are multiplexed using wavelengths that are allocated to individual ONUs and the resultant signals are transmitted across the multiplexing section, and whereby the W-MULDEM unit performs wavelength multiplexing or wavelength division for the upstream or downstream optical signals to provide bidirectional transmission, wherein the OSU includes:
transmission device for multiplexing downstream optical signals having wavelengths $\lambda dw1$ to $\lambda dwn$ that correspond to the ONUs and that are to be transmitted to the ONUs along the downstream current-use optical fiber, for multiplexing downstream optical signals having wavelengths $\lambda dp1$ to $\lambda dpn$ that correspond to the ONUs and that are to be transmitted to the ONUs along the downstream redundant optical fiber, and for selecting either the downstream current-use optical fiber or the downstream redundant optical fiber for use for transmission,
reception device for receiving upstream optical signals having wavelengths $\lambda uw1$ to $\lambda uwn$ along the upstream current-use optical fiber or for receiving upstream optical signals having wavelengths $\lambda up1$ to $\lambda upn$ along the upstream redundant optical fiber,
a device for oscillating optical carriers, having wavelengths $\lambda uw1$ to $\lambda uwn$, which are used by the ONUs for generation of upstream signals, and for multiplexing the optical carriers and transmitting a resultant carrier to the downstream current-use optical fiber, and a device for oscillating optical carriers, having wavelengths λup1 to λupn, which are used by the ONUs for generation of upstream signals, and for multiplexing the optical carriers and transmitting a resultant carrier to the downstream redundant optical fiber;

the individual ONUs receive corresponding downstream optical signals having wavelengths λdw1 to λdwn or corresponding downstream optical signals having wavelengths λdp1 to λdpn, which are received along the optical fibers extended across the access sections, and transmit, to the optical fibers extended across the access sections, corresponding upstream optical signals that have wavelengths λuw1 to λuwn and are to be transmitted along the upstream current-use optical fiber extended across the multiplexing section, or corresponding upstream optical signals that have wavelengths λup1 to λupn and are to be transmitted along the upstream redundant optical fiber;

the W-MULDEM unit includes:
- a downstream array waveguide diffraction grating (downstream AWG), having two ports to be connected to the downstream current-use optical fiber and the downstream redundant optical fiber and n ports to be connected to the downstream optical fibers corresponding to the ONUs,
- an upstream array waveguide diffraction grating (upstream AWG), having two ports to be connected to the upstream current-use optical fiber and the upstream redundant optical fiber and n ports to be connected to the upstream optical fibers corresponding to the ONUs,
- two wavelength group demultiplex filters, for demultiplexing optical carriers having wavelengths λuw1 to λuwn, which are used for upstream signals, from downstream optical signals having wavelengths λdw1 to λdwn, which are received along the downstream current-use optical fiber, and for demultiplexing optical carriers having wavelengths λup1 to λupn, which are used for upstream signals, from downstream optical signals having wavelengths λdp1 to λdpn, which are received along the downstream redundant optical fiber,
- an upstream signal optical carrier AWG, for dividing the optical carriers, which have wavelengths λuw1 to λuwn and are used for upstream signals, among the ports corresponding to the ONUs, and
- n wavelength group coupling filters, for multiplexing the downstream optical signals, which have been demultiplexed by the downstream AWG, and the optical carriers, used for upstream signals, which have been demultiplexed by the upstream signal optical carrier AWG, and for transmitting the resultant signals to the downstream optical fibers corresponding to the ONUs;

the downstream optical signals having wavelengths λdw1 to λdwn, which are transmitted along the downstream current-use optical fiber to the downstream AWG, or the downstream optical signals having wavelengths λdp1 to λdpn, which are transmitted along the downstream redundant optical fiber, are divided among the ports corresponding to the ONUs; and the upstream optical signals having wavelengths λuw1 to λuwn or wavelengths λup1 to λupn, which are transmitted to the upstream AWG along the upstream current-uae optical fibers corresponding to the ONUs, are merged at the port corresponding to the upstream current-use optical fiber or the upstream redundant optical fiber.

26. The optical wavelength division multiplexing access system according to claim 25, wherein providing, instead of the upstream signal optical carrier AWG, an upstream current-use signal optical carrier AWG corresponding to the downstream current-use optical fiber and an upstream reserve signal optical carrier AWG corresponding to the downstream redundant optical fiber, and n wavelength group coupling filters for multiplexing, for individual ports, the upstream signal optical carriers having wavelengths λuw1 to λdwu, which have been demultiplexed by the upstream current-use signal optical carrier AWG, and the upstream signal optical carriers having wavelengths λup1 to λupn, which have been demultiplexed by the upstream reserve signal optical carrier AWG;

providing, instead of the downstream AWG, a downstream current-use AWG corresponding to the downstream current-use optical fiber and a downstream reserve AWG corresponding to the downstream redundant optical fiber, and n wavelength group coupling filters, for multiplexing, for individual ports, the downstream optical signals having wavelengths λdw1 to λdwn, which have been demultiplexed by the downstream current-sue AWG, and the downstream optical signals having wavelengths λdp1 to λdpn, which have been demultiplexed by the downstream reserve AWG; and providing, instead of the upstream AWG, an upstream current-use AWG corresponding to the upstream current-use optical fiber and an upstream reserve AWG corresponding to the upstream redundant optical fiber, and n wavelength group demultiplex filters, for dividing the upstream optical signals having wavelengths λuw1 to λuwn and wavelengths λup1 to λupn, which are received along the upstream optical fibers corresponding to the ONUs, and for transmitting resultant signals to corresponding ports of the upstream current-use AWG or the reserve AWG.

27. The optical wavelength division multiplexing access system according to claim 25, wherein the ONUs are divided into two groups, #1 to #k and #k+1 to #n; and when dividing downstream optical signals into two wavelength groups, λd1 to λdk and λdk+1 to λdn, allocating current-use wavelengths λd1 to λdk and reserve wavelengths λdk+1 to λdn for the ONUs #1 to #k, and allocating current-use wavelengths λdk+1 to λdn and reserve wavelengths λd1 to λdk for the ONUs #k+1 to #n;

when dividing upstream optical signals into two wavelength groups, λu1 to λuk and λuk+1 to λun, allocating current-use wavelengths λu1 to λuk and reserve wavelengths λuk+1 to λun for the ONUs #1 to #k, and allocating current-use wavelengths λuk+1 to λun and reserve wavelengths λu1 to λuk for the ONUs #k+1 to #n;

providing, instead of the upstream signal optical carrier AWG, an upstream current-use signal optical carrier demultiplexing unit that corresponds to the downstream current-use optical fiber and an upstream reserve signal optical carrier demultiplexing unit that corresponds to the downstream redundant optical fiber, and n wavelength group coupling filters, for multiplexing, for individual ports, upstream signal optical carriers having wavelengths λu1 to λuk and λuk+1 to λun, which have been demultiplexed by the upstream current-use signal optical carrier demultiplexing unit, and upstream signal optical carriers having wavelengths λuk+1 to λun and $\lambda u1$ to $\lambda uk$, which have been demultiplexed by the upstream reserve signal optical carrier demultiplexing unit;

providing, instead of the downstream AWG, a downstream current-use demultiplexing unit that corresponds to the downstream current-use optical fiber and a downstream reserve demultiplexing unit that corresponds to the downstream redundant optical fiber, and n wavelength group coupling filters for multiplexing, for individual ports, downstream optical signals having wavelengths $\lambda d1$ to $\lambda dk$ and $\lambda dk+1$ to $\lambda dn$, which have been demultiplexed by the downstream current-use demultiplexing unit, and downstream optical signals having wavelengths $\lambda dk+1$ to $\lambda dn$ and $\lambda d1$ to $\lambda dk$, which have been demultiplexed by the downstream reserve demultiplexing unit; and providing, instead of the upstream AWG, an upstream current-use multiplexing unit that corresponds to the upstream current-use optical fiber and an upstream reserve multiplexing unit that corresponds to the upstream redundant optical fiber, and n wavelength group demultiplex filters, for demultiplexing upstream optical signals having wavelengths $\lambda u1$ to $\lambda uk$ and $\lambda uk+1$ to $\lambda un$ and wavelengths $\lambda uk+1$ to $\lambda un$ and $\lambda u1$ to $\lambda uk$, which are received along the upstream optical fibers corresponding to the ONUs, and for transmitting resultant signals to corresponding ports of the upstream current-use multiplexing unit or the upstream reserve multiplexing unit.

* * * * *